United States Patent
Aoi et al.

(10) Patent No.: US 9,239,451 B2
(45) Date of Patent: Jan. 19, 2016

(54) ZOOM LENS AND IMAGING APPARATUS

(71) Applicant: FUJIFILM Corporation, Tokyo (JP)

(72) Inventors: Toshihiro Aoi, Saitama-ken (JP); Shinkichi Ikeda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/565,741

(22) Filed: Dec. 10, 2014

(65) Prior Publication Data
US 2015/0092281 A1 Apr. 2, 2015

Related U.S. Application Data

(63) Continuation of application No. PCT/JP2013/003333, filed on May 27, 2013.

(30) Foreign Application Priority Data

Jun. 12, 2012 (JP) .................................. 2012-132859

(51) Int. Cl.
*G02B 15/14* (2006.01)
*G02B 15/173* (2006.01)
*G02B 13/18* (2006.01)

(52) U.S. Cl.
CPC .............. *G02B 15/173* (2013.01); *G02B 13/18* (2013.01)

(58) Field of Classification Search
CPC ...... G02B 15/173; G02B 15/20; G02B 15/14; G02B 15/16; G02B 13/18
See application file for complete search history.

(56) References Cited

U.S. PATENT DOCUMENTS

| 5,561,560 | A | 10/1996 | Tsutsumi |
| 5,790,316 | A | 8/1998 | Terasawa et al. |
| 6,084,721 | A | 7/2000 | Terasawa |
| 2009/0128923 | A1* | 5/2009 | Toyama ............... G02B 15/173 359/683 |
| 2010/0085647 | A1 | 4/2010 | Nurishi |
| 2011/0038055 | A1 | 2/2011 | Nurishi |

FOREIGN PATENT DOCUMENTS

| JP | 07-248449 | 9/1995 |
| JP | 07-294814 | 11/1995 |
| JP | 08-82741 | 3/1996 |
| JP | 10-161026 | 6/1998 |

(Continued)

OTHER PUBLICATIONS

International Search Report, PCT/JP2013/003333, Sep. 3, 2013.

*Primary Examiner* — Joseph P Martinez
(74) *Attorney, Agent, or Firm* — Young & Thompson

(57) ABSTRACT

The zoom lens substantially consists of a positive first lens group which is fixed while changing magnification, a negative second lens group which moves while changing magnification, a positive third lens group which moves while changing magnification, and a positive fourth lens group which is fixed while changing magnification in this order from the object side. The image formation magnification rates of the second lens group and the third lens group simultaneously pass a −1× point while changing magnification from the wide angle to the telephoto. The second lens group substantially consists of a negative second-a lens group and a positive second-b lens group which independently move while changing magnification in this order from the object side, and the third lens group substantially consists of a positive third-a lens group and a positive third-b lens group which independently move while changing magnification in this order from the object side.

9 Claims, 56 Drawing Sheets

(56) References Cited

FOREIGN PATENT DOCUMENTS

| JP | 11-160620 | 6/1999 |
| JP | 2009-128491 | 6/2009 |
| JP | 2009-128492 | 6/2009 |
| JP | 2010-091788 | 4/2010 |
| JP | 2011-039399 | 2/2011 |

\* cited by examiner

EXAMPLE 1

EXAMPLE 3

FIG.24 EXAMPLE 3

FIG.27 EXAMPLE 4

EXAMPLE 5

FIG.30 EXAMPLE 5

FIG.51
EXAMPLE 4
INTERMEDIATE AREA
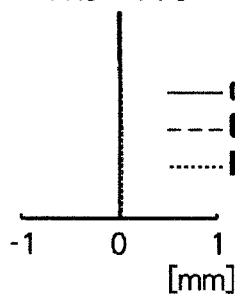
A
SPHERICAL ABERRATION
FNo.= 1.76
d-LINE
C-LINE
F-LINE
-1 0 1 [mm]
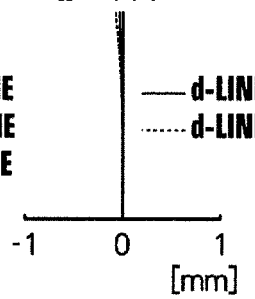
B
ASTIGMATISM
ω= 11.7°
d-LINE (S)
d-LINE (T)
-1 0 1 [mm]
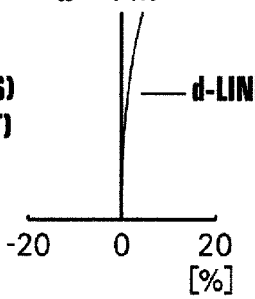
C
DISTORTION
ω= 11.7°
d-LINE (S)
-20 0 20 [%]
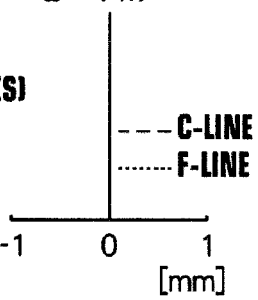
D
LATERAL CHROMATIC ABERRATION
ω= 11.7°
C-LINE
F-LINE
-1 0 1 [mm]

ZOOM LENS AND IMAGING APPARATUS

CROSS-REFERENCE TO RELATED APPLICATIONS

This application is a Continuation of PCT International Application No. PCT/JP2013/003333 filed on May 27, 2013, which claims priority under 35 U.S.C. §119(a) to Japanese Patent Application No. 2012-132859 filed on Jun. 12, 2012. Each of the above application(s) is hereby expressly incorporated by reference, in its entirety, into the present application.

BACKGROUND OF THE INVENTION

1. Technical Field

The present invention relates to a zoom lens and an imaging apparatus, and particularly to a zoom lens having a high magnification ratio suitable for mounting onto TV cameras, video cameras, and the like and an imaging apparatus including this zoom lens.

2. Description of the Related Art

In recent years, needs for the zoom lenses which are intended to be mounted onto a TV camera, a video camera, and the like to have higher magnification ratios, wider angles of view, lighter weights, and higher performance throughout the entire zoom range are increasing. Zoom lenses which satisfy these needs are desired to be provided. For example, four-group configuration zoom lenses are known as such zoom lenses. Further, a configuration in which a lens group which is the second from the object side is a lens group for changing magnification and a lens group which is the third from the object side is a lens group for correcting movements of an imaging plane associated with the magnification changes is a known type of the four-group configuration. Further, a configuration, in which a second lens group from the object side or a third lens group from the object side is divided, has been proposed to achieve higher performance (refer to Patent Documents 1 through 4 (Japanese Unexamined Patent Publication No. 7(1995)-248449, Japanese Unexamined Patent Publication No. 2009-128491, Japanese Unexamined Patent Publication No. 2010-091788, and Japanese Unexamined Patent Publication No. 2011-039399)).

SUMMARY OF THE INVENTION

In the zoom lens, the achievement of higher magnification requires aberrations which increase at the telephoto side to be satisfactorily corrected. Further, the inclination of an imaging plane which became worse from the wide angle end to the intermediate area due to the aberration correction at the telephoto side is also required to be satisfactorily corrected. In the case that the angle of view is widened, there is a need to prevent vignetting of the image circle which is caused by the great amount of changes in the peripheral rays entering the magnification change group while changing magnification from the wide angle end. The occurrence of such vignetting can be prevented by increasing the diameter of the first lens group (a focusing group) on the most-object side. However, the diameter of the first lens group is relatively large. Accordingly, increasing the diameter of the first lens group further will make it difficult to achieve reduction in weight.

For example, all of the zoom lenses disclosed in Patent Documents 1 through 4 mentioned above have the angles of view of 65 or less at the wide angle end, and widening of the angle of view is not achieved. In contrast, making the angle of view of the lens wider and the configuration of the most-image-side lens group complicated to achieve a wider angle of view will increase the weight of the lens system. Therefore, increasing magnification is difficult to achieve reduction in weight. For example, in the zoom lens disclosed in Patent Document 2 mentioned above, the angle of view is widened, but the zoom ratio is not significantly great.

The present invention has been developed in view of the above circumstances. It is an object of the present invention to provide a zoom lens in which compactness is maintained while increasing the magnification to 100× or more, widening the angle of view, and achieving higher performance throughout the entire zoom range; and an imaging apparatus with this zoom lens mounted thereon.

A zoom lens of the present invention substantially consists of:

a first lens group having a positive refractive power, which is fixed while changing magnification;

a second lens group having a negative refractive power and a magnification change function, which moves while changing magnification;

a third lens group having a positive refractive power, which moves while changing magnification and corrects variations in an imaging plane due to changes in magnification; and a fourth lens group having a positive refractive power and an image formation action, which is fixed while changing magnification and in which a stop is disposed on the most-object side, in this order from the object side; wherein image formation magnification rates of the second lens group and the third lens group simultaneously pass a −1× point when changing magnification from the wide angle end to the telephoto end;

the second lens group substantially consists of a second-a lens group having a negative refractive power and a second-b lens group having a positive refractive power in this order from the object side, the second-a lens group and the second-b lens group independently moving while changing magnification from the wide angle end to the telephoto end; and the third lens group substantially consists of a third-a lens group having a positive refractive power and a third-b lens group having a positive refractive power in this order from the object side, the third-a lens group and the third-b lens group independently moving while changing magnification from the wide angle end to the telephoto end.

The zoom lens of the present invention substantially consists of four lens groups. However, lenses substantially without any refractive power; optical elements other than lenses such as stops, cover glasses, filters, and the like; lens flanges; lens barrels; imaging elements; and mechanical components such as camera shake correction mechanisms may be included in addition to the four lens groups.

Further, the "lens group" intends to include not only configurations constituted by of a plurality of lenses but also configurations constituted by one lens.

In the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present invention, the sign of the radius of curvature is positive in the case that a surface shape is convex on the object side, and negative in the case that the surface shape is convex on the image side.

Note that in the zoom lens of the present invention, it is preferable for the distance between the third-a lens group and the third-b lens group to become maximum in the zoom range from the wide angle end to the focal length where the image formation magnification rates of the second lens group and the third lens group simultaneously become −1× while changing magnification. Further, it is preferable for conditional formula (1) below to be satisfied:

$$0.060<(G3d\text{max}-G3db1)/f3a<0.180 \quad (1),\text{ where}$$

G3db1: the distance between the third-a lens group and the third-b lens group at a zoom position where the image formation magnification rates of the second lens group and the third lens group simultaneously become −1×, G3dmax: the maximum value of the distance between the third-a lens group and the third-b lens group in the zoom range, and f3a: the focal length of the third-a lens group.

Note that it is more preferable for conditional formula (1-1) below to be satisfied:

$$0.080<(G3d\text{max}-G3db1)/f3a<0.160 \quad (1\text{-}1).$$

In addition, in the zoom lens of the present invention, it is preferable for the distance between the second-a lens group and the second-b lens group to become minimum in a zoom range from the wide angle end to the focal length where the image formation magnification rates of the second lens group and the third lens group simultaneously become −1× while changing magnification. Further, it is preferable for conditional formula (2) below to be satisfied:

$$-0.012<(G2d\text{min}-G2db1)/f2b<-0.002 \quad (2),\text{ where}$$

G2db1: the distance between the second-a lens group and the second-b lens group at a zoom position where the image formation magnification rates of the second lens group and the third lens group simultaneously become −1×, G2dmin: the minimum value of the distance between the second-a lens group and the second-b lens group in the zoom range, and f2b: the focal length of the second-b lens group.

Note that it is more preferable for conditional formula (2-1) below to be satisfied:

$$-0.010<(G2d\text{min}-G2db1)/f2b<-0.004 \quad (2\text{-}1).$$

Further, in the zoom lens of the present invention, it is preferable for the third-a lens group to substantially consist of one lens having a positive refractive power.

In addition, in the zoom lens of the present invention, it is preferable for at least one surface of the lens having a positive refractive power which constitutes the third-a lens group to be an aspherical surface.

Further, in the zoom lens of the present invention, it is preferable for the second-b lens group to substantially consist of one lens having a positive refractive power and for at least one surface of this lens to be an aspherical surface.

An imaging apparatus of the present invention is provided with the zoom lens of the present invention described above.

According to the present invention, the zoom lens of a four-group configuration is configured to set a configuration of each lens group favorably and to move the second-a lens group and the second-b lens group of the second lens group independently while changing magnification. This enables the inclination of the imaging plane from the wide angle end to the intermediate area to be satisfactorily corrected while correcting aberrations on the telephoto side, particularly the field curvature. Further, the third-a lens group and the third-b lens group of the third lens group are configured to move independently. This enables the image circle to be secured and further distortion satisfactorily to be corrected; and facilitates shifting a point where an F value starts dropping toward a long focus side. Moreover, each of the image formation magnification rates of the second lens group and the third lens group is configured to pass the −1× point simultaneously when changing magnification from the wide angle end to the telephoto end, thereby enabling a zoom lens which is compact and has a high magnification ratio with fluctuations in aberrations suppressed favorably to be achieved. Therefore, field curvature from the wide angle end to the intermediate area can be favorably corrected while securing the image circle. This can achieve high performance from the center to the peripheral area in the entire zoom range.

The imaging apparatus of the present invention can achieve high magnification as well as wider angle of view while maintaining high-vision image quality because the zoom lens of the present invention is mounted thereon.

BRIEF DESCRIPTION OF THE DRAWINGS

FIG. 51 shows various aberration diagrams of the zoom lens according to Example 4 of the present invention (intermediate area).

DESCRIPTION OF THE PREFERRED EMBODIMENTS

Figure 1:
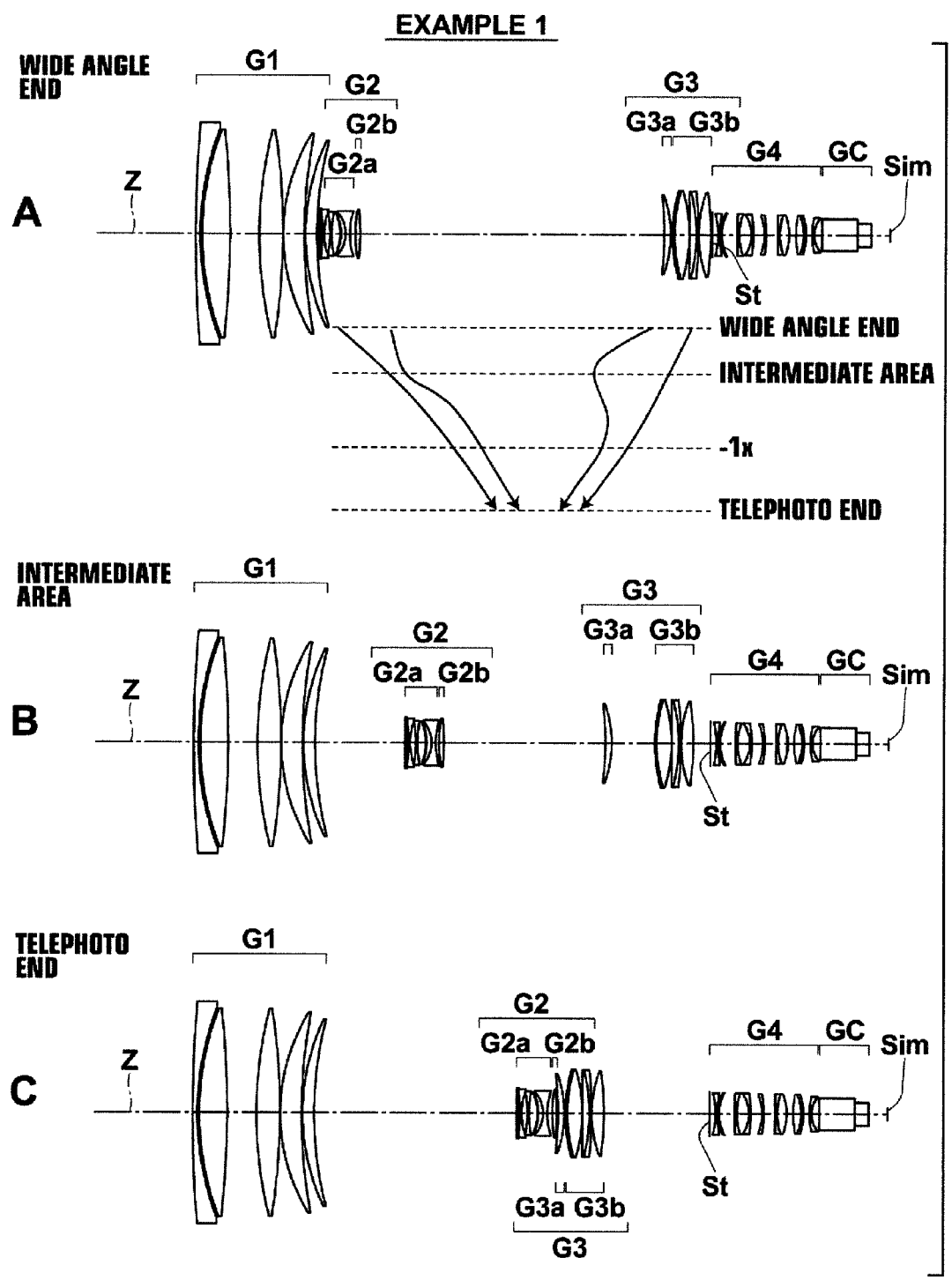
FIG. 1 is a collection of cross-sectional views of a zoom lens according to Example 1 of the present invention.

Hereinafter, embodiments of the present invention will be described in detail with reference to the accompanying drawings. Each of A, B, and C of FIG. 1 shows a configuration of the zoom lens according to one embodiment of the present invention. This configuration corresponds to a lens of Example 1 to be described later. Note that A of FIG. 1 corresponds to an arrangement of an optical system at the wide angle end (in the shortest focal length state), B of FIG. 1 corresponds to an arrangement of the optical system at the intermediate range (in the intermediate focal length state), and C of FIG. 1 corresponds to an arrangement of the optical system at the telephoto end (in the longest focal length state). Similarly, the second through the fifth examples of configurations respectively corresponding to lens configurations of Examples 2 and 3 to be described below are shown in A, B, and C of FIG. 2 through A, B, and C of FIG. 5, respectively.

In all of the FIGS. 1 through 5, the left side is the object side, and the right side is the image side. The movement trajectory of each movable lens group when changing magnification from the wide angle end to the telephoto end is schematically indicated by arrows only in A of FIG. 1. The arrows illustrated in A of FIG. 1 correspond to the movement trajectories of the second-a lens group, the second-b lens group, the third-a lens group, and the third-b lens group in this order from the object side to be described later. Note that in the second through the fifth examples of configurations, the movement trajectory of each movable lens group is substantially the same as that of the first example of configuration. Accordingly, the movement trajectories in FIGS. 2 through 5 will be omitted.

The zoom lens of each embodiment of the present invention can be favorably applied for use in high-performance TV cameras, video cameras, and the like, each of which is provided with a solid imaging element. For example, the zoom lens of the present invention is suitable for the range from the standard to the telephoto area in which a magnification change ratio is greater than or equal to 100×.

This zoom lens consists of a first lens group G1 having a positive refractive power, which is fixed while changing magnification; a second lens group G2 having a negative refractive power, which moves while changing magnification; a third lens group G3 having a positive refractive power, which moves while changing magnification and corrects variations in an imaging plane due to changes in magnification; and a fourth lens group G4 having a positive refractive power and an image formation action, which is fixed while changing magnification and in which an aperture stop St is disposed on the most-object side, in this order from the object side along the optical axis Z. Note that the aperture stop St does not necessarily represent the size or shape thereof, but represents the position thereof on the optical axis Z.

An imaging element (not shown) is disposed on the image formation surface (imaging surface) Sim of this zoom lens. Various kinds of optical members may be disposed between the fourth lens group G4 and the imaging surface according to the configurations of a camera on which the lens is mounted. In each of the examples of configurations shown in the Figures, a color separation optical system GC consisting of a color separation prism, and the like is disposed.

The second lens group G2 and the third lens group G3 are movable while changing magnification and are capable of functioning as a zooming group. The zoom lens of the present embodiment is configured to have an inner zooming system in which magnification is changed by moving groups which are not provided at the front end of the optical system but are provided in the interior of the optical system. Such an inner zooming system is more preferable for the TV cameras, video cameras, and the like because the inner zooming system involves little change in the total length and the weight balance while changing magnification and is superior in operability.

Among the zooming groups, the second lens group G2 functions as a variator group, and the third lens group G3 functions as a compensator group. More specifically, magnification is changed by moving the second lens group G2 along the optical axis, and variations in the imaging plane due to changes in magnifications are corrected by moving the third lens group G3 along the optical axis.

In particular, the zoom lens of the present embodiment adopts a floating system in which the second lens group G2 and the third lens group G3 relatively move when changing magnification. This configuration enables correcting variations in the imaging plane due to the magnification changes, correcting fluctuations in spherical aberration and comatic aberration satisfactorily when changing magnification, and holding favorable optical performance.

The zoom lens of the present embodiment is configured in such a manner that the magnification ratios of the second lens group G2 and the third lens group G3 simultaneously pass a −1× (inverted magnification) point while changing magnification from the wide angle end to the telephoto end. This configuration cause the third lens group G3 which functions as a compensation group to act on not only correction of the imaging plane but also changes in magnification itself. Thereby, the wide angle side can be a reduction ratio and the telephoto side can be an enlargement ratio based on the −1× position as a reference, which enables a large zoom ratio to be taken. Here, in the zoom lens for a television, the third lens group G3 can be configured to have a negative refractive power. However, configuring the third lens group G3 to have a negative refractive power will cause the rays entering the fourth lens group G4 to be diverge, thereby increasing the diameters of lenses which constitute the fourth lens group that functions as a master part including a vibration preventing group and an extender part and increasing the weight thereof, which is unfavorable. Moreover, high magnification is tried to be achieved, there will be a need to suppress chromatic aberration which could not be sufficiently corrected in the first lens group G1 at the telephoto side. In the case that the third lens group G3 has a positive refractive power, the rays entering the third lens group G3 will diverge at the telephoto side, which enables the remaining chromatic aberration to be corrected. Thereby, high performance can be achieved.

Further, in the zoom lens of the present embodiment, the second lens group G2 is configured to consist of a second-a lens group G2a having a negative refractive power and a second-b lens group G2b having a positive refractive power in this order from the object side, in which the second-a lens group G2a and the second-b lens group G2b independently move while changing magnification from the wide angle end to the telephoto end. Here, when a higher magnification is tried to be achieved, correcting aberrations at the telephoto side becomes difficult. When this aberration is tried to be corrected, the imaging plane will incline to the object side from the wide angle end to the intermediate area and it will be difficult to achieve high performance in the entire zoom range. Configuring the second lens group G2 to consist of the second-a lens group G2a having a negative refractive power and the second-b lens group G2b having a positive refractive power in this order from the object side, in which the second-a lens group G2a and the second-b lens group G2b independently move while changing magnification from the wide angle end to the telephoto end enables correcting the inclination of the imaging plane from the wide angle end to the intermediate area satisfactorily while correcting aberrations at the telephoto side, particularly field curvature satisfactorily.

In the zoom lens of the present embodiment, the third lens group G3 is configured to consist of a third-a lens group G3a having a positive refractive power and a third-b lens group G3b having a positive refractive power in this order from the object side, in which the third-a lens group G3a and the third-b lens group G3b independently move while changing magnification from the wide angle end to the telephoto end. Here, in the case that the angle of view is tried to be widened, changing magnification from the wide angle end will cause the peripheral rays which enter the second lens group G2 to change greatly and will make it difficult to secure the image circle. Configuring the third lens group G3 to consist of the third-a lens group G3a having a positive refractive power and the third-b lens group G3b having a positive refractive power in this order from the object side, in which the third-a lens group G3a and the third-b lens group G3b independently move while changing magnification from the wide angle end to the telephoto end enable the image circle to be secured and further enables distortion to be satisfactorily corrected; and facilitates shifting a point where an F value starts dropping toward a long focus side.

In the zoom lens of the present embodiment, field curvature from the wide angle of view to the intermediate area can be corrected satisfactorily while securing the image circle by imparting a degree of freedom in movement of the respective magnification change groups constituted by the second lens group G2 and the third lens group G3. Thereby, high performance can be achieved from the center to the peripheral portions in the entire zoom range.

In the zoom lens of the present embodiment, it is preferable for the distance between the third-a lens group G3a and the third-b lens group G3b to be maximum in the zoom range from the wide angle end to the focal length where the image formation magnification rates of the second lens group G2 and the third lens group G3 simultaneously become −1×, and for conditional formula (1) below to be satisfied:

$$0.060 < (G3d\max - G3db1)/f3a < 0.180 \quad (1),$$ where

G3db1: the distance between the third-a lens group G3a and the third-b lens group G3b at a zooming position where the image formation magnification rates of the second lens group G2 and the third lens group G3 simultaneously become −1×,
G3dmax: the maximum value of the distance between the third-a lens group G3a and the second-b lens group G3b in the zoom range described above, and
f3a: the focal length of the third-a lens group G3a.

In general, a movement of the second lens group G2 while changing magnification will cause the peripheral rays to rapidly change and will make it difficult to secure the image circle in the zoom range to the focal length where the image formation magnification rates of the second lens group G2 and the third lens group G3 simultaneously become −1×. Configuring the distance between the third-a lens group G3a and the third-b lens group G3b to be maximum in the zoom range from the wide angle end to the focal length where the image formation magnification rates of the second lens group G2 and the third lens group G3 simultaneously become −1× enables securing the image circle and satisfactorily correcting distortion which is displaced in a positive direction.

Setting the value of (G3dmax−G3db1)/f3a to fall below the lower limit defined by conditional formula (1) will cause the amount of feeding out the third-a lens group G3a to decrease. Thereby, securing the image circle will be impossible and further the amount of distortion will increase. Setting the value of (G3dmax−G3db1)/f3a to exceed the upper limit defined by conditional formula (1) will cause the amount of feeding out the third-a lens group G3a to increase. Thereby, a load on a cam will increase when changing magnification by a cam drive so that a rapid zoom movement will be difficult.

It is more preferable for conditional formula (1-1) below to be satisfied to enhance the advantageous effects described above:

$$0.080 < (G3d\max - G3db1)/f3a < 0.160 \quad (1\text{-}1).$$

Each of FIGS. 6 through 10 is a graph showing the relationship between zoom ratios and the distances between the third-a lens group G3a and the third-b lens group G3b in each of the first through the fifth examples of configurations. Note that in the present embodiment, the focal length where the image formation magnification rates of the second lens group G2 and the third lens group G3 simultaneously become −1× is employed as a standard. The vertical axis in the graph shown in each of FIGS. 6 through 10 indicates G3d-G3db1 which is each value obtained by subtracting the distance G3db1 between the third-a lens group G3a and the third-b lens group G3b at the focal length where the image formation magnification rates of the second lens group G2 and the third lens group G3 simultaneously become −1× from the distance G3d between the third-a lens group G3a and the third-b lens group G3b. As shown in FIGS. 6 through 10, the distance between the third-a lens group G3a and the third-b lens group G3b is configured to be maximum in the zoom range from the wide angle end to the focal length where the image formation magnification rates of the second lens group G2 and the third lens group G3 simultaneously become −1× while changing magnification, in the first through the fifth examples of configurations (Examples 1 through 5).

In the zoom lens of the present embodiment, it is preferable for the distance between the second-a lens group G2a and the second-b lens group G2b to be minimum in the zoom range from the wide angle end to the focal length where the image formation magnification rates of the second lens group G2 and the third lens group G3 simultaneously become −1× while changing magnification and for conditional formula (2) to be satisfied:

$$-0.012 < (G2d\min - G2db1)/f2b < -0.002 \quad (2),$$ where

G2db1: the distance between the second-a lens group G2a and the second-b lens group G2b at a zooming position where the image formation magnification rates of the second lens group G2 and the third lens group G3 simultaneously become −1, G2dmin: the minimum value of the distance between the second-a lens group G2a and the second-b lens group G2b in the zoom range described above, and f2b: the focal length of the second-b lens group G2b.

In general, when trying to achieve high magnification, the amount of aberrations, particularly field curvature at the telephoto side will increase. When this aberration is corrected, correcting various aberration, particularly field curvature will be difficult in the zoom range from the wide angle end to the focal length where the image formation magnification rates of the second lens group G2 and the third lens group G3 simultaneously become −1×. The second lens group G2 is the only lens group having a negative refractive power among the lens groups which constitute the zoom lens of the present embodiment. Accordingly, the second lens group G2 has a strong refractive power and has high sensitivity with respect to field curvature. Configuring the distance between the second-a lens group G2a and the second-b lens group G2b to be minimum in the zoom range from the wide angle end to the focal length where the image formation magnification rates of the second lens group G2 and the third lens group G3 simultaneously become −1× while changing magnification enables satisfactory correction of the imaging plane in the zoom range described above.

Setting the value of (G2dmin-G2db1)/f2b to fall below the lower limit defined by conditional formula (2) will cause the amount of feeding out the second-b lens group G2b to increase. Thereby, a load on a cam will increase when changing magnification by a cam drive so that rapid zoom movement will be difficult. Further, various aberrations other than field curvature, particularly spherical aberration will become worse, which is unfavorable. Setting the value of (G2dmin-G2db1)/f2b to exceed the upper limit defined by conditional formula (2) will cause the amount of feeding out the second-b lens group G2b to decrease. Thereby, the effect of correcting field curvature will deteriorate, which is unfavorable.

It is more preferable for conditional expression (2-1) below to be satisfied in order to enhance the advantageous effects described above:

$$-0.010 < (G2d\text{min} - G2db1)/f2b < -0.004 \quad (2\text{-}1).$$

Each of FIGS. 11 through 15 is a graph showing the relationship between zoom ratios and the distances between the second-a lens group G2a and the second-b lens group G2b in each of the first through the fifth examples of configurations. Note that in the present embodiment, the focal length where the image formation magnification rates of the second lens group G2 and the third lens group G3 simultaneously become −1× is employed as a standard. The vertical axis in the graph shown in each of FIGS. 1 through 15 indicates G2d-G2db1 which is each value obtained by subtracting the distance G2db1 between the second-a lens group G2a and the second-b lens group G2b at the focal length where the image formation magnification rates of the second lens group G2 and the third lens group G3 simultaneously become −1× from the distance G2d between the second-a lens group G2a and the second-b lens group G2b. As shown in FIGS. 11 through 15, the distance between the second-a lens group G2a and the second-b lens group G2b is configured to be minimum in the zoom range from the wide angle end to the focal length where the image formation magnification rates of the second lens group G2 and the third lens group G3 simultaneously become −1× while changing magnification, in the first through the fifth examples of configurations (Examples 1 through 5).

The first lens group G1 can be of a five-lens configuration in which a first lens having a negative refractive power, a second lens having a positive refractive power, a third lens having a positive refractive power, a fourth lens having a positive refractive power, and a fifth lens having a positive refractive power are disposed in this order from the object side, as shown in the example of FIG. 1. This configuration enables the zoom lens of the present embodiment to have a good balance in performance and weight.

The second-a lens group G2a having a negative refractive power, which constitutes the second lens group G2 can be of a six-lens configuration in which a first lens having a negative refractive power, a second lens having a negative refractive power, a cemented lens formed by a third lens having a negative refractive power and a fourth lens having a positive refractive power together, and a cemented lens formed by a fifth lens having a positive refractive power and a sixth lens having a negative refractive power together are disposed in this order from the object side, as shown in the example of configurations in FIG. 1. Configuring the most-object-side lens in the second-a lens group G2a to have a negative refractive power enables the second lens group G2 which functions as a variator group to be compact and enables a stroke necessary for changing magnification to be secured. Therefore, higher magnification can be achieved.

The second-b lens group G2b having a positive refractive power, which constitutes the second lens group G2 can be constituted by one lens having a positive refractive power as shown in the example of configurations of FIG. 1, for example. It can be understood from the movement trajectory in FIG. 1 that second-b lens group G2b does not necessarily move in one direction from the object side to the image side when changing magnification from the wide angle end to the telephoto end, but there is a possibility for the second-b lens group G2b to move in the direction opposite thereto. The second-b lens group G2b which moves in such a manner gives a significant effect on operability. Therefore, it is preferable for the second-b lens group G2b to be light in weight to obtain favorable operability. Accordingly, it is preferable for the second-b lens group G2b to be constituted by a small number of lenses, more particularly by one lens having a positive refractive power.

It is preferable for at least one surface of one lens having a positive refractive power, which constitutes the second-b lens group G2b to be an aspherical surface. The zoom lens of the present embodiment corrects field curvature from the wide angle end to the intermediate area satisfactorily by varying the distance between the second-a lens group G2a and the second-b lens group G2b. However, fluctuations in other aberrations such as spherical aberration and astigmatism will occur. Configuring at least one surface of one lens having a positive refractive power, which constitutes the second-b lens group G2b to be an aspherical surface enables spherical aberration and astigmatism to be corrected satisfactorily.

The third-a lens group G3a having a positive refractive power, which constitutes the third lens group G3 can be constituted by one lens having a positive refractive power as shown in the example of FIG. 1, for example. It can be found from the movement trajectory in FIG. 1 that the third-a lens group G3a does not necessarily move in one direction from the image side to the object side when changing magnification from the wide angle end to the telephoto end, but there is a possibility for the third-a lens group G3a to move in the direction opposite thereto. The third-a lens group G3a which moves in such a manner gives a significant effect on operability. Therefore, it is preferable for the third-a lens group G3a to be light in weight to obtain favorable operability. Accordingly, it is preferable for the third-a lens group G3a to be constituted by a small number of lenses, more particularly by one lens having a positive refractive power.

It is preferable for at least one surface of one lens having a positive refractive power, which constitutes the third-a lens group G3a to be an aspherical surface. The zoom lens of the present embodiment corrects field curvature from the wide angle end to the intermediate area satisfactorily by varying the distance between the third-a lens group G3a and the third-b lens group G3b. However, variations of other aberrations such as spherical aberration and astigmatism will occur. Configuring at least one surface of one lens having a positive refractive power, which constitutes the third-a lens group G3a to be an aspherical surface enables spherical aberration and astigmatism to be corrected satisfactorily.

The third-b lens group G3b having a positive refractive power, which constitutes the third lens group G3, can be of a five-lens configuration in which a cemented lens formed by a first lens having a negative refractive power and a second lens having a positive refractive power together, a cemented lens formed by a third lens having a positive refractive power and a fourth lens having a negative refractive power together, and a fifth lens having a positive refractive power are disposed in this order from the object side, for example as shown in the example of FIG. 1. This configuration enables satisfactory correction of lateral chromatic aberration at the telephoto end.

Further, it is preferable for the third lens group G3b to have at least one aspherical surface and for this aspherical surface to be the object-side surface of the most-image-side lens having a positive refractive power in the third lens group G3b. Configuring the third lens group G3b which moves when changing magnification to have an aspherical surface lens is advantageous from the viewpoint of correcting aberrations. Further, configuring the object-side surface of the most-image-side lens having a positive refractive power in the zooming group to be an aspherical surface can provide a significant advantageous effect for correcting aberrations. Particularly, spherical aberration, comatic aberration, and field curvature can be corrected satisfactorily.

Further, it is preferable for the third lens group G3b to have at least one aspherical surface, of a shape in which a positive refractive power becomes weaker toward the periphery from the optical axis. This configuration is advantageous from the viewpoint of suppressing fluctuations in various aberrations while changing magnification.

The fourth lens group G4 functions as a relay (a master) group. For example, as shown in the example of FIG. 1, the fourth lens group G4 can be of a twelve-lens configuration in which an aperture stop St; a first lens having a negative refractive power; a second lens having a positive refractive power; a cemented lens formed by a third lens having a negative refractive power, a fourth lens having a positive refractive power, and a fifth lens having a negative refractive power together; a sixth lens having a negative refractive power; a seventh lens having a negative refractive power; an eight lens having a positive refractive power; a cemented lens formed by a ninth lens having a positive refractive power and a tenth lens having a negative refractive power together; and a cemented lens formed by an eleventh lens having a negative refractive power and a twelfth lens having a positive refractive power are disposed in this order from the object side.

As described above, according to the zoom lens of the present embodiment, the zoom lens is designed to be of a four-group configuration as a whole, to set a configuration of each lens group favorably and to move the second-a lens group and the second-b lens group of the second lens group independently while changing magnification. This enables the inclination of the imaging plane from the wide angle end to the intermediate area to be satisfactorily corrected while correcting aberrations on the telephoto side, particularly the field curvature. Further, the third-a lens group and the third-b lens group of the third lens group are designed to move independently. This enables securing the image circle and further correcting distortion satisfactorily; and facilitates shifting a point where an F value starts dropping toward a long focus side. Moreover, each of the image formation magnification rates of the second lens group and the third lens group is configured to pass the −1× point simultaneously when changing magnification from the wide angle end to the telephoto end, thereby enabling a zoom lens which is compact and has high magnification with fluctuations in aberrations suppressed favorably to be achieved. Therefore, field curvature from the wide angle end to the intermediate area can be favorably corrected while securing the image circle. This can achieve high performance from the center to the peripheral area in the entire zoom range.

Next, specific Numerical Examples of the zoom lens according to the present embodiment will be described.

Example 1

Figure 16:
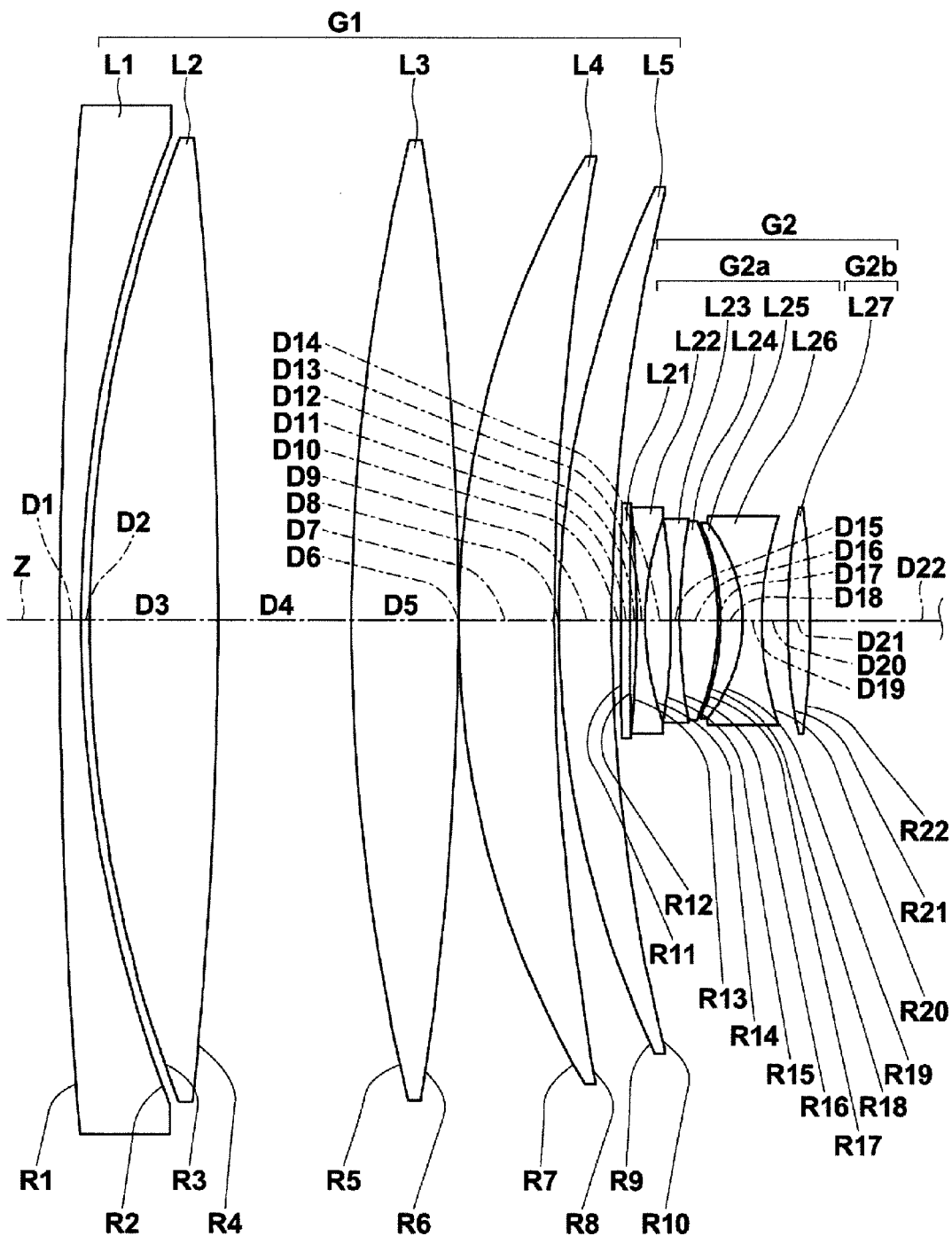
FIG. 16 is a cross-sectional view of the first lens group and the second lens group of the zoom lens according to Example 1 of the present invention, particularly illustrating a configuration thereof.
Figure 17:
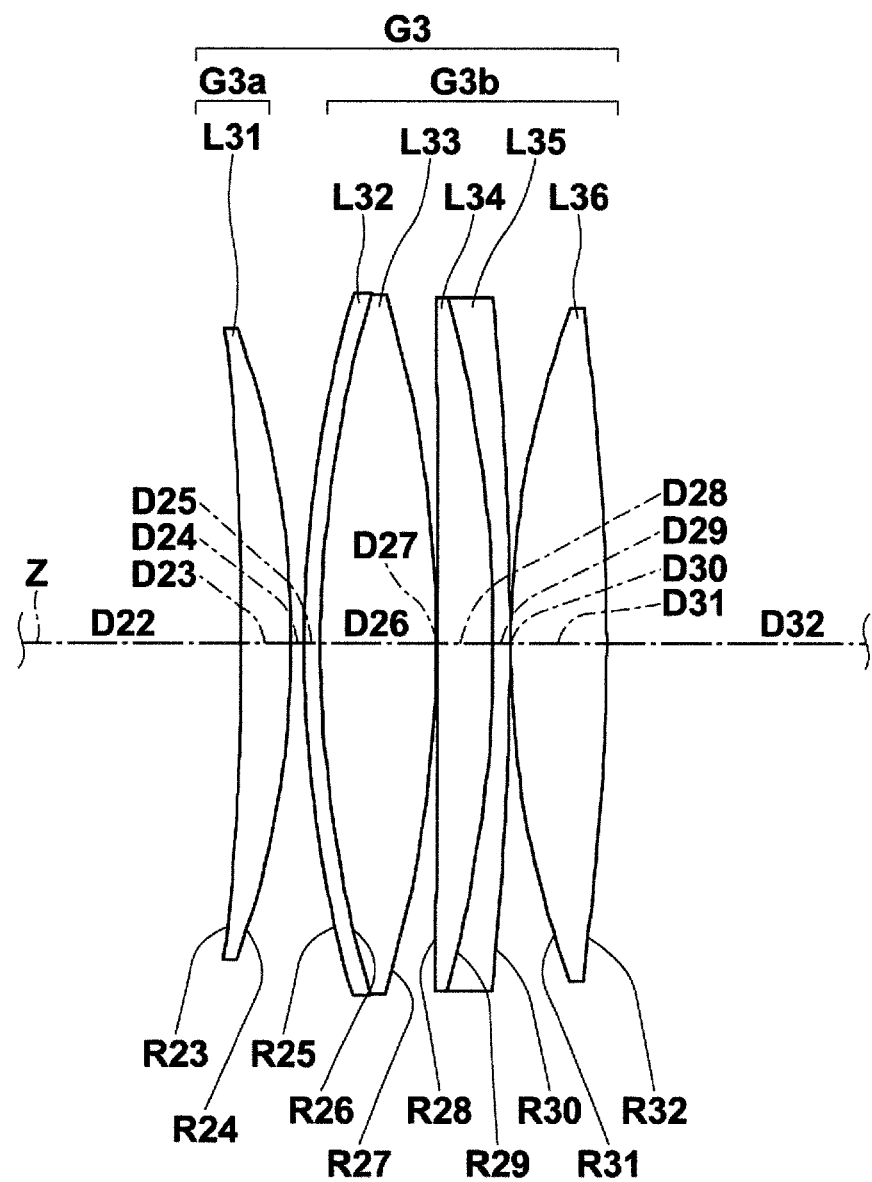
FIG. 17 is a cross-sectional view of the third lens group of the zoom lens according to Example 1 of the present invention, particularly illustrating a configuration thereof.
Figure 18:
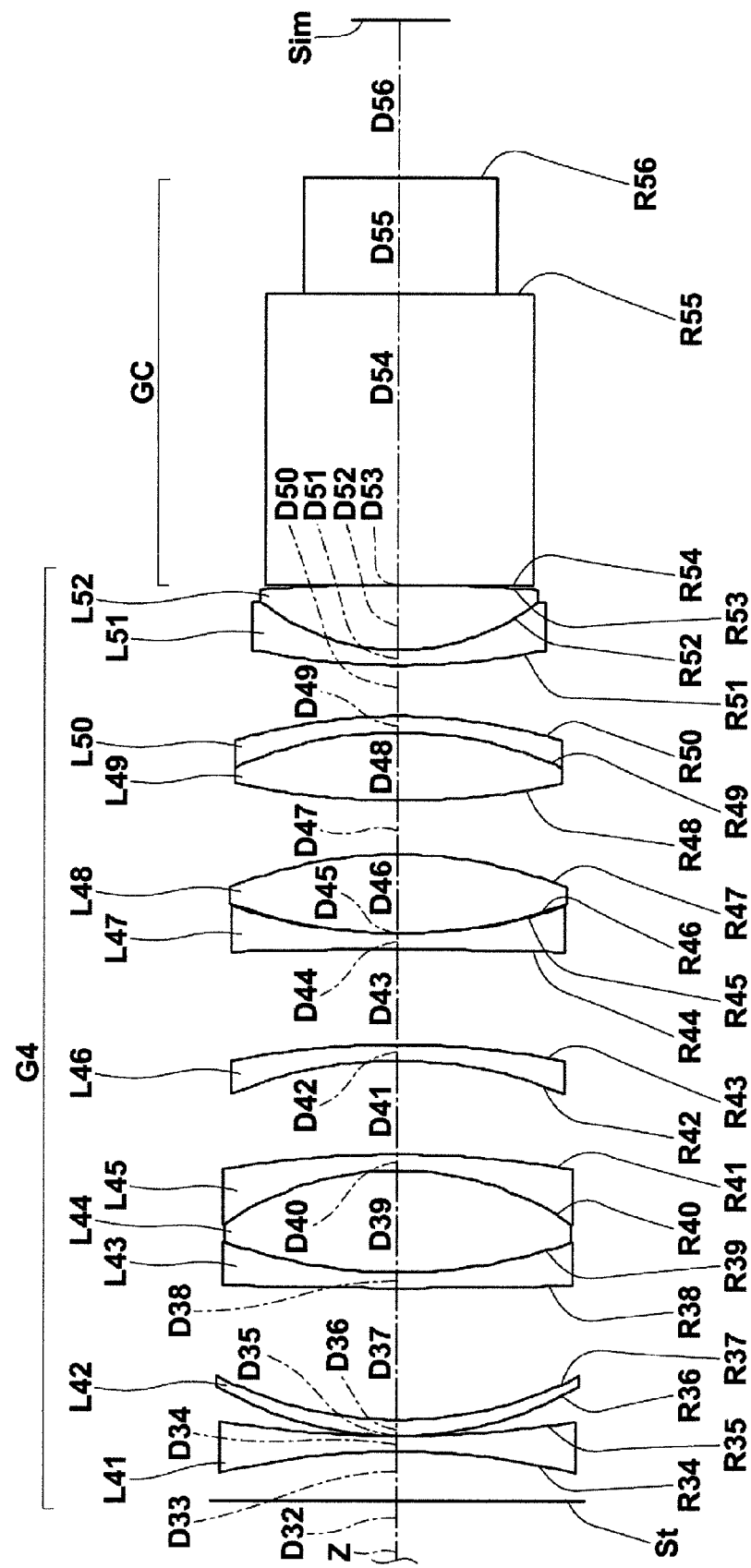
FIG. 18 is a cross-sectional view of the fourth lens group through the image formation surface of the zoom lens according to Example 1 of the present invention, particularly illustrating a configuration thereof.

The cross sectional view of the lens of Example 1 is shown in FIG. 1. Detailed configurations thereof are shown in FIGS. 16 through 18. FIG. 16 shows detailed configurations of the first lens group G1 and the second lens group G2, FIG. 17 shows a detailed configuration of the third lens group G3, and FIG. 18 shows detailed descriptions from the fourth lens group G4 to the image formation surface Sim.

In Example 1, the first lens group G1 is of a five-lens configuration including lenses L1 through L5, the second-a lens group G2a which constitutes the second lens group G2 is of a six-lens configuration including lenses L21 through L26, the second-b lens group G2b is of a one-lens configuration including a lens L27, a third-a lens group G3a which constitutes the third lens group G3 is of a one-lens configuration including a lens L31, a third-b lens group G3b is of a five-lens configuration including lenses L32 through L36, and the fourth lens group is of a twelve-lens configuration including an aperture stop St and lenses L41 through L52.

Lens data of the zoom lens according to Example 1 is shown in Table 1, the other data is shown in Table 2, and aspherical surface coefficients are shown in Table 3. Note that the meanings of the symbols in Tables 1 through 3 to be described later are the same as those of Examples below. Further, values rounded to a predetermined digit are shown in the Tables below. In the data shown in the Tables below, degrees are used as the unit of angles and mm is used as the unit of length, but other appropriate units may also be used, as optical systems are usable even when they are proportionally enlarged or miniaturized.

In the lens data of Table 1, the i-th (i=1, 2, 3, . . . ) surface number, the value of i sequentially increasing from the surface of the constituent element at the most object side, which is designated as 1, toward the image side are shown in the column Si. The radii of curvature of the i-th surface are shown in the column Ri, and the distances between i-th surfaces and (i+1)st surfaces along the optical axis Z are shown in the column Di. Further, the refractive indices of j-th (j=1, 2, 3, . . . ) optical elements with respect to the d-line (wavelength: 587.6 nm), the value of j sequentially increasing from the optical element at the most object side, which is designated as 1, toward the image side, are shown in the column ndj. The Abbe numbers of j-th optical elements with respect to the d-line (wavelength: 587.6 nm) are shown in the column vdj. The partial dispersion ratios of j-th (j=1, 2, 3, . . . ) optical elements are shown in the column of θgfj. Note that the lens data also shows an aperture stop St and a color separation optical system GC. The sign of the radius of curvature is positive in the case that a surface shape is convex on the object side, and negative in the case that the surface shape is convex on the image side. Ri and Di of Table 1 correspond to the symbols Ri and Di of FIGS. 16 through 11.

In the lens data of Table 1, the columns of the distances between surfaces D10, D20, D22, D24, and D32 respectively correspond to the distance between the first lens group G1 and the second-a lens group G2a, the distance between the second-a lens group G2a and the second-b lens group G2b, the distance between the second-b lens group G2b and the third-a lens group G3a, the distance between the third-a lens group G3a and the third-b lens group G3b, and the distance between the third-b lens group G3b and the fourth lens group G4 which vary to change magnification. DD[10], DD[20], DD[22], DD[24], and DD[32] indicated respectively in these columns indicate that these distances are variable. Note that "G3d" in conditional formula (1) corresponds to the distance between surfaces DD[24] and "Gd2" in conditional formula (2) corresponds to the distance between surfaces DD[20].

Table 2 shows values of a zoom ratio, a paraxial focal length f' (mm), a back focus (air converted length) Bf, an F-number (FNo.) and an angle of view (2ω) of the entire system at each of the wide angle end, the intermediate area, and the telephoto end in a state focused on infinity as other data. Further, Table 2 shows the distances between surfaces (mm) at the wide angle end, the intermediate area, and the telephoto end in a state focused on infinity as DD[10], DD[20], DD[22], DD[24], and DD[32] of the distances between surfaces D10, D20, D22, D24, and D32 which are data when changing magnification.

In lens data of Table 1, the mark "*" is indicated at the left of surface numbers for lens surfaces which are aspheric surfaces. In the basic lens data of Table 1, numerical values of paraxial radii of curvature are indicated as the radii of curvature of these aspheric surfaces.

Table 3 shows data regarding the aspheric surface of the imaging lens of Example 1. Surface numbers of aspheric surfaces and aspheric surface coefficients with respect to the aspheric surfaces are shown therein. Note that "E-n" (n: integer) in each of the numerical values of the aspheric surface coefficients means "×10$^{-n}$". The aspheric surface coefficients are the values of respective coefficients KA, Am in the aspheric surface formula below:

$$Zd = C \cdot h^2 / \{1 + (1 - KA \cdot C^2 \cdot h^2)^{1/2}\} + \Sigma Am \cdot h^m$$

where,
Zd: the depth of an aspheric surface (the length of a perpendicular line drawn from a point on an aspheric surface with a height h to a plane perpendicular to the optical axis which contacts the peak of the aspheric surface)
h: height (the distance from the optical axis to a lens surface)
C: an inverse number of a paraxial radius of curvature
KA, Am: aspheric surface coefficients The aspherical surface of the zoom lens according to Example 1 is expressed by effectively applying orders of A3 through A10 to an aspherical surface coefficient Am, based on the above aspherical surface formula.

TABLE 1

| Si | Ri | Di | ndj | νdi | θg, fj |
|---|---|---|---|---|---|
| 1 | 1323.0184 | 4.40 | 1.80440 | 39.59 | 0.57297 |
| 2 | 279.0618 | 1.80 | | | |
| 3 | 275.4849 | 26.50 | 1.43387 | 95.20 | 0.53733 |
| 4 | −950.6756 | 27.64 | | | |
| 5 | 421.5836 | 22.07 | 1.43387 | 95.20 | 0.53733 |
| 6 | −641.9060 | 0.10 | | | |
| 7 | 188.5475 | 19.68 | 1.43387 | 95.20 | 0.53733 |
| 8 | 531.7638 | 0.99 | | | |
| 9 | 210.3404 | 10.89 | 1.43875 | 94.93 | 0.53433 |
| 10 | 358.5769 | DD[10] | | | |
| *11 | −28450.8536 | 1.80 | 1.90366 | 31.32 | 0.59481 |
| 12 | 840.3386 | 1.42 | | | |
| 13 | −244.2424 | 1.80 | 2.00100 | 29.13 | 0.59952 |
| 14 | 60.9567 | 5.35 | | | |
| 15 | −133.0211 | 1.75 | 1.81600 | 46.62 | 0.55682 |
| 16 | 116.8464 | 7.83 | 1.80809 | 22.76 | 0.63073 |
| 17 | −51.1801 | 0.61 | | | |
| 18 | −50.3612 | 4.48 | 1.95906 | 17.47 | 0.65993 |
| 19 | −31.7174 | 4.04 | 1.88300 | 40.76 | 0.56679 |
| 20 | 68.0524 | DD[20] | | | |
| *21 | 186.3343 | 4.60 | 1.43875 | 94.93 | 0.53433 |
| 22 | −191.0643 | DD[22] | | | |
| 23 | −337.7610 | 5.90 | 1.49700 | 81.54 | 0.53748 |
| 24 | −114.6061 | DD[24] | | | |
| 25 | 151.7214 | 2.00 | 1.92286 | 18.90 | 0.64960 |
| 26 | 146.8493 | 13.90 | 1.49700 | 81.54 | 0.53748 |
| 27 | −146.4123 | 0.10 | | | |
| 28 | −4335.0582 | 6.72 | 1.61800 | 63.33 | 0.54414 |
| 29 | −157.8726 | 2.00 | 1.92286 | 18.90 | 0.64960 |
| 30 | −409.2567 | 0.10 | | | |
| 31 | 116.4725 | 11.63 | 1.43875 | 94.93 | 0.53433 |
| *32 | −231.7457 | DD[32] | | | |
| 33(Stop) | ∞ | 5.57 | | | |
| 34 | −86.4324 | 1.80 | 1.88300 | 40.76 | 0.56679 |
| 35 | 124.2381 | 0.01 | | | |
| 36 | 40.1870 | 1.80 | 2.00069 | 25.46 | 0.61364 |
| 37 | 44.5253 | 14.93 | | | |
| 38 | 688.1614 | 1.80 | 1.80400 | 46.58 | 0.55730 |
| 39 | 58.4126 | 11.53 | 1.80518 | 25.43 | 0.61027 |
| 40 | −34.5350 | 1.80 | 1.90366 | 31.32 | 0.59481 |
| 41 | −121.7822 | 10.62 | | | |
| 42 | −49.6566 | 1.80 | 1.49700 | 81.54 | 0.53748 |
| 43 | −99.0023 | 10.78 | | | |
| 44 | −709.1882 | 1.80 | 1.90366 | 31.32 | 0.59481 |
| 45 | 58.1921 | 0.01 | | | |
| 46 | 55.3165 | 8.91 | 1.48749 | 70.23 | 0.53007 |
| 47 | −50.6334 | 6.10 | | | |
| 48 | 88.3141 | 7.68 | 1.49700 | 81.54 | 0.53748 |
| 49 | −44.7262 | 1.80 | 1.72000 | 43.69 | 0.56995 |
| 50 | −63.7882 | 5.78 | | | |
| 51 | 78.8629 | 1.80 | 1.83481 | 42.71 | 0.56431 |
| 52 | 25.9619 | 7.31 | 1.51823 | 58.90 | 0.54567 |
| 53 | −231.0654 | 0.00 | | | |
| 54 | ∞ | 33.00 | 1.60863 | 46.60 | 0.56787 |
| 55 | ∞ | 13.20 | 1.51633 | 64.14 | 0.53531 |
| 56 | ∞ | 17.83 | | | |

TABLE 2

Example 1/Other Data

| | Wide Angle | Intermediate | Telephoto |
|---|---|---|---|
| Zoom Ratio | 1.0 | 3.0 | 110.0 |
| f' | 8.49 | 25.48 | 934.43 |
| Bf | 47.05 | 47.05 | 47.05 |
| FNo. | 1.76 | 1.76 | 4.81 |
| 2ω [*] | 68.8 | 23.2 | 0.6 |
| DD[10] | 1.76 | 84.82 | 190.24 |
| DD[20] | 5.41 | 3.07 | 4.84 |
| DD[22] | 286.13 | 151.78 | 0.94 |
| DD[24] | 1.59 | 40.08 | 0.99 |
| DD[32] | 0.94 | 16.09 | 98.82 |

TABLE 3

Example 1/Aspherical Surface Coefficient

| Surface Number | 11 | 21 | 32 |
|---|---|---|---|
| KA | −9.1939463E+07 | 3.0956023E+01 | −1.1535295E+01 |
| A3 | −1.6512106E−05 | 2.0397629E−05 | 8.2626571E−07 |
| A4 | 7.3251090E−06 | −4.2510888E−06 | 2.4574277E−08 |
| A5 | −1.7438475E−06 | 1.1877326E−06 | 1.8451905E−08 |
| A6 | 2.2957313E−07 | −1.1874151E−07 | −1.3663881E−09 |
| A7 | −1.7383202E−08 | 6.7069720E−09 | 5.8771894E−11 |
| A8 | 7.5934372E−10 | −2.1276615E−10 | −1.4379290E−12 |
| A9 | −1.7705144E−11 | 3.3430959E−12 | 1.8464382E−14 |
| A10 | 1.7004571E−13 | −1.8746671E−14 | −9.6147296E−17 |

Example 2

Figure 2:
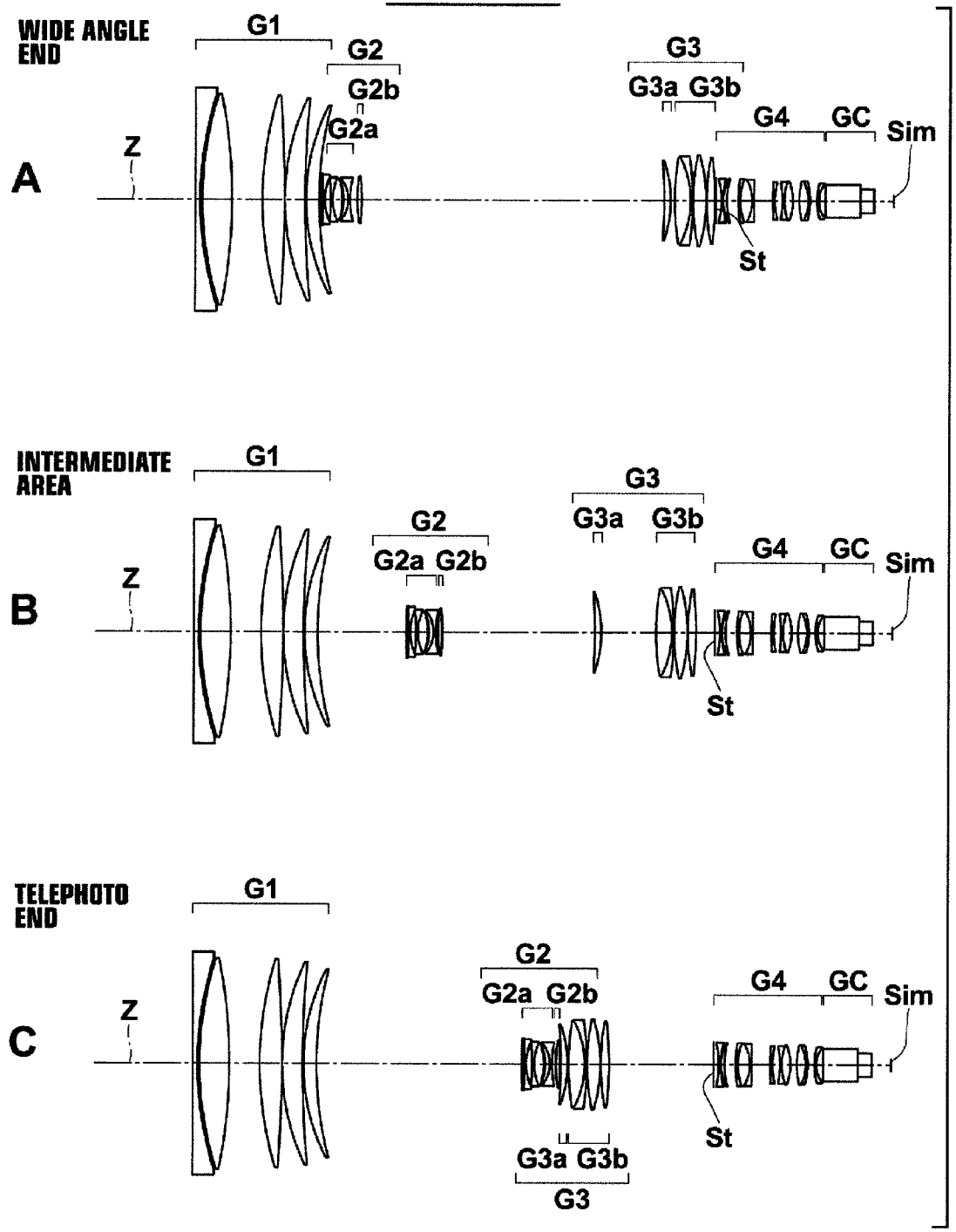
FIG. 2 is a collection of cross-sectional views of a zoom lens according to Example 2 of the present invention.
Figure 19:
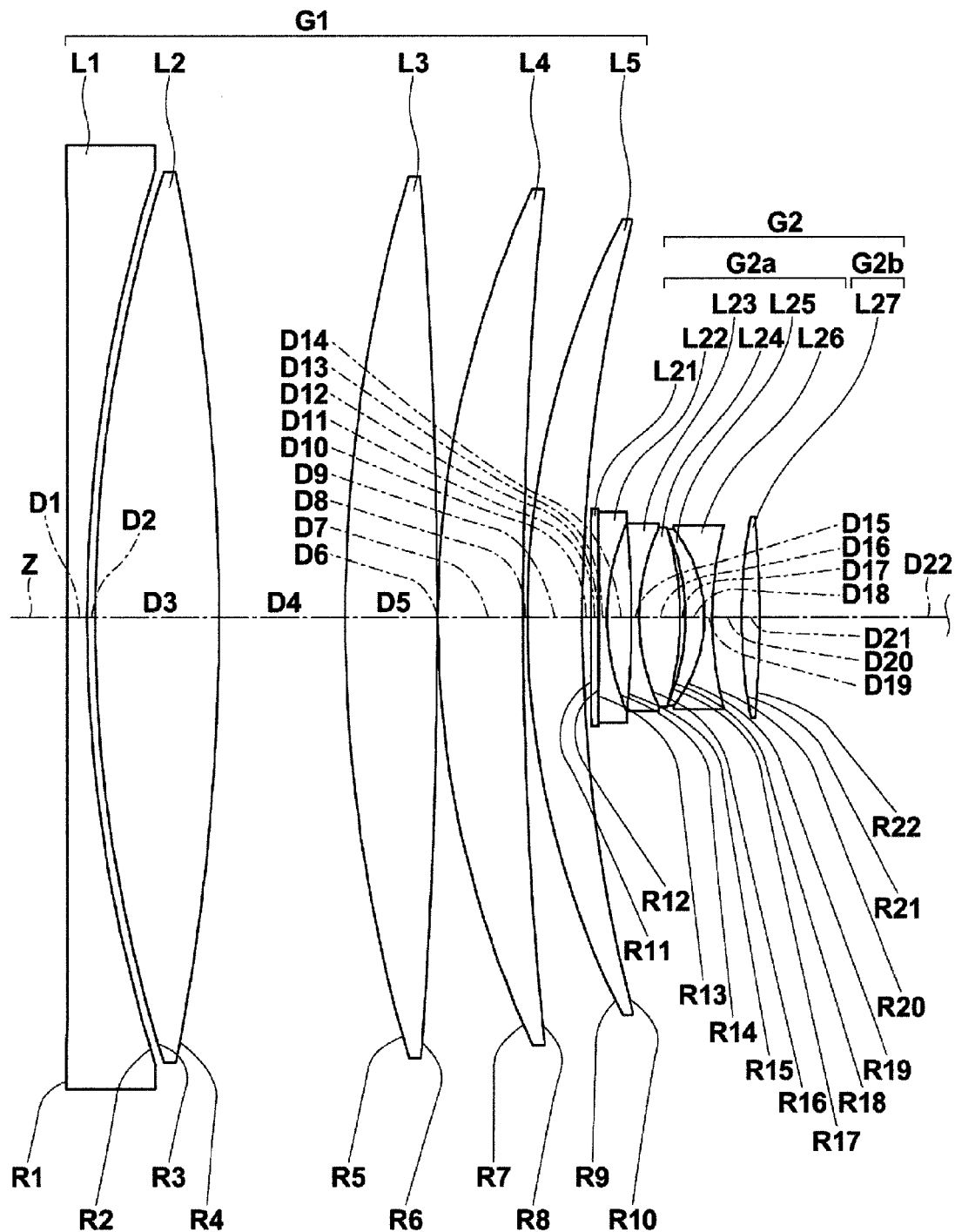
FIG. 19 is a cross-sectional view of the first lens group and the second lens group of the zoom lens according to Example 2 of the present invention, particularly illustrating a configuration thereof.
Figure 20:
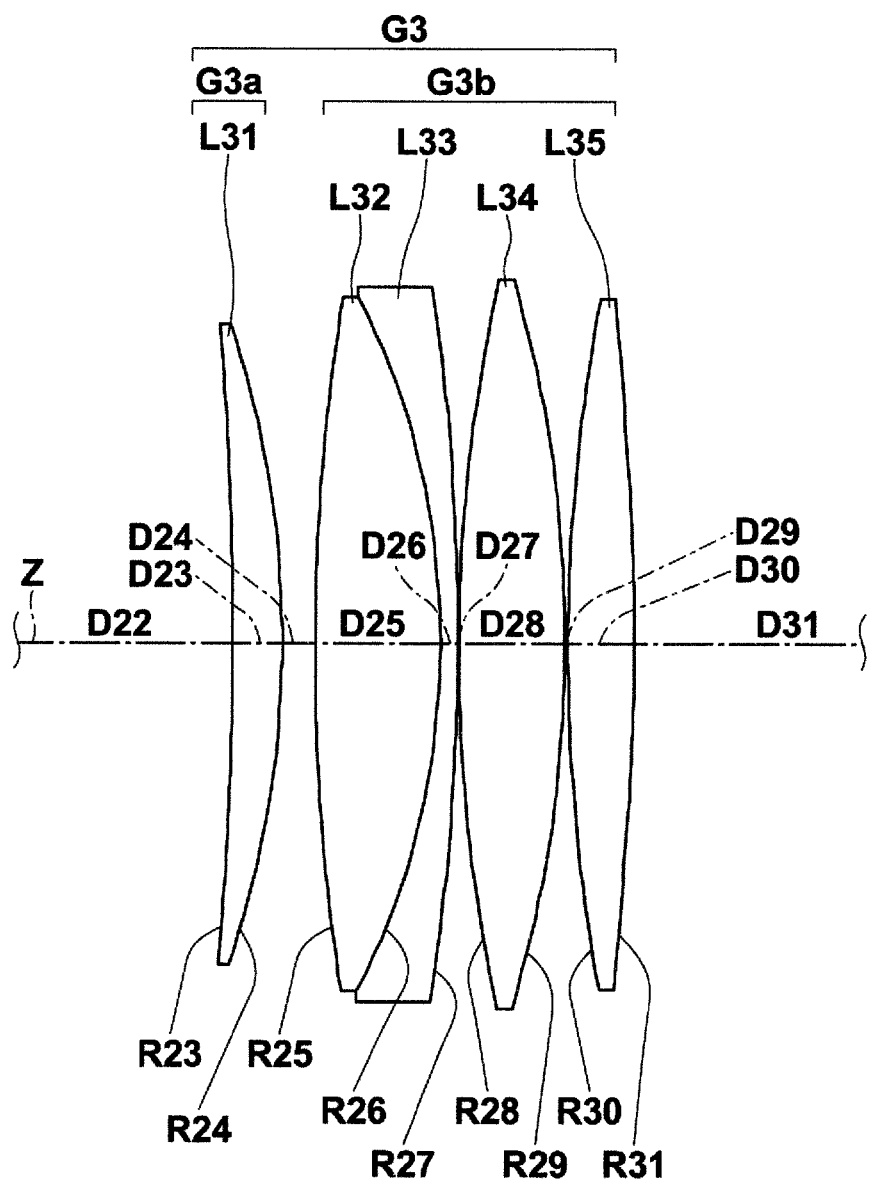
FIG. 20 is a cross-sectional view of the third lens group of the zoom lens according to Example 2 of the present invention, particularly illustrating a configuration thereof.
Figure 21:
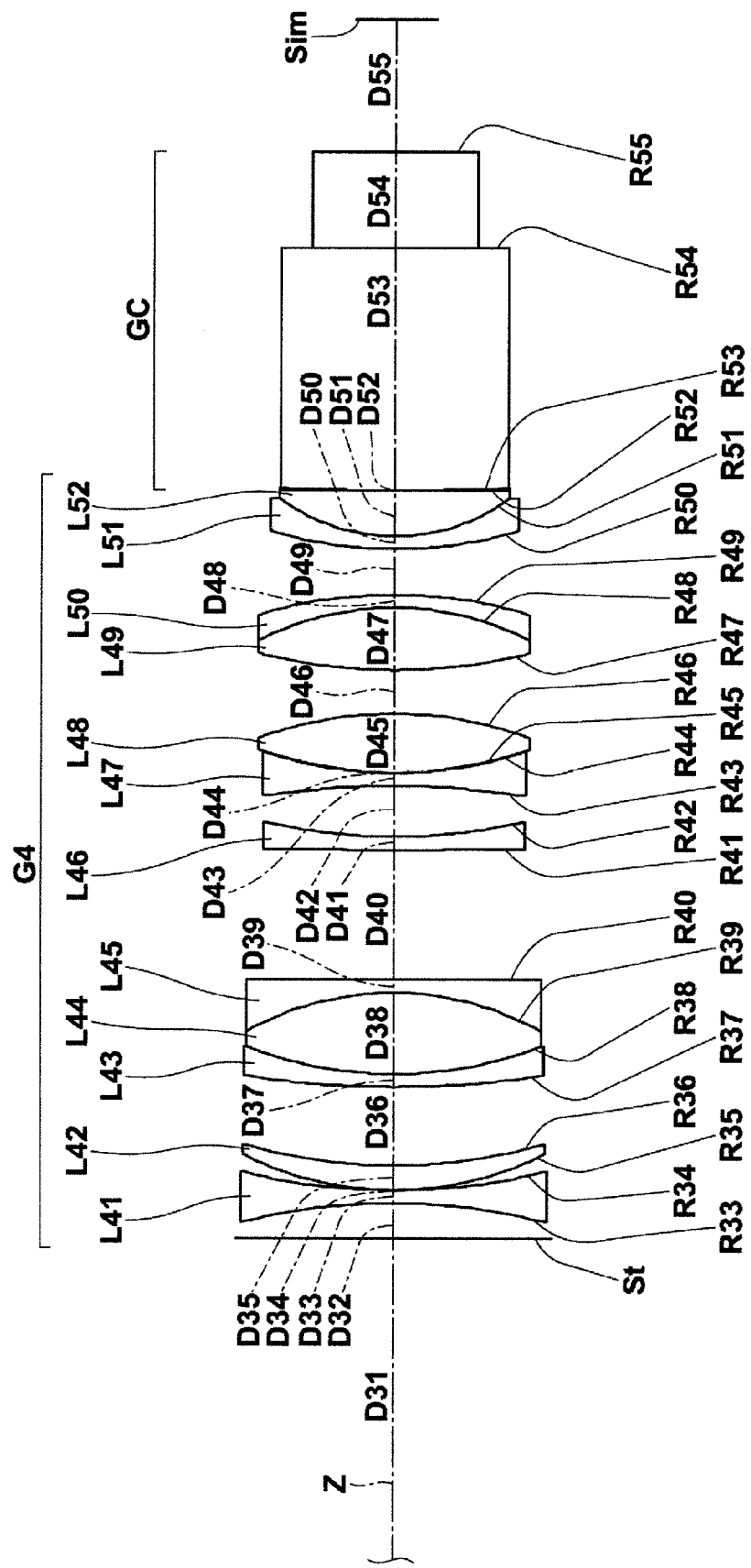
FIG. 21 is a cross-sectional view of the fourth lens group through the image formation surface of the zoom lens according to Example 2 of the present invention, particularly illustrating a configuration thereof.

The cross sectional view of lenses in Example 2 is shown in FIG. 2, and detailed configurations thereof are shown in FIGS. 19 through 21. FIG. 19 shows the detailed configuration of the first lens group G1 and the second lens group G2, FIG. 20 shows the detailed configuration of the third lens group G3, and FIG. 21 shows the detailed configuration from the fourth lens group G4 to the image formation surface Sim.

In Example 2, the first lens group G1 is of a five-lens configuration including lenses L1 through L5, the second-a lens group G2a which constitutes the second lens group G2 is of a six-lens configuration including L21 through L26, the second-b lens group G2b is of a one-lens configuration including a lens L27, the third-a lens group G3a which constitutes the third lens group G3 is of a one-lens configuration including a lens L31, the third-b lens group G3b is of a four-lens configuration including lenses L32 through L35, and the fourth lens group is of a twelve-lens configuration including an aperture stop St and lenses L41 through L52.

Lens data of the zoom lens according to Example 2 is shown in Table 4, the other data is shown in Table 5, and the aspherical surface coefficients are shown in Table 6. In Example 2, the distance between the third-b lens group G3b and the fourth lens group G4 is D31, which is indicated as DD[31], meaning that this distance is variable.

TABLE 4

Example 2/Lens Data

| Si | Ri | Di | ndj | νdi | θ g, fj |
|---|---|---|---|---|---|
| 1 | −24990.6438 | 4.40 | 1.80440 | 39.59 | 0.57297 |
| 2 | 338.7415 | 1.80 | | | |
| 3 | 334.8764 | 27.84 | 1.43387 | 95.20 | 0.53733 |
| 4 | −514.3550 | 28.43 | | | |
| 5 | 348.6049 | 20.80 | 1.43387 | 95.20 | 0.53733 |
| 6 | −1261.5823 | 0.10 | | | |
| 7 | 228.1998 | 19.13 | 1.43387 | 95.20 | 0.53733 |
| 8 | 994.3564 | 0.98 | | | |
| 9 | 196.8548 | 12.36 | 1.43875 | 94.93 | 0.53433 |
| 10 | 355.3698 | DD[10] | | | |
| *11 | 22492.6811 | 1.80 | 1.90366 | 31.32 | 0.59481 |
| 12 | −11034.3063 | 0.11 | | | |
| 13 | −1867.9235 | 1.80 | 2.00100 | 29.13 | 0.59952 |
| 14 | 52.2998 | 5.48 | | | |
| 15 | −195.1160 | 1.75 | 1.81600 | 46.62 | 0.55682 |
| 16 | 47.7113 | 9.16 | 1.80809 | 22.76 | 0.63073 |
| 17 | −68.5316 | 1.21 | | | |
| 18 | −49.3654 | 4.24 | 1.92286 | 18.90 | 0.64960 |
| 19 | −31.7728 | 1.75 | 1.88300 | 40.76 | 0.56679 |
| 20 | 79.4738 | DD[20] | | | |
| *21 | 180.1233 | 3.96 | 1.43875 | 94.93 | 0.53433 |
| 22 | −253.8428 | DD[22] | | | |
| 23 | −449.2918 | 5.93 | 1.49700 | 81.54 | 0.53748 |
| 24 | −117.2616 | DD[24] | | | |

TABLE 4-continued

Example 2/Lens Data

| Si | Ri | Di | ndj | νdi | θ g, fj |
|---|---|---|---|---|---|
| 25 | 259.6259 | 14.92 | 1.56908 | 71.30 | 0.54530 |
| 26 | −90.0753 | 2.00 | 1.84666 | 23.78 | 0.62054 |
| 27 | −289.8374 | 0.10 | | | |
| 28 | 199.3276 | 12.59 | 1.59522 | 67.74 | 0.54426 |
| 29 | −155.5210 | 0.37 | | | |
| 30 | 225.3173 | 7.82 | 1.43875 | 94.93 | 0.53433 |
| *31 | −269.5065 | DD[31] | | | |
| 32(Stop) | ∞ | 4.85 | | | |
| 33 | −85.6715 | 1.80 | 1.77250 | 49.60 | 0.55212 |
| 34 | 84.7769 | 0.01 | | | |
| 35 | 45.5871 | 3.36 | 1.48749 | 70.23 | 0.53007 |
| 36 | 73.1931 | 10.69 | | | |
| 37 | 131.5986 | 1.81 | 1.80400 | 46.58 | 0.55730 |
| 38 | 56.5934 | 11.08 | 1.80518 | 25.43 | 0.61027 |
| 39 | −40.8813 | 1.80 | 1.88300 | 40.76 | 0.56679 |
| 40 | −1868.5644 | 17.60 | | | |
| 41 | 1242.7357 | 1.80 | 1.48749 | 70.23 | 0.53007 |
| 42 | 74.9502 | 6.92 | | | |
| 43 | −119.9992 | 1.80 | 1.88300 | 40.76 | 0.56679 |
| 44 | 57.5304 | 0.01 | | | |
| 45 | 56.8065 | 7.98 | 1.59522 | 67.74 | 0.54426 |
| 46 | −53.3329 | 5.91 | | | |
| 47 | 75.2641 | 8.54 | 1.60300 | 65.44 | 0.54022 |
| 48 | −40.7288 | 1.80 | 1.84666 | 23.78 | 0.62054 |
| 49 | −63.1718 | 6.17 | | | |
| 50 | 58.5685 | 1.80 | 1.88300 | 40.76 | 0.56679 |
| 51 | 26.9873 | 6.22 | 1.51633 | 64.14 | 0.53531 |
| 52 | 447.2821 | 0.00 | | | |
| 53 | ∞ | 33.00 | 1.60863 | 46.60 | 0.56787 |
| 54 | ∞ | 13.20 | 1.51633 | 64.14 | 0.53531 |
| 55 | ∞ | 18.02 | | | |

TABLE 5

Example 2/Other Data

| | Wide Angle | Intermediate | Telephoto |
|---|---|---|---|
| Zoom Ratio | 1.0 | 3.0 | 110.0 |
| f | 8.45 | 25.35 | 929.39 |
| Bf | 47.24 | 47.24 | 47.24 |
| FNo. | 1.76 | 1.76 | 4.85 |
| 2ω [*] | 69.0 | 23.4 | 0.6 |
| DD[10] | 1.75 | 82.51 | 192.44 |
| DD[20] | 6.81 | 2.45 | 3.96 |
| DD[22] | 283.24 | 142.85 | 0.95 |
| DD[24] | 3.82 | 51.33 | 0.99 |
| DD[31] | 0.97 | 17.44 | 98.25 |

TABLE 6

Example 2/Aspherical Surface Coefficient

| Surface Number | 11 | 21 | 31 |
|---|---|---|---|
| KA | −2.6115197E+00 | 9.7787837E+01 | −7.2460702E+01 |
| A3 | −2.3491619E−06 | 1.4807564E−05 | 8.8796690E−07 |
| A4 | 1.9999604E−06 | −2.4854459E−06 | −3.5279059E−07 |
| A5 | −4.9658964E−07 | 8.4719723E−07 | 2.4524433E−08 |
| A6 | 7.0270619E−08 | −9.3540950E−08 | −1.5696037E−09 |
| A7 | −5.5930423E−09 | 5.8189682E−09 | 7.5332586E−11 |
| A8 | 2.5826210E−10 | −2.1190610E−10 | −1.9946721E−12 |
| A9 | −6.3948162E−12 | 4.1073674E−12 | 2.7096030E−14 |
| A10 | 6.5493910E−14 | −3.3639856E−14 | −1.4850806E−16 |

Example 3

Figure 3:
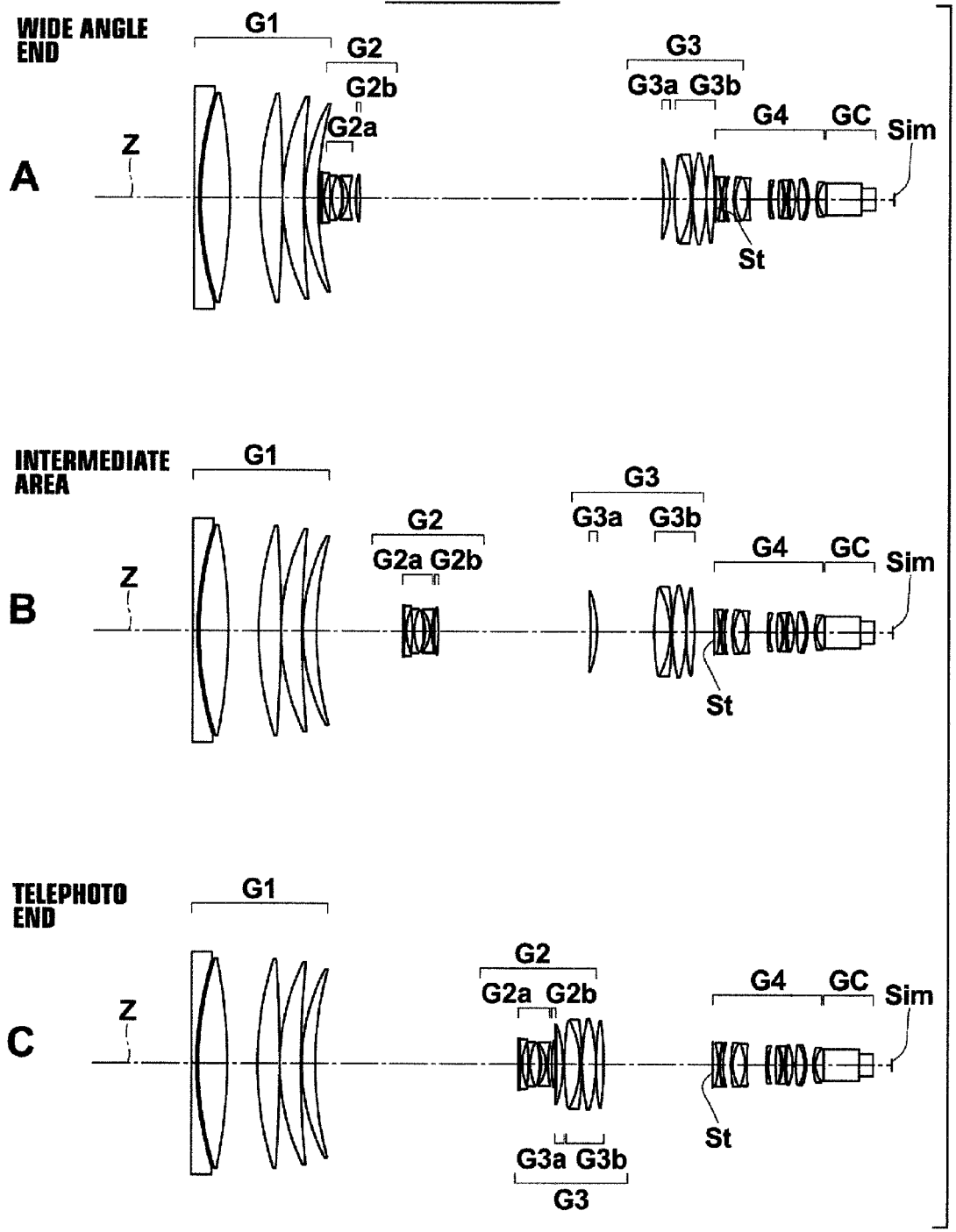
FIG. 3 is a collection of cross-sectional views of a zoom lens according to Example 3 of the present invention.
Figure 22:
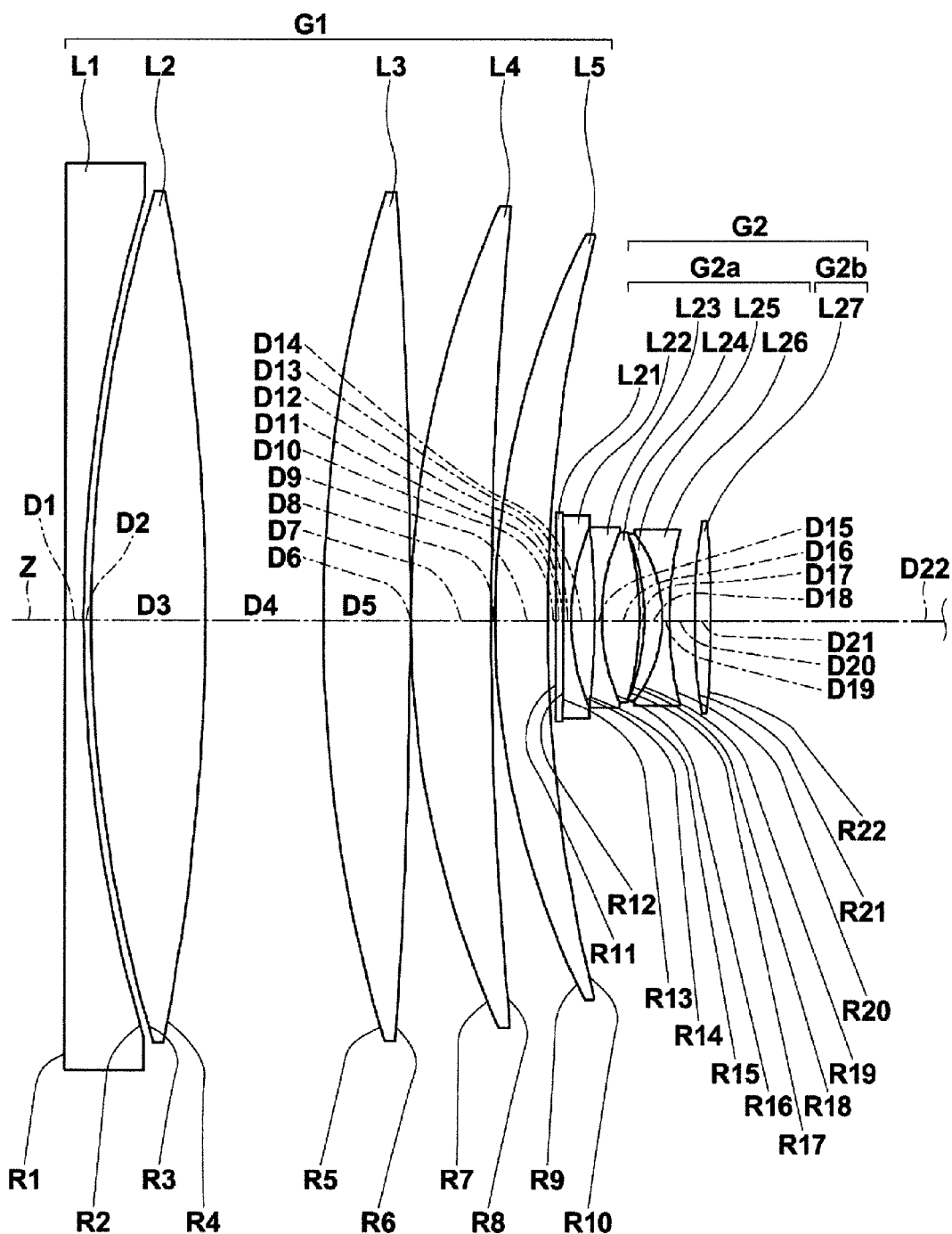
FIG. 22 is a cross-sectional view of the first lens group and the second lens group of the zoom lens according to Example 3 of the present invention, particularly illustrating a configuration thereof.
Figure 23:
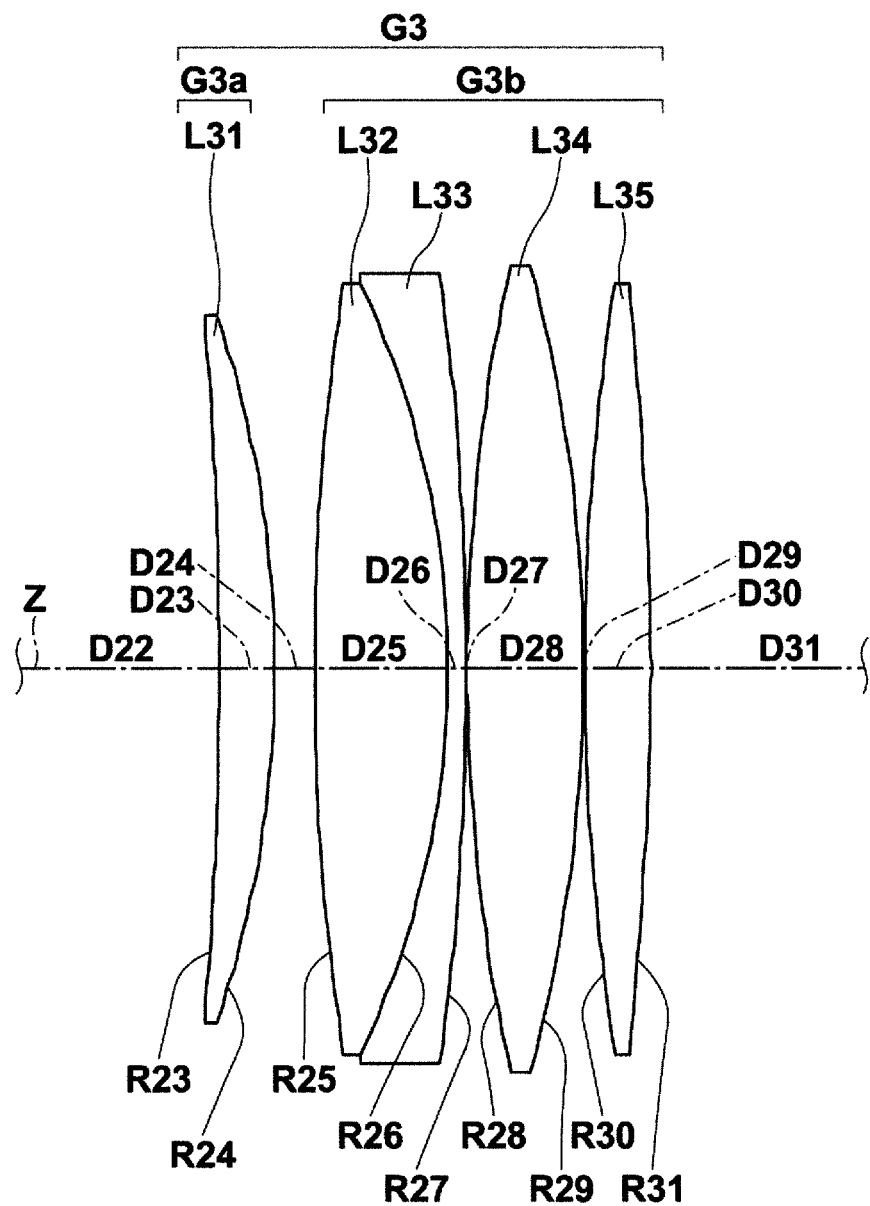
FIG. 23 is a cross-sectional view of the third lens group of the zoom lens according to Example 3 of the present invention, particularly illustrating a configuration thereof.
Figure 24:
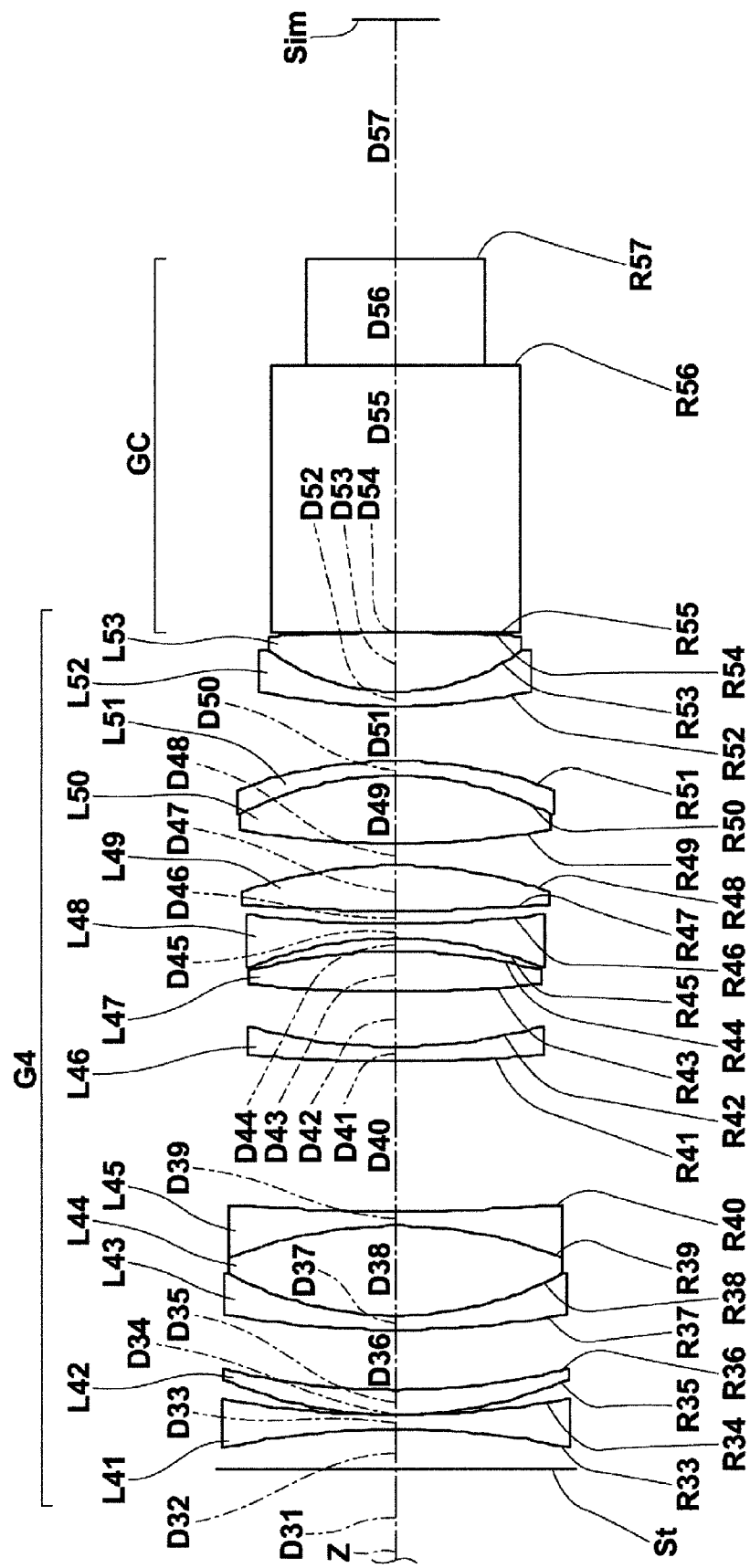
FIG. 24 is a cross-sectional view of the fourth lens group through the image formation surface of the zoom lens according to Example 3 of the present invention, particularly illustrating a configuration thereof.

The cross sectional view of lenses in Example 3 is shown in FIG. 3, and detailed configurations thereof are shown in FIGS. 22 through 24. FIG. 22 shows the detailed configuration of the first lens group G1 and the second lens group G2, FIG. 23 shows the detailed configuration of the third lens group G3, and FIG. 24 shows the detailed configuration from the fourth lens group G4 to the image formation surface Sim.

In Example 3, the first lens group G1 is of a five-lens configuration including lenses L1 through L5, the second-a lens group G2a which constitutes the second lens group G2 is of a six-lens configuration including L21 through L26, the second-b lens group G2b is of a one-lens configuration including a lens L27, the third-a lens group G3a which constitutes the third lens group G3 is of a one-lens configuration including a lens L31, the third-b lens group G3b is of a four-lens configuration including lenses L32 through L35, and the fourth lens group G4 is of a thirteen-lens configuration including an aperture stop St and lenses L41 through L53.

Lens data of the zoom lens according to Example 3 is shown in Table 7, the other data is shown in Table 8, and the aspherical surface coefficients are shown in Table 9. In Example 3, the distance between the third-b lens group G3b and the fourth lens group G4 is D31, which is indicated as DD[31], meaning that this distance is variable.

TABLE 7

Example 3/Lens Data

| Si | Ri | Di | ndj | ν dj | θ g, fj |
|---|---|---|---|---|---|
| 1 | −35744.6283 | 4.40 | 1.80440 | 39.59 | 0.57297 |
| 2 | 335.2922 | 1.80 | | | |
| 3 | 331.5461 | 27.51 | 1.43387 | 95.20 | 0.53733 |
| 4 | −499.8278 | 28.29 | | | |
| 5 | 341.0130 | 20.77 | 1.43387 | 95.20 | 0.53733 |
| 6 | −1391.3768 | 0.10 | | | |
| 7 | 226.0039 | 19.45 | 1.43387 | 95.20 | 0.53733 |
| 8 | 1000.4569 | 0.98 | | | |
| 9 | 196.4460 | 12.48 | 1.43875 | 94.93 | 0.53433 |
| 10 | 357.6122 | DD[10] | | | |
| *11 | 21939.9923 | 1.80 | 1.90366 | 31.32 | 0.59481 |
| 12 | −3753.9746 | 0.10 | | | |
| 13 | −1425.4956 | 1.80 | 2.00100 | 29.13 | 0.59952 |
| 14 | 51.3158 | 5.61 | | | |
| 15 | −188.8462 | 1.75 | 1.81600 | 46.62 | 0.55682 |
| 16 | 48.4713 | 8.98 | 1.80809 | 22.76 | 0.63073 |
| 17 | −69.5497 | 1.25 | | | |
| 18 | −49.4094 | 4.31 | 1.92286 | 18.90 | 0.64960 |
| 19 | −31.5165 | 1.75 | 1.88300 | 40.76 | 0.56679 |
| 20 | 83.3385 | DD[20] | | | |
| *21 | 177.4843 | 4.03 | 1.43875 | 94.93 | 0.53433 |
| 22 | −235.1618 | DD[22] | | | |
| 23 | −443.0062 | 6.12 | 1.49700 | 81.54 | 0.53748 |
| 24 | −115.7402 | DD[24] | | | |
| 25 | 260.5767 | 14.71 | 1.56908 | 71.30 | 0.54530 |
| 26 | −93.4413 | 2.00 | 1.84666 | 23.78 | 0.62054 |
| 27 | −312.5029 | 0.10 | | | |
| 28 | 198.4817 | 12.82 | 1.59522 | 67.74 | 0.54426 |
| 29 | −159.6940 | 0.10 | | | |
| 30 | 254.1820 | 7.32 | 1.43875 | 94.93 | 0.53433 |
| *31 | −261.6537 | DD[31] | | | |
| 32(Stop) | ∞ | 4.87 | | | |
| 33 | −96.0862 | 1.80 | 1.88300 | 40.76 | 0.56679 |
| 34 | 113.1374 | 0.01 | | | |
| 35 | 51.4332 | 3.04 | 1.48749 | 70.23 | 0.53007 |
| 36 | 81.4590 | 7.49 | | | |
| 37 | 110.3434 | 1.80 | 1.80400 | 46.58 | 0.55730 |
| 38 | 41.8983 | 11.12 | 1.80518 | 25.43 | 0.61027 |
| 39 | −52.9503 | 1.80 | 1.83481 | 42.71 | 0.56431 |
| 40 | 241.6775 | 18.57 | | | |
| 41 | 205.3549 | 1.80 | 1.48749 | 70.23 | 0.53007 |
| 42 | 63.7577 | 6.80 | | | |
| 43 | 157.4383 | 5.03 | 1.59522 | 67.74 | 0.54426 |
| 44 | −65.0364 | 1.61 | | | |
| 45 | −44.3152 | 1.80 | 1.88300 | 40.76 | 0.56679 |
| 46 | 141.9434 | 1.61 | | | |
| 47 | 220.6150 | 5.60 | 1.57250 | 57.74 | 0.54568 |
| 48 | −54.1615 | 2.70 | | | |
| 49 | 100.7099 | 8.37 | 1.61800 | 63.33 | 0.54414 |
| 50 | −39.4012 | 1.80 | 2.00069 | 25.46 | 0.61364 |
| 51 | −53.3025 | 6.70 | | | |
| 52 | 69.7009 | 1.89 | 1.88300 | 40.76 | 0.56679 |
| 53 | 25.5162 | 7.31 | 1.51633 | 64.14 | 0.53531 |
| 54 | −267.1571 | 0.00 | | | |
| 55 | ∞ | 33.00 | 1.60863 | 46.60 | 0.56787 |
| 56 | ∞ | 13.20 | 1.51633 | 64.14 | 0.53531 |
| 57 | ∞ | 17.40 | | | |

TABLE 8

Example 3/Other Data

| | Wide Angle | Intermediate | Telephoto |
|---|---|---|---|
| Zoom Ratio | 1.0 | 3.0 | 110.0 |
| f' | 8.50 | 25.49 | 934.46 |
| Bf | 46.62 | 46.62 | 46.62 |
| FNo. | 1.76 | 1.76 | 4.86 |
| 2ω [*] | 68.4 | 23.4 | 0.6 |
| DD[10] | 1.74 | 80.27 | 189.18 |
| DD[20] | 6.01 | 2.28 | 3.57 |
| DD[22] | 283.04 | 141.97 | 0.95 |
| DD[24] | 4.40 | 53.18 | 0.99 |
| DD[31] | 0.95 | 18.44 | 101.44 |

TABLE 9

Example 3/Aspherical Surface Coefficient

| Surface Number | 11 | 21 | 31 |
|---|---|---|---|
| KA | −2.6762488E+08 | 3.7690327E+01 | −7.0132028E+01 |
| A3 | 2.3006715E−07 | 1.3330602E−05 | 4.1140128E−07 |
| A4 | 1.0407436E−06 | −3.1936050E−06 | −2.7656413E−07 |
| A5 | −2.7773495E−07 | 1.0943485E−06 | 9.1988855E−09 |
| A6 | 3.8782708E−08 | −1.3038095E−07 | −4.1961159E−10 |
| A7 | −2.9413945E−09 | 8.8433197E−09 | 2.7277986E−11 |
| A8 | 1.3020247E−10 | −3.5553306E−10 | −8.4056994E−13 |
| A9 | −3.1190884E−12 | 7.7954988E−12 | 1.2242426E−14 |
| A10 | 3.1234166E−14 | −7.3468505E−14 | −6.9368806E−17 |

Example 4

Figure 4:
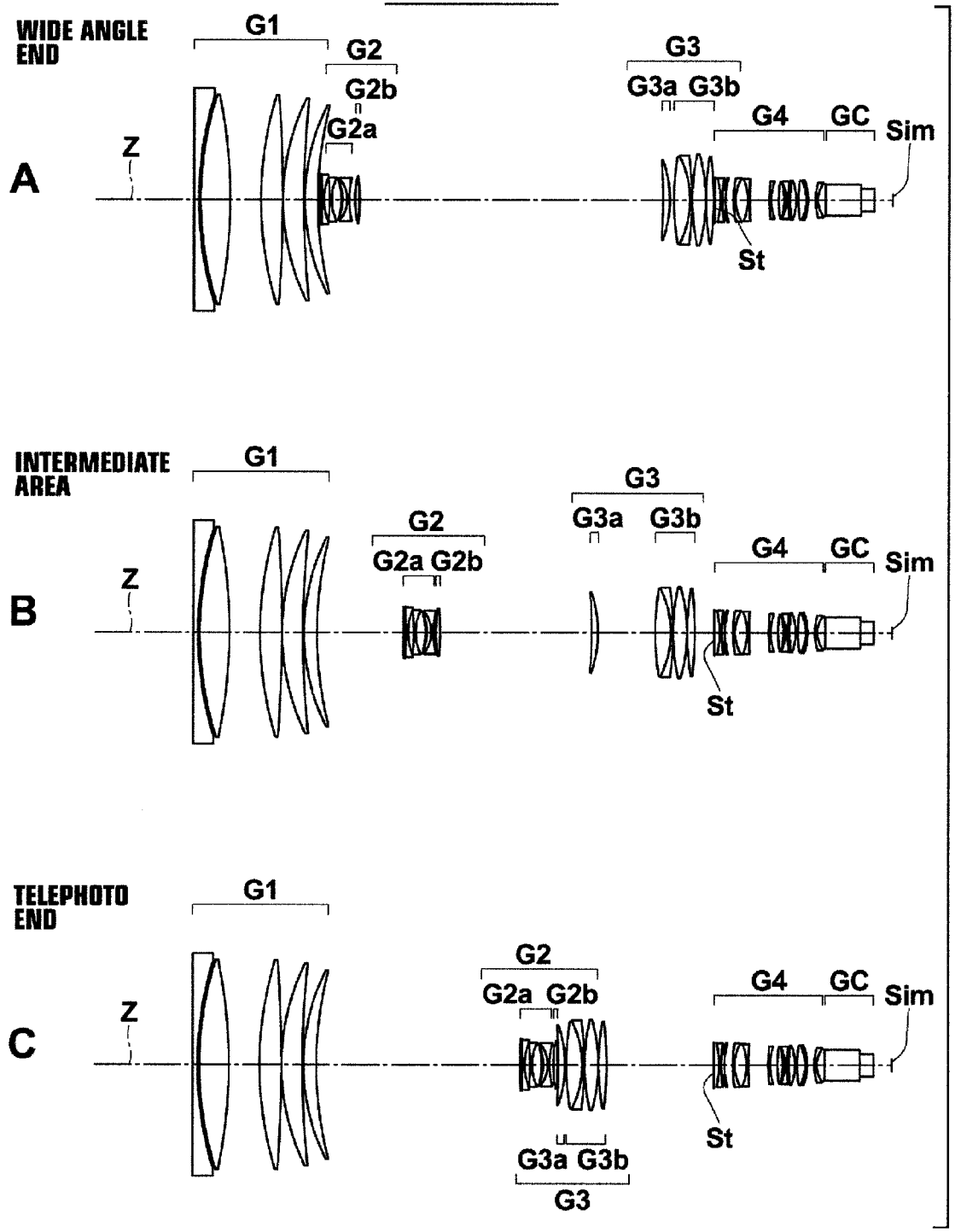
FIG. 4 is a collection of cross-sectional views of a zoom lens according to Example 4 of the present invention.
Figure 25:
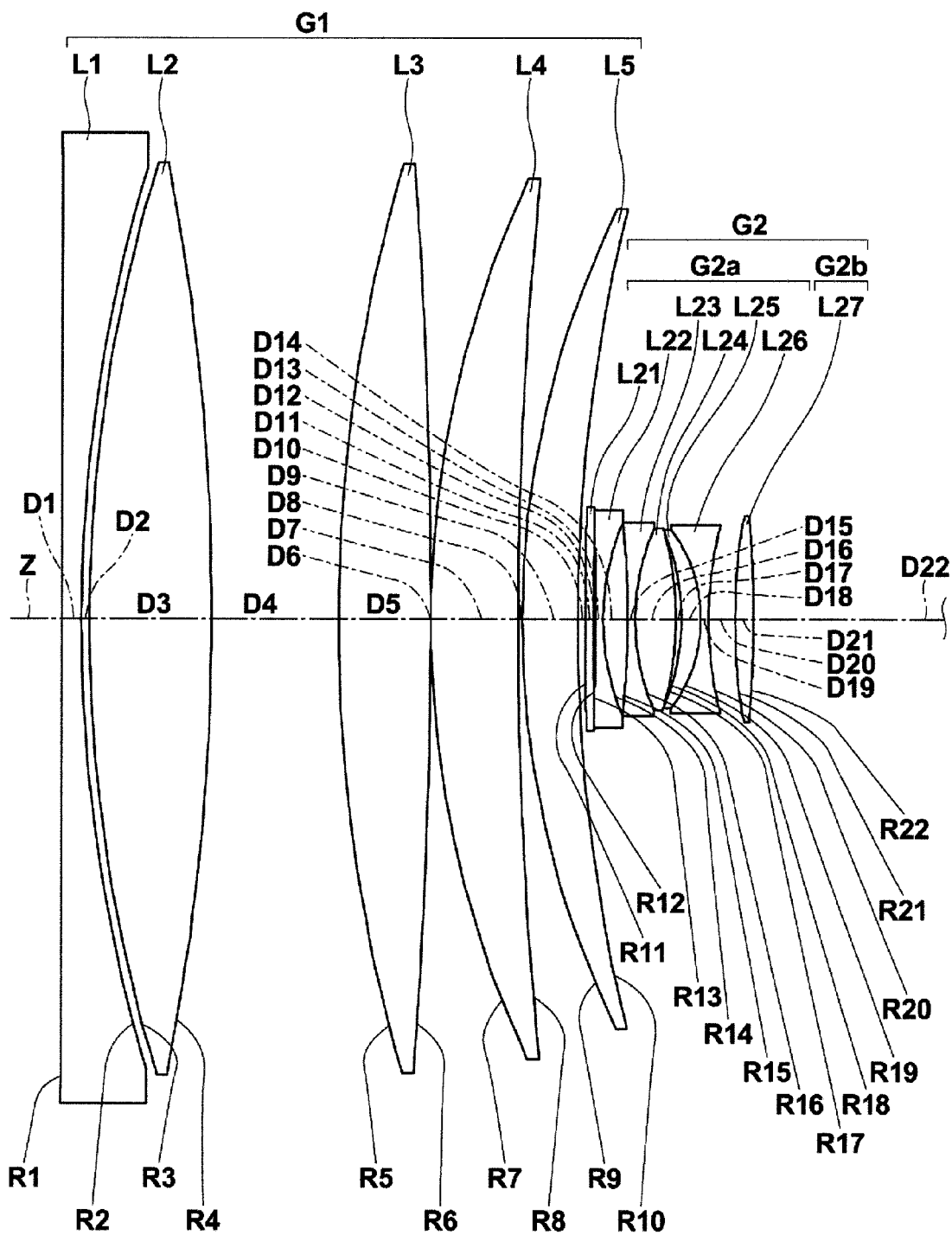
FIG. 25 is a cross-sectional view of the first lens group and the second lens group of the zoom lens according to Example 4 of the present invention, particularly illustrating a configuration thereof.
Figure 26:
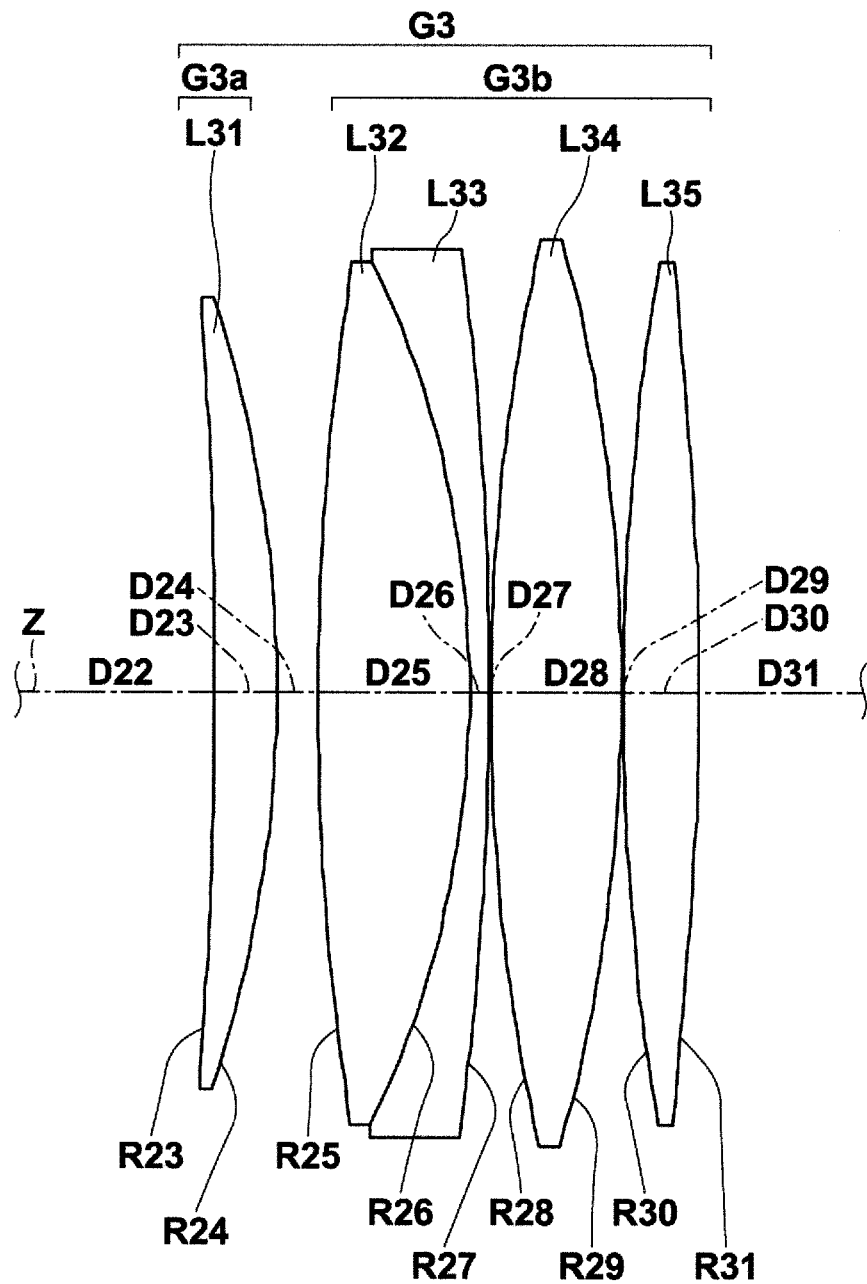
FIG. 26 is a cross-sectional view of the third lens group of the zoom lens according to Example 4 of the present invention, particularly illustrating a configuration thereof.
Figure 27:
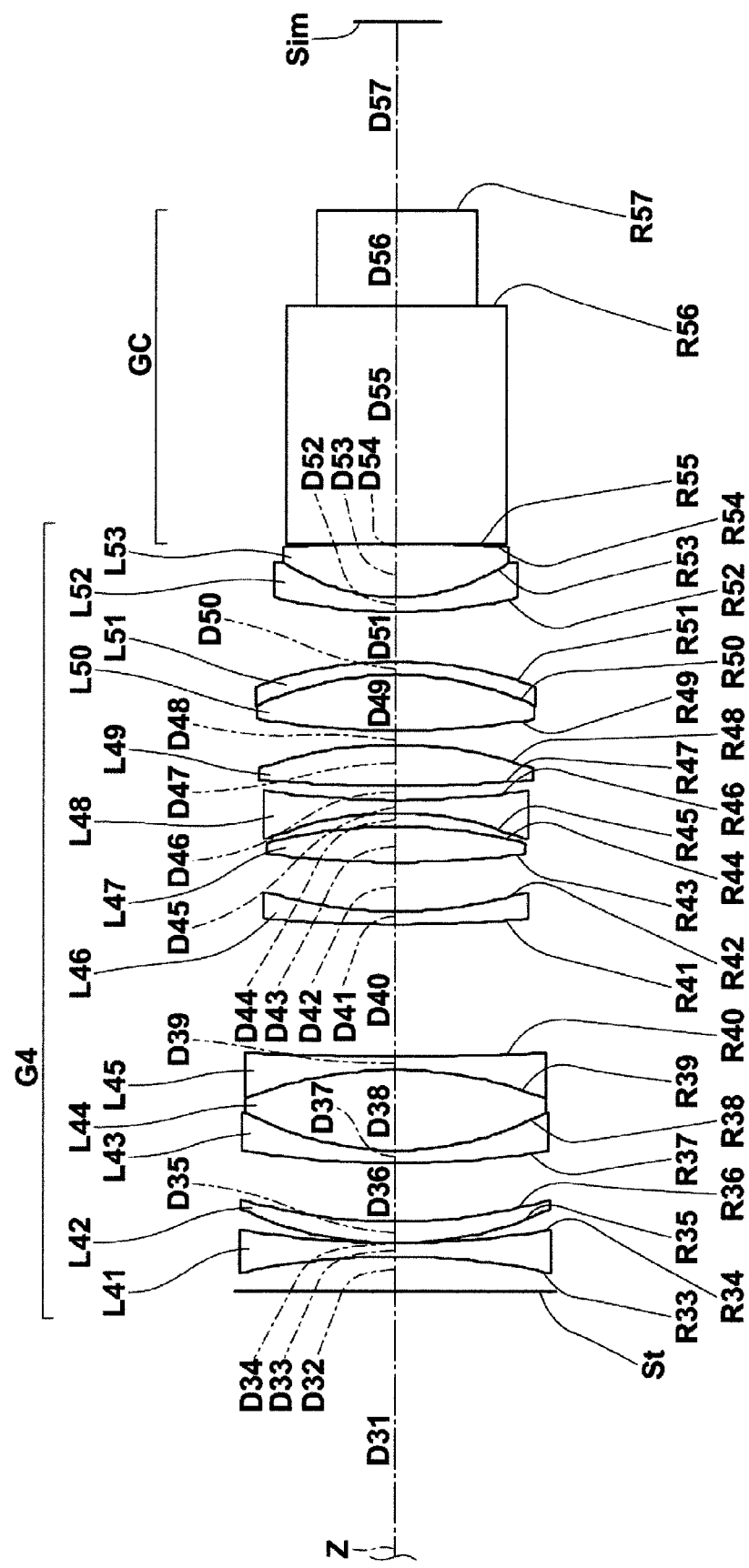
FIG. 27 is a cross-sectional view of the fourth lens group through the image formation surface of the zoom lens according to Example 4 of the present invention, particularly illustrating a configuration thereof.

The cross sectional view of lenses in Example 4 is shown in FIG. 4, and detailed configurations thereof are shown in FIGS. 25 through 27. FIG. 25 shows the detailed configuration of the first lens group G1 and the second lens group G2, FIG. 26 shows the detailed configuration of the third lens group G3, and FIG. 27 shows the detailed configuration from the fourth lens group G4 to the image formation surface Sim.

In Example 4, the first lens group G1 is of a five-lens configuration including lenses L1 through L5, the second-a lens group G2a which constitutes the second lens group G2 is of a six-lens configuration including L21 through L26, the second-b lens group G2b is of a one-lens configuration including a lens L27, the third-a lens group G3a which constitutes the third lens group G3 is of a one-lens configuration including a lens L31, the third-b lens group G3b is of a four-lens configuration including lenses L32 through L35, and the fourth lens group is of a thirteen-lens configuration including an aperture stop St and lenses L41 through L53.

Lens data of the zoom lens according to Example 4 is shown in Table 10, the other data is shown in Table 11, and the aspherical surface coefficients are shown in Table 12. In Example 4, the distance between the third-b lens group G3b and the fourth lens group G4 is D31, which is indicated as DD[31], meaning that this distance is variable.

TABLE 10

Example 4/Lens Data

| Si | Ri | Di | ndj | νdi | θ g, fj |
|---|---|---|---|---|---|
| 1 | −32015.9173 | 4.40 | 1.80440 | 39.59 | 0.57297 |
| 2 | 336.8320 | 1.80 | | | |
| 3 | 332.5927 | 27.27 | 1.43387 | 95.20 | 0.53733 |
| 4 | −502.5472 | 28.42 | | | |
| 5 | 349.1751 | 20.67 | 1.43387 | 95.20 | 0.53733 |
| 6 | −1298.2928 | 0.10 | | | |
| 7 | 223.1977 | 19.40 | 1.43387 | 95.20 | 0.53733 |
| 8 | 940.4607 | 0.98 | | | |
| 9 | 199.0850 | 12.36 | 1.43875 | 94.93 | 0.53433 |
| 10 | 363.7214 | DD[10] | | | |
| *11 | 23509.3029 | 1.80 | 1.90366 | 31.32 | 0.59481 |
| 12 | 5891.7196 | 1.30 | | | |
| 13 | −1061.8625 | 1.80 | 2.00100 | 29.13 | 0.59952 |
| 14 | 52.4133 | 5.44 | | | |
| 15 | −200.4391 | 1.75 | 1.81600 | 46.62 | 0.55682 |
| 16 | 48.5837 | 9.04 | 1.80809 | 22.76 | 0.63073 |
| 17 | −68.4975 | 1.22 | | | |
| 18 | −49.3168 | 4.31 | 1.92286 | 18.90 | 0.64960 |
| 19 | −31.5053 | 1.75 | 1.88300 | 40.76 | 0.56679 |
| 20 | 82.3336 | DD[20] | | | |
| *21 | 171.1337 | 4.02 | 1.43875 | 94.93 | 0.53433 |
| 22 | −250.1523 | DD[22] | | | |
| 23 | −462.5572 | 6.09 | 1.49700 | 81.54 | 0.53748 |
| 24 | −117.5227 | DD[24] | | | |
| 25 | 257.6738 | 14.81 | 1.56908 | 71.30 | 0.54530 |
| 26 | −93.1536 | 2.00 | 1.84666 | 23.78 | 0.62054 |
| 27 | −314.7733 | 0.10 | | | |
| 28 | 197.3359 | 12.93 | 1.59522 | 67.74 | 0.54426 |
| 29 | −158.3528 | 0.10 | | | |
| 30 | 247.4120 | 7.44 | 1.43875 | 94.93 | 0.53433 |
| *31 | −257.9750 | DD[31] | | | |
| 32(Stop) | ∞ | 4.84 | | | |
| 33 | −94.9719 | 1.80 | 1.88300 | 40.76 | 0.56679 |
| 34 | 113.4234 | 0.01 | | | |
| 35 | 48.8699 | 3.01 | 1.48749 | 70.23 | 0.53007 |
| 36 | 73.8980 | 8.09 | | | |
| 37 | 120.5472 | 1.80 | 1.80400 | 46.58 | 0.55730 |
| 38 | 41.8711 | 11.16 | 1.80518 | 25.43 | 0.61027 |
| 39 | −52.9094 | 1.80 | 1.83481 | 42.71 | 0.56431 |
| 40 | 357.4230 | 18.34 | | | |
| 41 | 201.9901 | 1.80 | 1.48749 | 70.23 | 0.53007 |
| 42 | 59.9549 | 6.79 | | | |
| 43 | 135.0658 | 4.94 | 1.59522 | 67.74 | 0.54426 |
| 44 | −67.9311 | 1.88 | | | |
| 45 | −43.3067 | 1.80 | 1.88300 | 40.76 | 0.56679 |
| 46 | 129.7059 | 2.02 | | | |
| 47 | 240.5183 | 5.54 | 1.61772 | 49.81 | 0.56035 |
| 48 | −54.1477 | 2.00 | | | |
| 49 | 107.0202 | 7.66 | 1.59522 | 67.74 | 0.54426 |
| 50 | −42.8989 | 1.80 | 1.92286 | 18.90 | 0.64960 |
| 51 | −54.4586 | 6.90 | | | |
| 52 | 66.8428 | 2.05 | 1.88300 | 40.76 | 0.56679 |
| 53 | 26.3973 | 7.47 | 1.48749 | 70.23 | 0.53007 |
| 54 | −231.4198 | 0.00 | | | |
| 55 | ∞ | 33.00 | 1.60863 | 46.60 | 0.56787 |
| 56 | ∞ | 13.20 | 1.51633 | 64.14 | 0.53531 |
| 57 | ∞ | 17.13 | | | |

TABLE 11

Example 4/Other Data

| | Wide Angle | Intermediate | Telephoto |
|---|---|---|---|
| Zoom Ratio | 1.0 | 3.0 | 110.0 |
| f | 8.50 | 25.49 | 934.45 |
| Bf | 46.35 | 46.35 | 46.35 |

TABLE 11-continued

Example 4/Other Data

| | Wide Angle | Intermediate | Telephoto |
|---|---|---|---|
| FNo. | 1.76 | 1.76 | 4.87 |
| 2ω [*] | 68.6 | 23.4 | 0.6 |
| DD[10] | 1.71 | 80.82 | 190.43 |
| DD[20] | 6.00 | 2.27 | 3.61 |
| DD[22] | 283.73 | 141.97 | 0.96 |
| DD[24] | 4.10 | 53.22 | 0.99 |
| DD[31] | 0.96 | 18.20 | 100.49 |

TABLE 12

Example 4/Aspherical Surface Coefficient

| Surface Number | 11 | 21 | 31 |
|---|---|---|---|
| KA | −1.4937966E+08 | 3.9467435E+01 | −7.3045921E+01 |
| A3 | −2.5955130E−06 | 1.1896390E−05 | 5.3019870E−07 |
| A4 | 1.9393466E−06 | −2.3162542E−06 | −3.4907408E−07 |
| A5 | −4.1702086E−07 | 8.4266410E−07 | 1.5314013E−08 |
| A6 | 5.3554589E−08 | −1.0037148E−07 | −8.3503176E−10 |
| A7 | −3.9303974E−09 | 6.8426057E−09 | 4.6104747E−11 |
| A8 | 1.7050063E−10 | −2.8401432E−10 | −1.3273981E−12 |
| A9 | −4.0245615E−12 | 6.5991057E−12 | 1.8811278E−14 |
| A10 | 3.9814224E−14 | −6.8590093E−14 | −1.0541161E−16 |

Example 5

Figure 5:
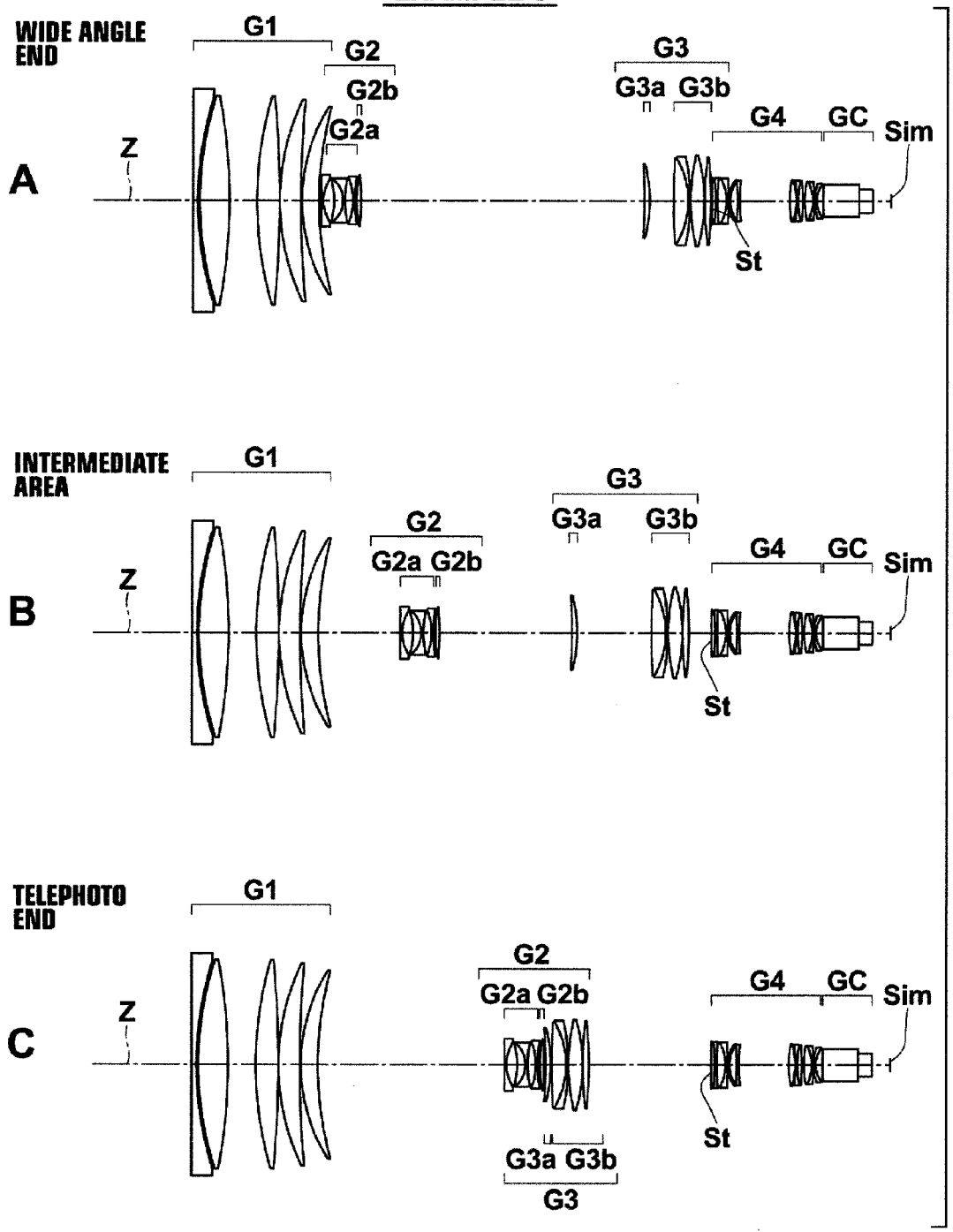
FIG. 5 is a collection of cross-sectional views of a zoom lens according to Example 5 of the present invention.
Figure 6:
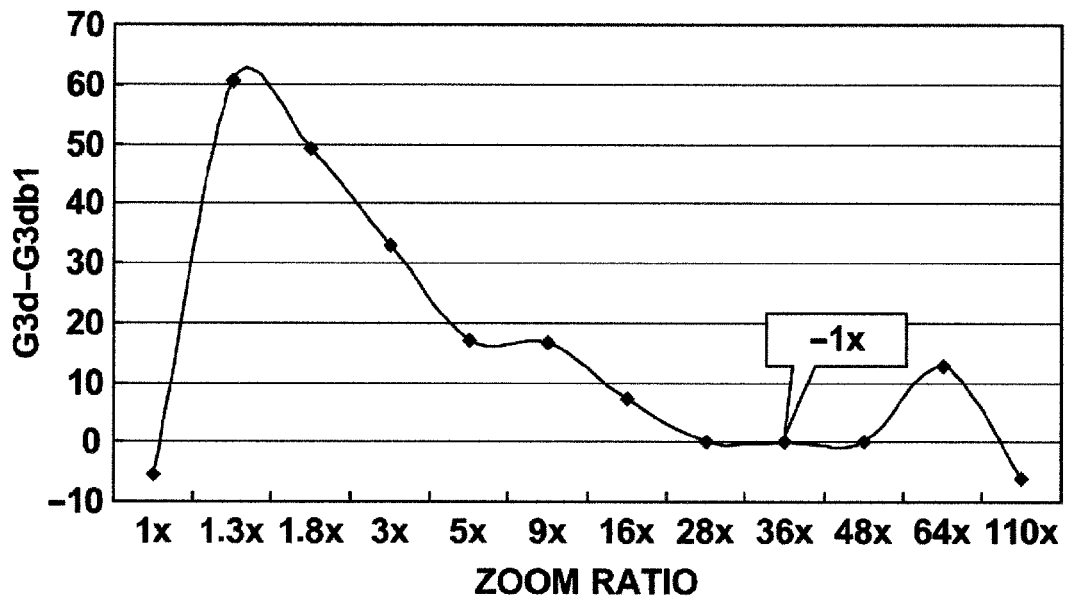
FIG. 6 is a diagram that illustrates the relationship between zoom ratios and the distances between the third-a lens group G3a and the third-b lens group G3b in the zoom lens according to Example 1 of the present invention.
Figure 7:
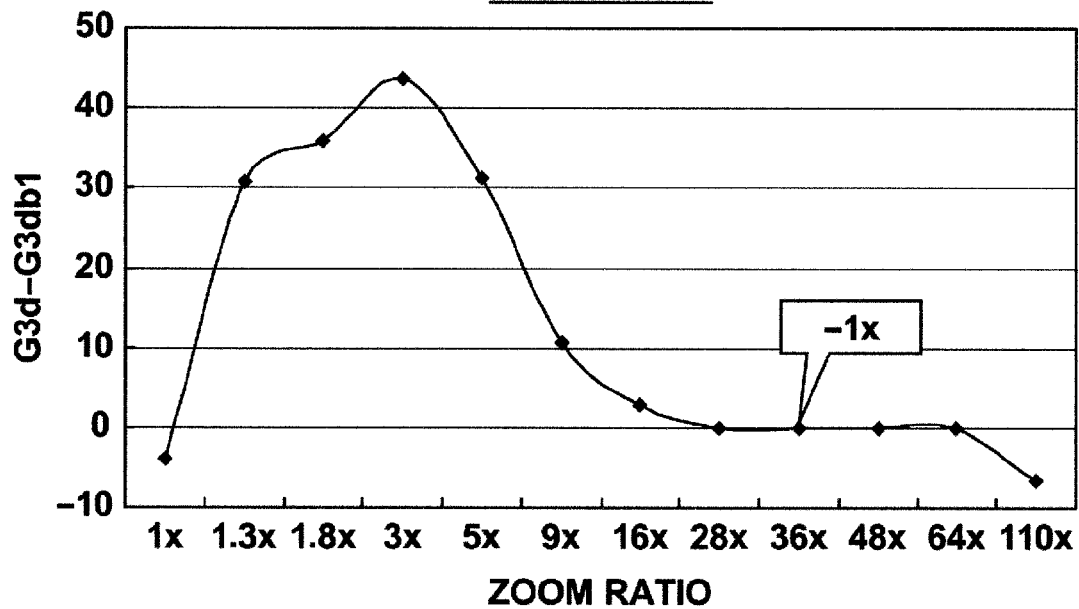
FIG. 7 is a diagram that illustrates the relationship between zoom ratios and the distances between the third-a lens group G3a and the third-b lens group G3b in the zoom lens according to Example 2 of the present invention.
Figure 8:
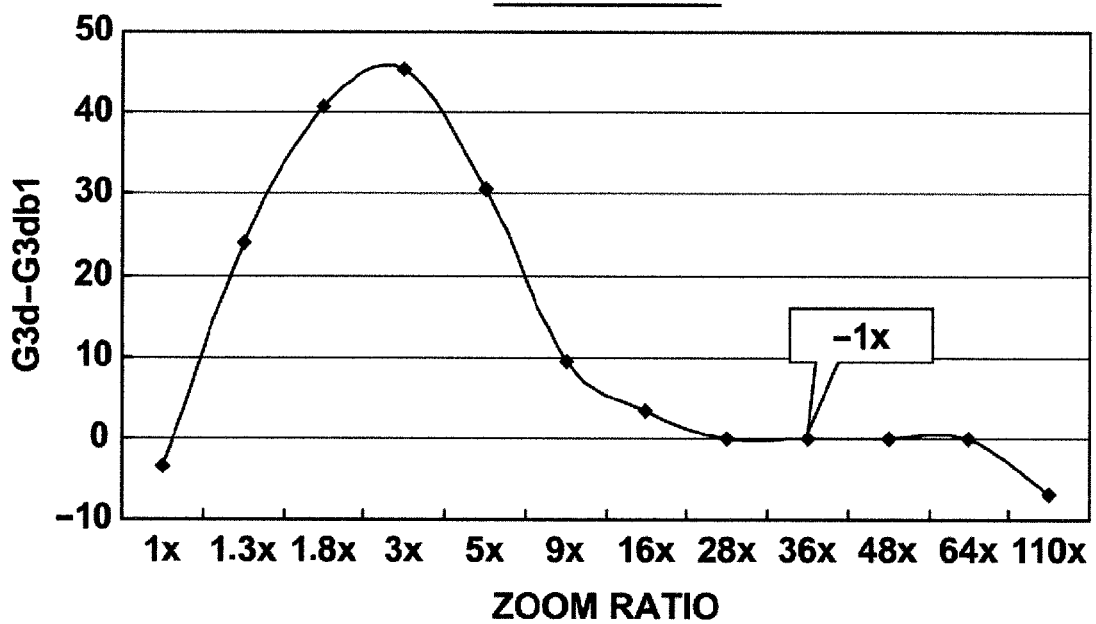
FIG. 8 is a diagram that illustrates the relationship between zoom ratios and the distances between the third-a lens group G3a and the third-b lens group G3b in the zoom lens according to Example 3 of the present invention.
Figure 9:
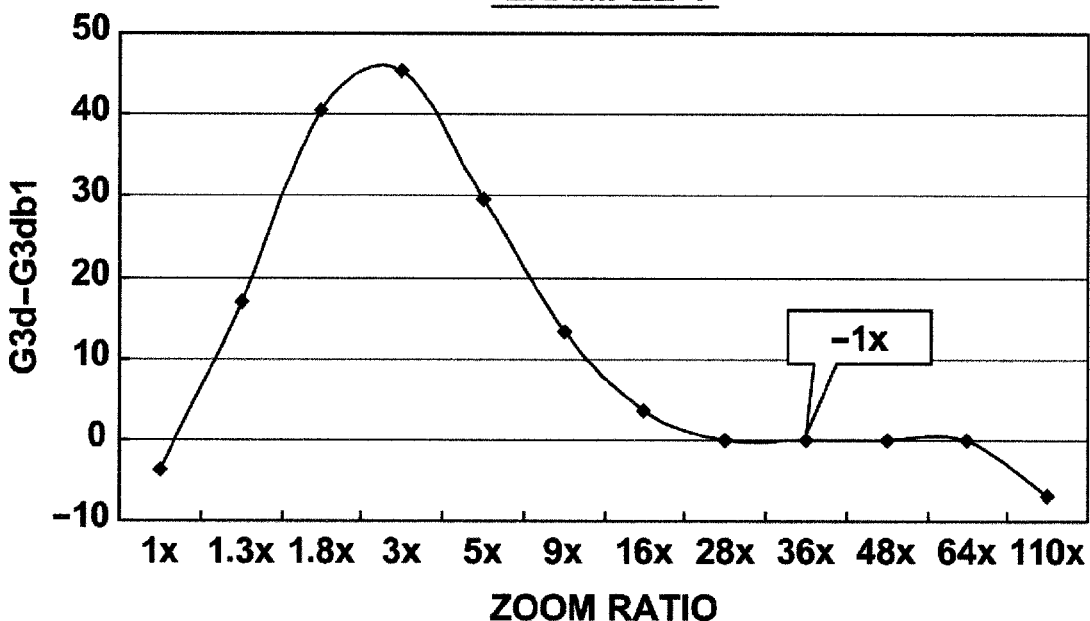
FIG. 9 is a diagram that illustrates the relationship between zoom ratios and the distances between the third-a lens group G3a and the third-b lens group G3b in the zoom lens according to Example 4 of the present invention.
Figure 10:
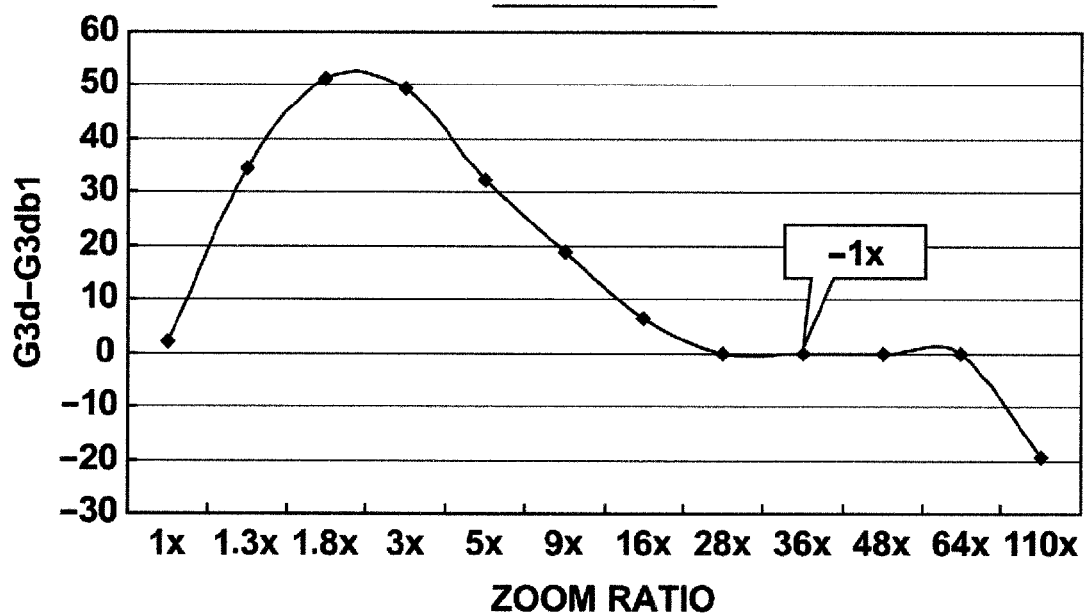
FIG. 10 is a diagram that illustrates the relationship between zoom ratios and the distances between the third-a lens group G3a and the third-b lens group G3b in the zoom lens according to Example 5 of the present invention.
Figure 11:
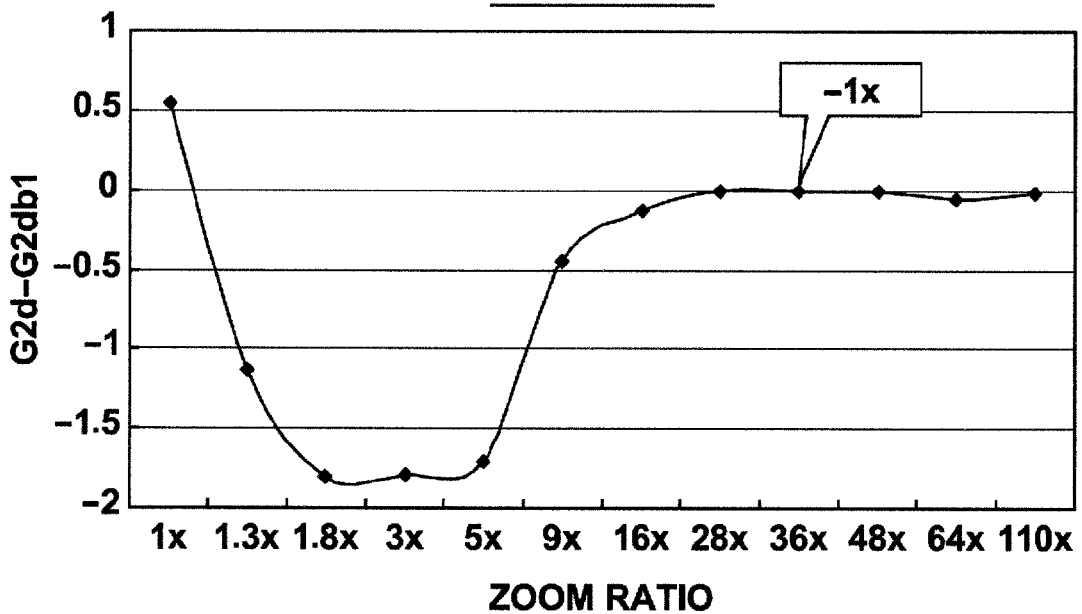
FIG. 11 is a diagram that illustrates the relationship between zoom ratios and the distances between the second-a lens group G2a and the second-b lens group G2b in the zoom lens according to Example 1 of the present invention.
Figure 12:
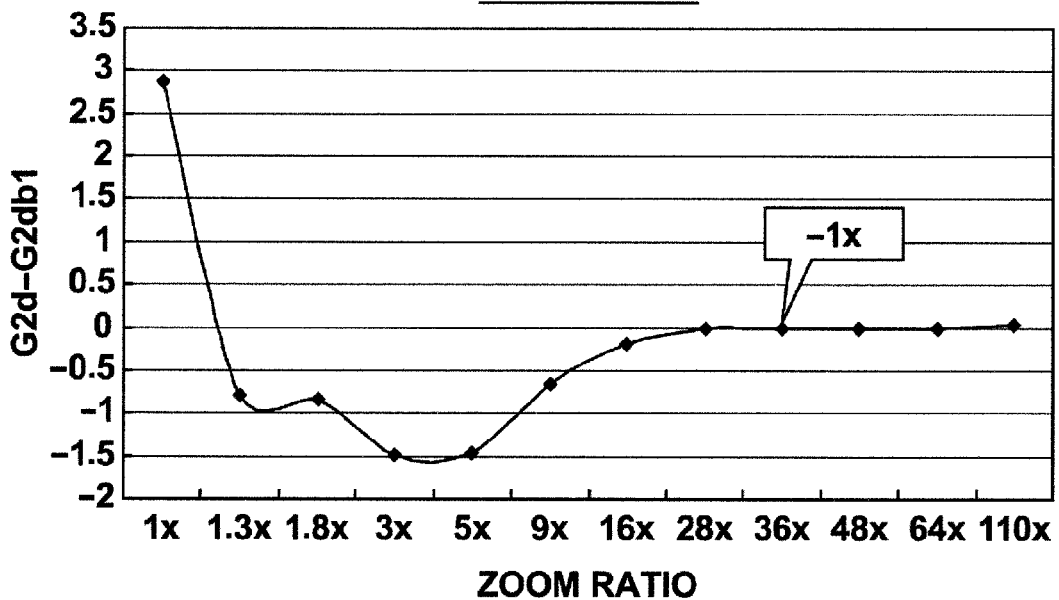
FIG. 12 is a diagram that illustrates the relationship between zoom ratios and the distances between the second-a lens group G2a and the second-b lens group G2b in the zoom lens according to Example 2 of the present invention.
Figure 13:
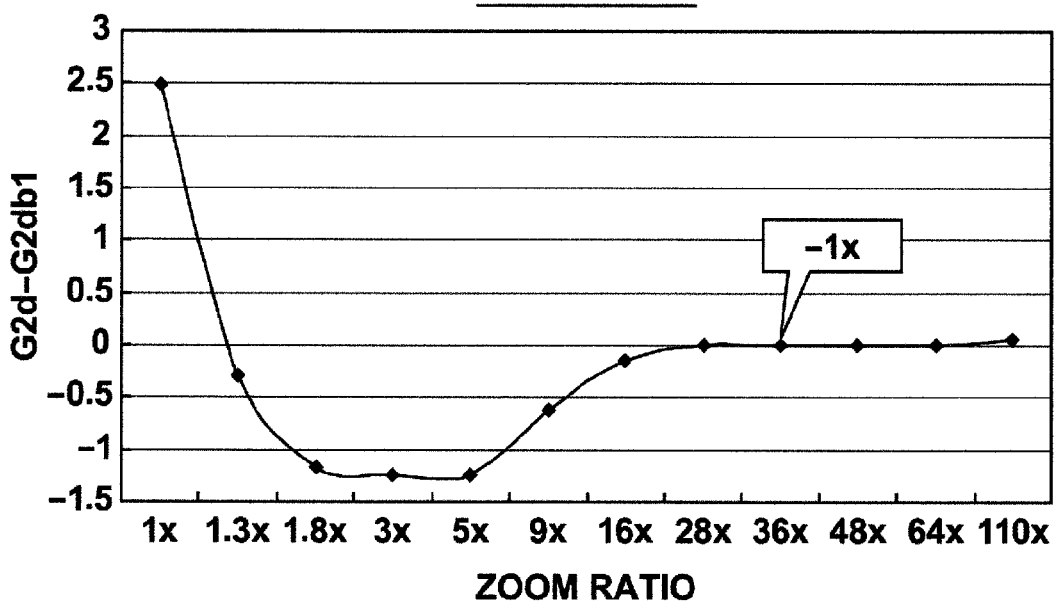
FIG. 13 is a diagram that illustrates the relationship between zoom ratios and the distances between the second-a lens group G2a and the second-b lens group G2b in the zoom lens according to Example 3 of the present invention.
Figure 14:
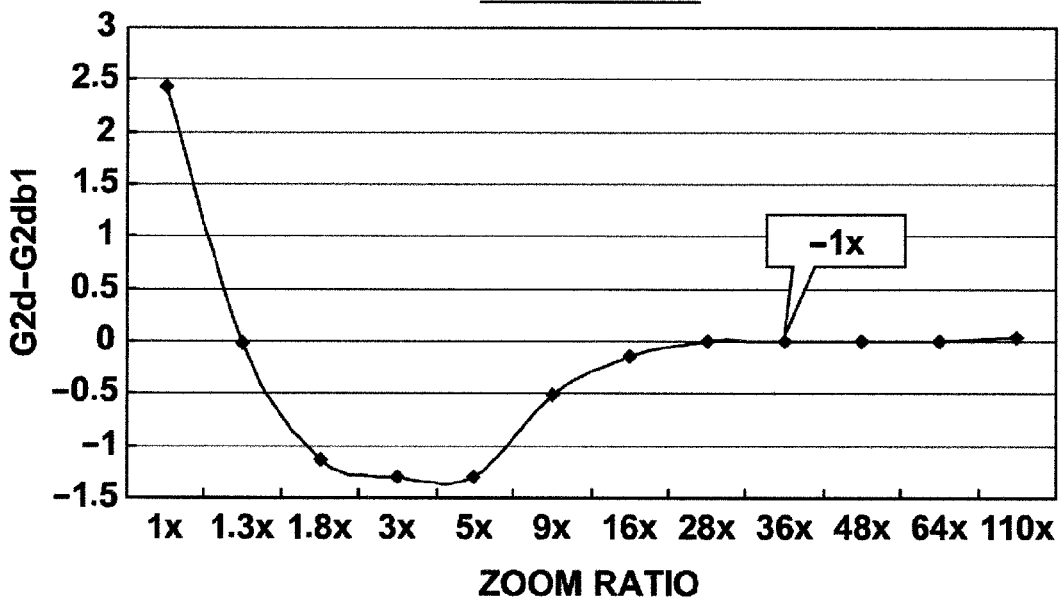
FIG. 14 is a diagram that illustrates the relationship between zoom ratios and the distances between the second-a lens group G2a and the second-b lens group G2b in the zoom lens according to Example 4 of the present invention.
Figure 15:
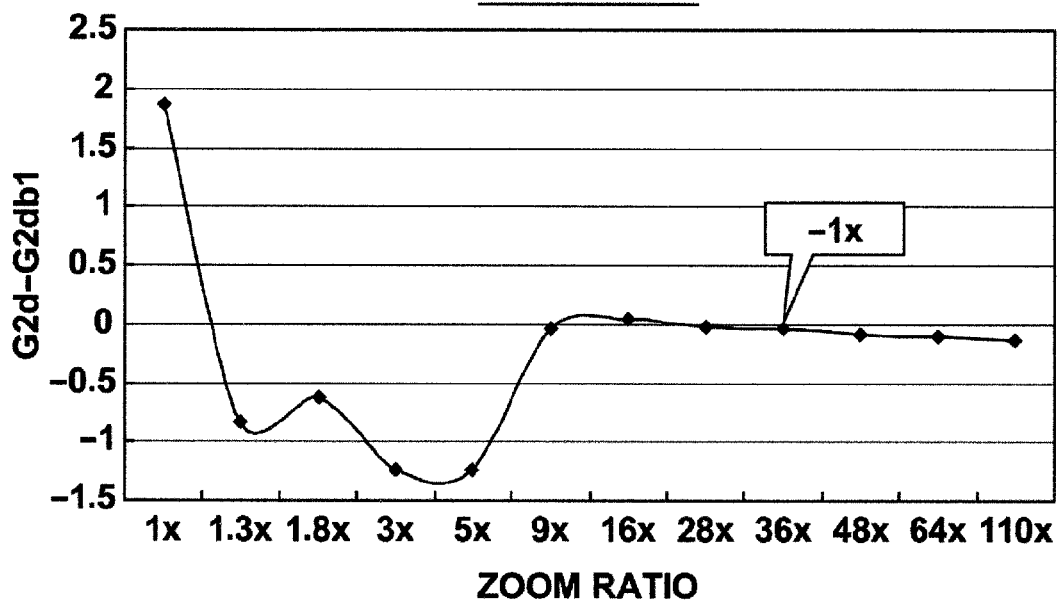
FIG. 15 is a diagram that illustrates the relationship between zoom ratios and the distances between the second-a lens group G2a and the second-b lens group G2b in the zoom lens according to Example 5 of the present invention.
Figure 28:
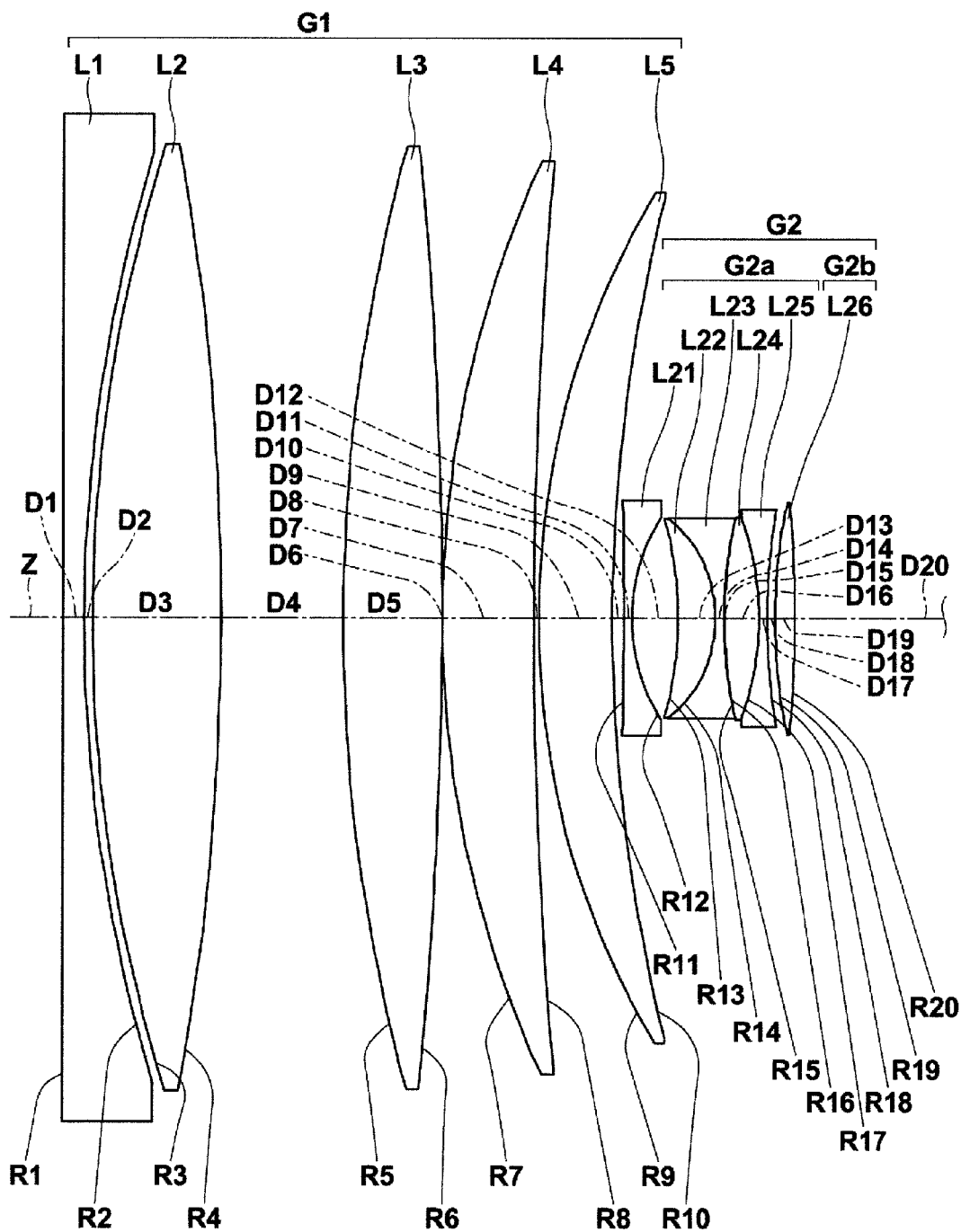
FIG. 28 is a cross-sectional view of the first lens group and the second lens group of the zoom lens according to Example 5 of the present invention, particularly illustrating a configuration thereof.
Figure 29:
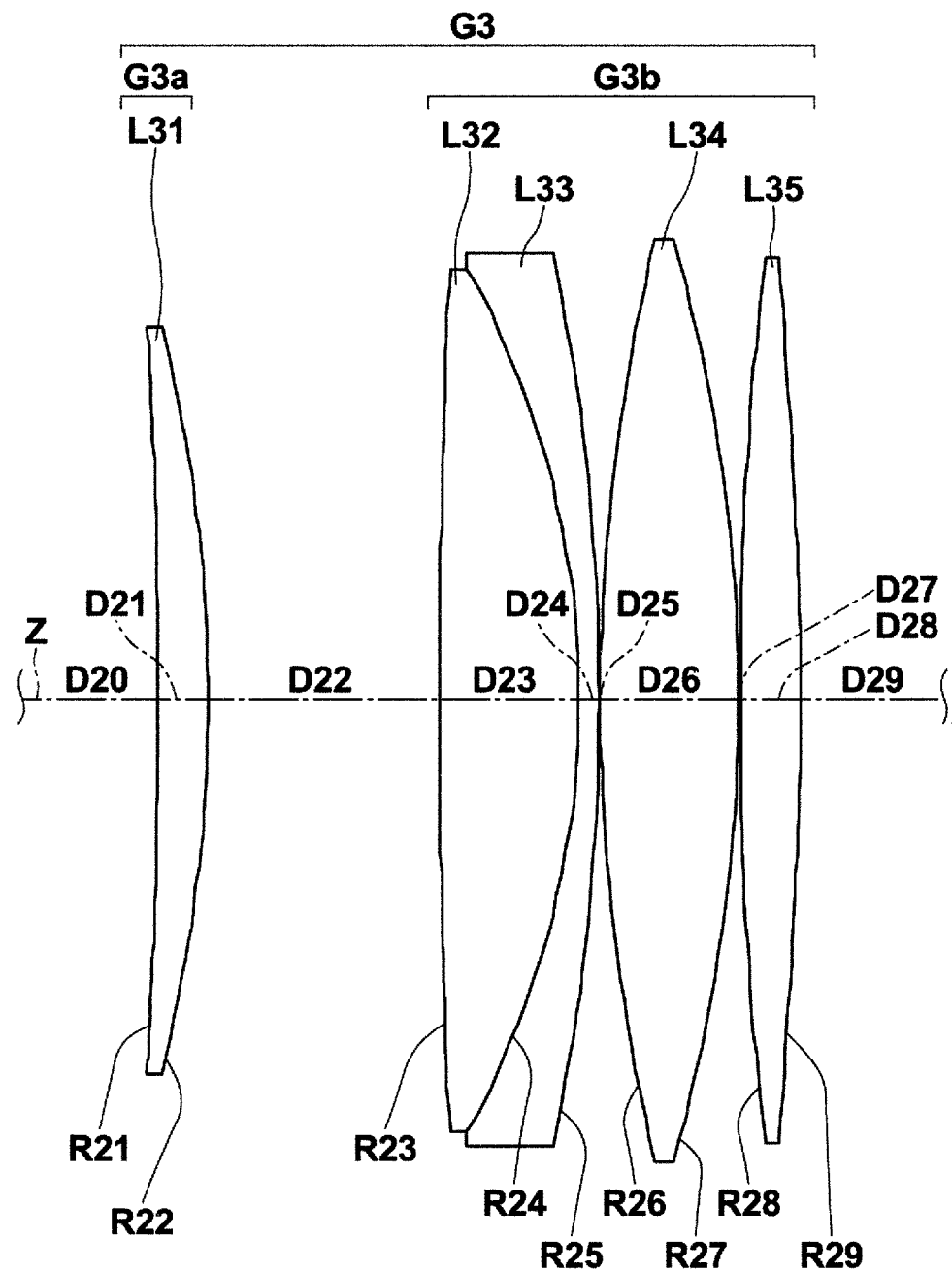
FIG. 29 is a cross-sectional view of the third lens group of the zoom lens according to Example 5 of the present invention, particularly illustrating a configuration thereof.
Figure 30:
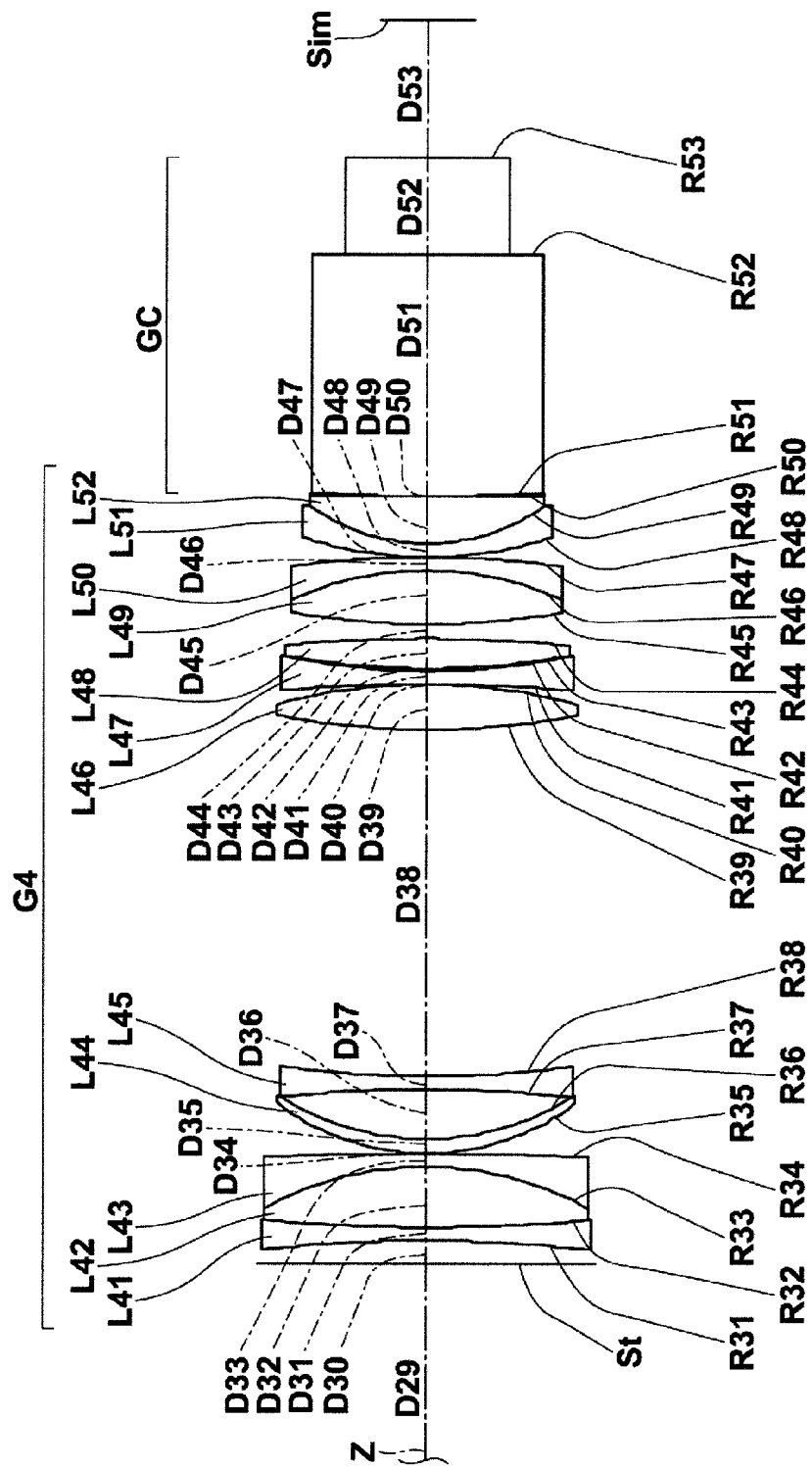
FIG. 30 is a cross-sectional view of the fourth lens group through the image formation surface of the zoom lens according to Example 5 of the present invention, particularly illustrating a configuration thereof.

The cross sectional view of lenses in Example 5 is shown in FIG. 5, and detailed configurations thereof are shown in FIGS. 28 through 30. FIG. 28 shows the detailed configuration of the first lens group G1 and the second lens group G2, FIG. 29 shows the detailed configuration of the third lens group G3, and FIG. 30 shows the detailed configuration from the fourth lens group G4 to the image formation surface Sim.

In Example 5, the first lens group G1 is of a five-lens configuration including lenses L1 through L5, the second-a lens group G2a which constitutes the second lens group G2 is of a five-lens configuration including L21 through L25, the second-b lens group G2b is of a one-lens configuration including a lens L26, the third-a lens group G3a which constitutes the third lens group G3 is of a one-lens configuration including a lens L31, the third-b lens group G3b is of a four-lens configuration including lenses L32 through L35, and the fourth lens group is of a twelve-lens configuration including an aperture stop St and lenses L41 through L52.

Surface data of the zoom lens according to Example 5 is shown in Table 13, the other data is shown in Table 14, and the aspherical surface coefficients are shown in Table 15. In Example 5, the distance between the second-a lens group G2a and the second-b lens group G2b is D18, the distance between the second-b lens group G2b and the third-a lens group G3a is D20, the distance between the third-a lens group G3a and the third-b lens group G3b is D22, and the distance between the third-b lens group G3b and the fourth lens group G4 is D29. These are respectively indicated as DD[18], DD[20], DD[22], and DD[29], meaning that these distances are variable.

TABLE 13

Example 5/Lens Data

| Si | Ri | Di | ndj | νdi | θ g, fj |
|---|---|---|---|---|---|
| 1 | −40564.5247 | 4.40 | 1.80440 | 39.59 | 0.57297 |
| 2 | 326.1394 | 1.80 | | | |
| 3 | 321.5462 | 27.88 | 1.43387 | 95.20 | 0.53733 |
| 4 | −542.6356 | 26.22 | | | |
| 5 | 363.1342 | 21.20 | 1.43387 | 95.20 | 0.53733 |
| 6 | −1008.2617 | 0.10 | | | |
| 7 | 225.9929 | 19.79 | 1.43387 | 95.20 | 0.53733 |
| 8 | 1070.4608 | 1.00 | | | |
| 9 | 171.5753 | 15.92 | 1.43875 | 94.93 | 0.53433 |
| 10 | 353.2007 | DD[10] | | | |
| *11 | −1350.9599 | 1.80 | 1.90366 | 31.32 | 0.59481 |
| 12 | 39.0211 | 9.93 | | | |
| 13 | −74.5318 | 8.07 | 1.92286 | 18.90 | 0.64960 |
| 14 | −26.5968 | 1.80 | 1.90366 | 31.32 | 0.59481 |
| 15 | 90.5874 | 0.17 | | | |
| 16 | 97.7241 | 7.42 | 1.80809 | 22.76 | 0.63073 |
| 17 | −61.0108 | 1.75 | 1.81600 | 46.62 | 0.55682 |
| 18 | 130.7684 | DD[18] | | | |
| *19 | 148.8145 | 4.11 | 1.43875 | 94.93 | 0.53433 |
| 20 | −246.6879 | DD[20] | | | |
| 21 | −603.3431 | 4.86 | 1.49700 | 81.54 | 0.53748 |
| *22 | −139.3264 | DD[22] | | | |
| 23 | 783.5653 | 13.44 | 1.56908 | 71.30 | 0.54530 |
| 24 | −82.0388 | 2.00 | 1.84666 | 23.78 | 0.62054 |
| 25 | −198.2332 | 0.10 | | | |
| 26 | 178.9017 | 13.32 | 1.59522 | 67.74 | 0.54426 |
| 27 | −151.0325 | 0.10 | | | |
| 28 | 351.4567 | 5.85 | 1.43875 | 94.93 | 0.53433 |
| *29 | −301.5879 | DD[29] | | | |
| 30(Stop) | ∞ | 3.25 | | | |
| 31 | −191.1196 | 1.80 | 1.80400 | 46.58 | 0.55730 |
| 32 | 247.2894 | 8.26 | 1.80518 | 25.43 | 0.61027 |
| 33 | −43.7895 | 1.80 | 1.88300 | 40.76 | 0.56679 |
| 34 | −430.2717 | 0.01 | | | |
| 35 | 32.0245 | 1.94 | 1.48749 | 70.23 | 0.53007 |
| 36 | 35.0977 | 6.80 | | | |
| 37 | −173.0917 | 1.80 | 1.88300 | 40.76 | 0.56679 |
| 38 | 147.2207 | 47.12 | | | |
| 39 | 105.2552 | 6.15 | 1.59522 | 67.74 | 0.54426 |
| 40 | −73.9373 | 0.01 | | | |
| 41 | −230.4925 | 1.80 | 1.88300 | 40.76 | 0.56679 |
| 42 | 85.1815 | 0.35 | | | |
| 43 | 101.6012 | 4.06 | 1.64769 | 33.79 | 0.59393 |
| 44 | −200.1079 | 2.00 | | | |
| 45 | 104.1727 | 7.31 | 1.59522 | 67.74 | 0.54426 |
| 46 | −42.0705 | 1.80 | 1.83400 | 37.16 | 0.57759 |
| 47 | −134.4018 | 0.01 | | | |
| 48 | 52.2067 | 1.80 | 1.88300 | 40.76 | 0.56679 |
| 49 | 25.6791 | 6.49 | 1.48749 | 70.23 | 0.53007 |
| 50 | 278.5897 | 0.00 | | | |
| 51 | ∞ | 33.00 | 1.60863 | 46.60 | 0.56787 |
| 52 | ∞ | 13.20 | 1.51633 | 64.14 | 0.53531 |
| 53 | ∞ | 16.98 | | | |

TABLE 14

Example 5/Other Data

| | Wide Angle | Intermediate | Telephoto |
|---|---|---|---|
| Zoom Ratio | 1.0 | 3.0 | 110.0 |
| f' | 8.30 | 24.89 | 912.48 |
| Bf | 46.20 | 46.20 | 46.20 |
| FNo. | 1.76 | 1.76 | 4.75 |
| 2ω [*] | 69.6 | 23.8 | 0.6 |
| DD[10] | 2.19 | 76.46 | 174.39 |
| DD[18] | 1.80 | 2.10 | 1.91 |
| DD[20] | 265.40 | 123.31 | 1.27 |
| DD[22] | 22.28 | 69.74 | 1.00 |
| DD[29] | 1.14 | 21.20 | 114.25 |

TABLE 15

Example 5/Aspherical Surface Coefficient

| Surface Number | 11 | 19 | 22 | 29 |
|---|---|---|---|---|
| KA | 6.0442085E+02 | 3.5008337E+01 | 1.0002704E+00 | −9.3960032E+01 |
| A3 | −1.9757620E−05 | −1.3449183E−06 | −2.0414712E−07 | 5.0568750E−07 |
| A4 | 1.2463570E−05 | −4.8326110E−07 | 6.8030733E−08 | −3.3725787E−07 |
| A5 | −3.0978158E−06 | 5.9401489E−07 | −4.7952796E−09 | 2.2406522E−08 |
| A6 | 3.9631388E−07 | −1.1872015E−07 | 9.3824565E−11 | −1.3760094E−09 |
| A7 | −2.8831167E−08 | 1.1993266E−08 | 3.0232559E−12 | 6.7820363E−11 |
| A8 | 1.2090605E−09 | −6.8476867E−10 | −6.4577767E−14 | −1.8712794E−12 |
| A9 | −2.7250497E−11 | 2.0650584E−11 | −4.9411795E−15 | 2.6741992E−14 |
| A10 | 2.5552610E−13 | −2.6063137E−13 | −8.2491370E−17 | −1.5471376E−16 |
| A11 | | | 4.4407494E−18 | |
| A12 | | | 4.9677911E−19 | |
| A13 | | | −4.7057171E−21 | |
| A14 | | | −2.7929436E−22 | |
| A15 | | | −2.3095753E−23 | |
| A16 | | | 2.9015331E−25 | |
| A17 | | | 3.2345160E−26 | |
| A18 | | | −7.2667341E−29 | |
| A19 | | | −2.9397899E−29 | |
| A20 | | | 4.1096750E−31 | |

[Each Example and Other Data of Numerical Values]

Table 16 shows values corresponding to conditional formulas (1) and (2) according to Examples 1 through 5. As can be seen from Table 16, all of Examples 1 through 5 satisfy conditional formulas (1) and (2).

TABLE 16

| Expression Number | Conditional Formula | Example 1 | Example 2 | Example 3 | Example 4 | Example 5 |
|---|---|---|---|---|---|---|
| (1) | (G3dmax − G3db1)/f3a | 0.096 | 0.138 | 0.145 | 0.145 | 0.136 |
| (2) | (G2dmin − G2db1)/f2b | −0.008 | −0.006 | −0.005 | −0.006 | −0.006 |

[Aberration Performance]

Figure 31:
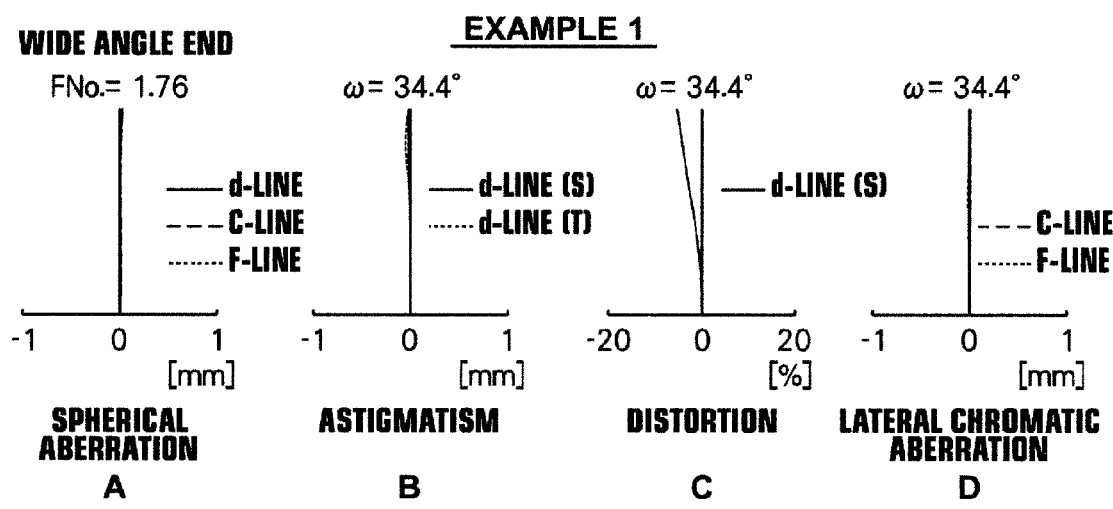
FIG. 31 shows various aberration diagrams of the zoom lens according to Example 1 of the present invention (wide angle end).
Figure 32:
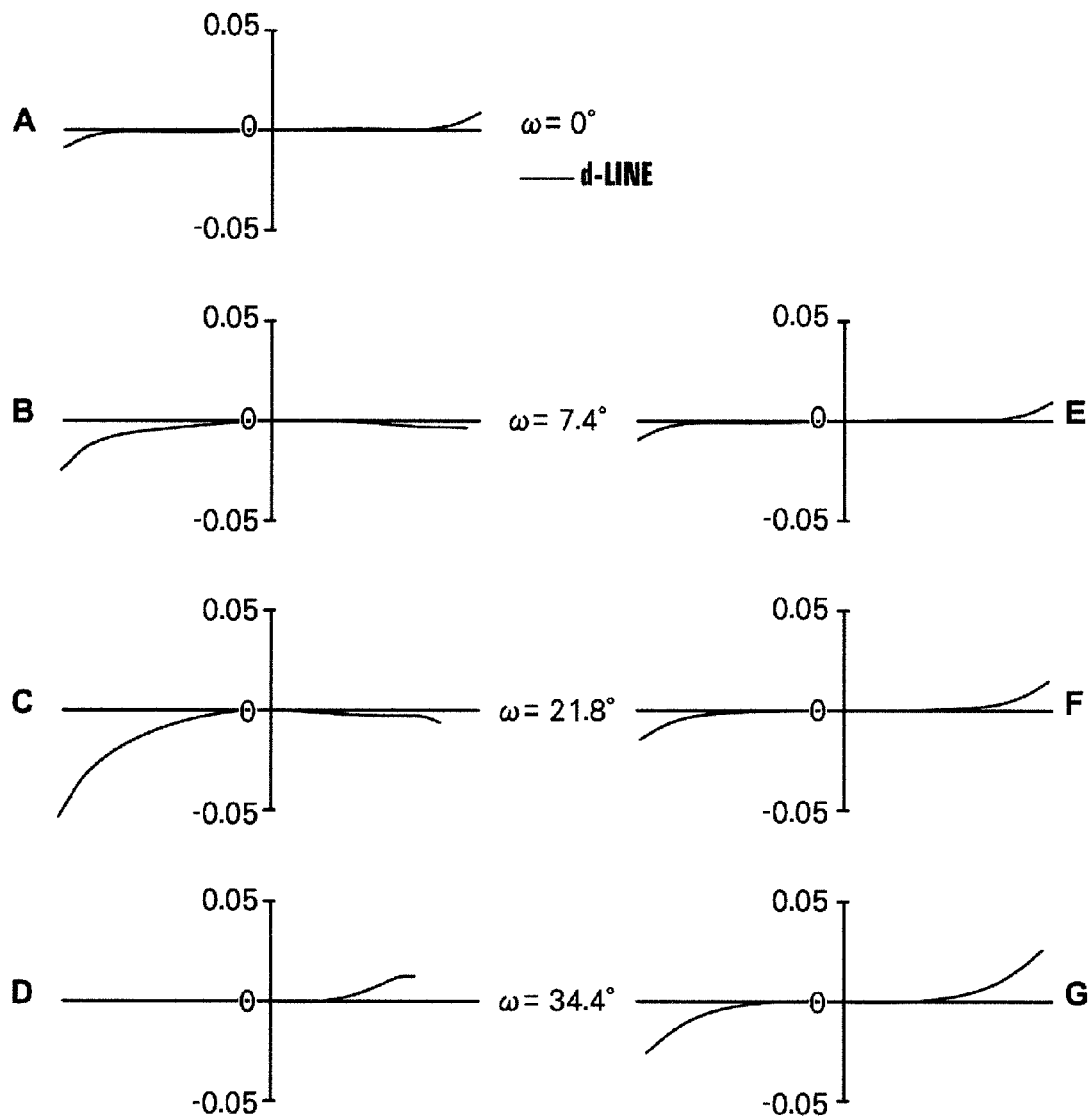
FIG. 32 shows coma aberration diagrams of the zoom lens according to Example 1 of the present invention (wide angle end).
Figure 33:
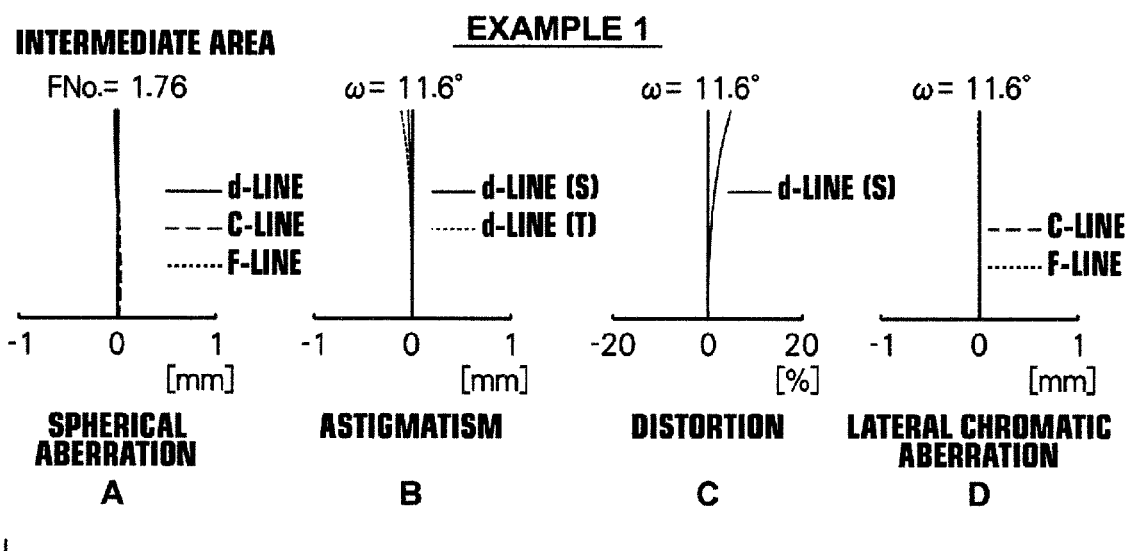
FIG. 33 shows various aberration diagrams of the zoom lens according to Example 1 of the present invention (intermediate area).
Figure 34:
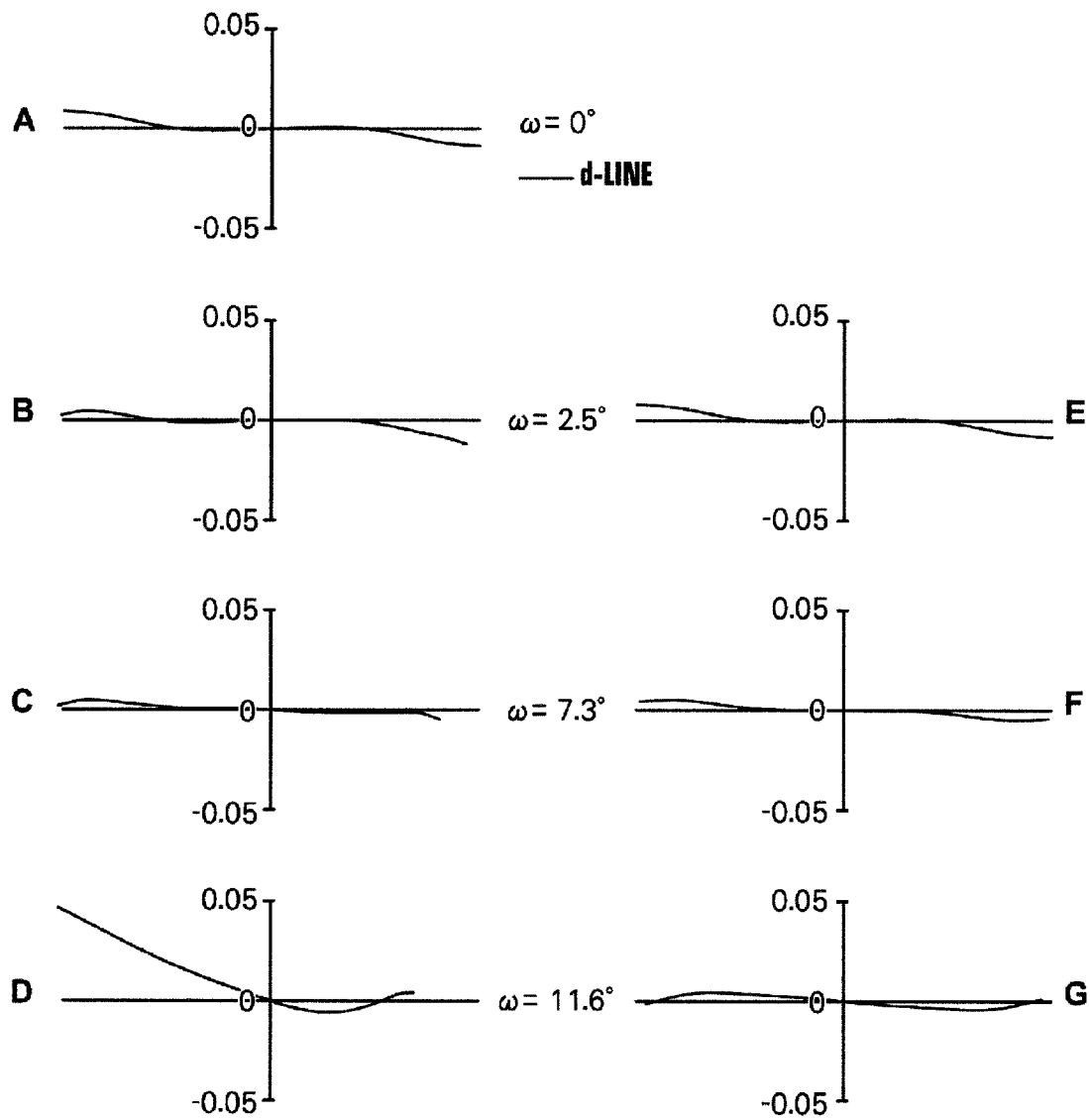
FIG. 34 shows coma aberration diagrams of the zoom lens according to Example 1 of the present invention (intermediate area).
Figure 35:
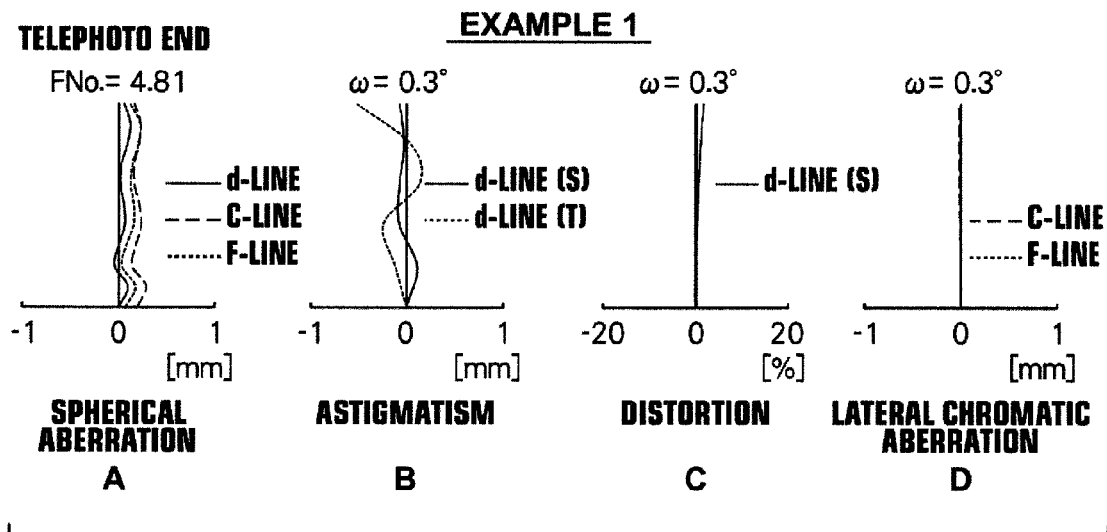
FIG. 35 shows various aberration diagrams of the zoom lens according to Example 1 of the present invention (telephoto end).
Figure 36:
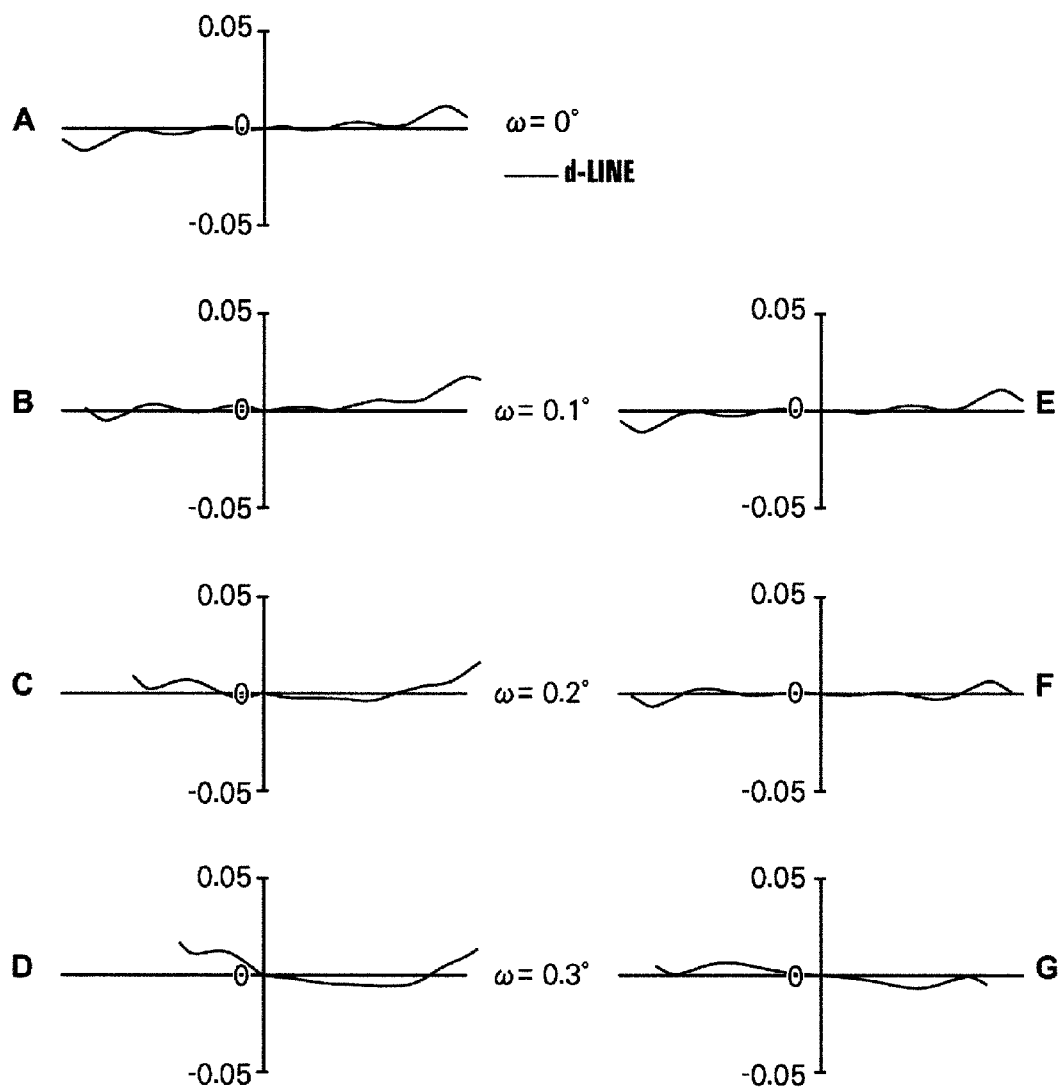
FIG. 36 shows coma aberration diagrams of the zoom lens according to Example 1 of the present invention (telephoto end).

A through D of FIG. 31 respectively show aberration diagrams of spherical aberration, astigmatism, distortion, and lateral chromatic aberration of the zoom lens according to Example 1 at the wide angle end in a state focused on infinity. A through G of FIG. 32 shows comatic aberration diagrams. A through D of FIG. 33 respectively show aberration diagrams of spherical aberration, astigmatism, distortion, and lateral chromatic aberration of the zoom lens according to Example 1 at the intermediate area in a state focused on infinity. A through G of FIG. 34 shows comatic aberration diagrams. A through D of FIG. 35 respectively show aberration diagrams of spherical aberration, astigmatism, distortion, and lateral chromatic aberration of the zoom lens according to Example 1 at the telephoto end in a state focused on infinity. A through G of FIG. 36 shows comatic aberration diagrams. Note that in the comatic aberration, each of A through D of comatic aberration diagrams shows comatic aberration at a half angle of view in a tangential direction, and each of E through G thereof shows comatic aberration at a half angle of view in a saggital direction.

Each of the aberration diagrams shows aberration with respect to the d-line (587.6 nm) which is the reference wavelength. The spherical aberration diagram also shows aberration with respect to a wavelength of 486.1 nm (the F-line) and aberration with respect to a wavelength of 656.3 nm (the C-line). The astigmatism diagram shows aberration in a sagittal direction with a solid line and aberration in a tangential direction with a broken line. The lateral chromatic aberration diagram shows aberration with respect to the C-line and aberration with respect to the F-line. mm is used as the unit of the scale of the vertical axis in each of the comatic aberration diagrams, but the descriptions thereof are omitted in the Figures. The comatic aberration diagram shows aberration with respect to the d-line. FNo. shows an F value, and ω shows a half angle of view.

Figure 37:
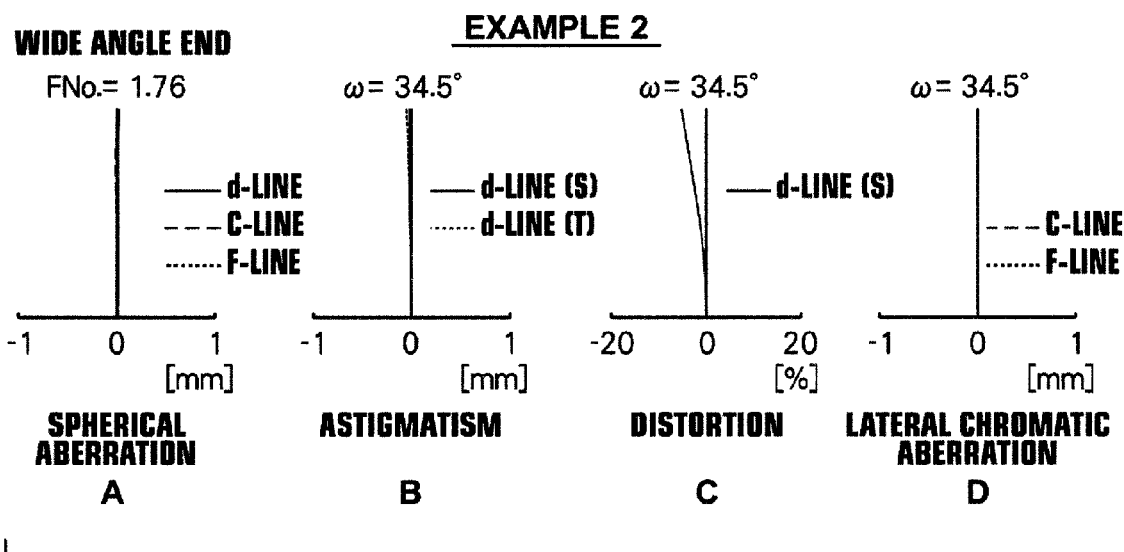
FIG. 37 shows various aberration diagrams of the zoom lens according to Example 2 of the present invention (wide angle end).
Figure 38:
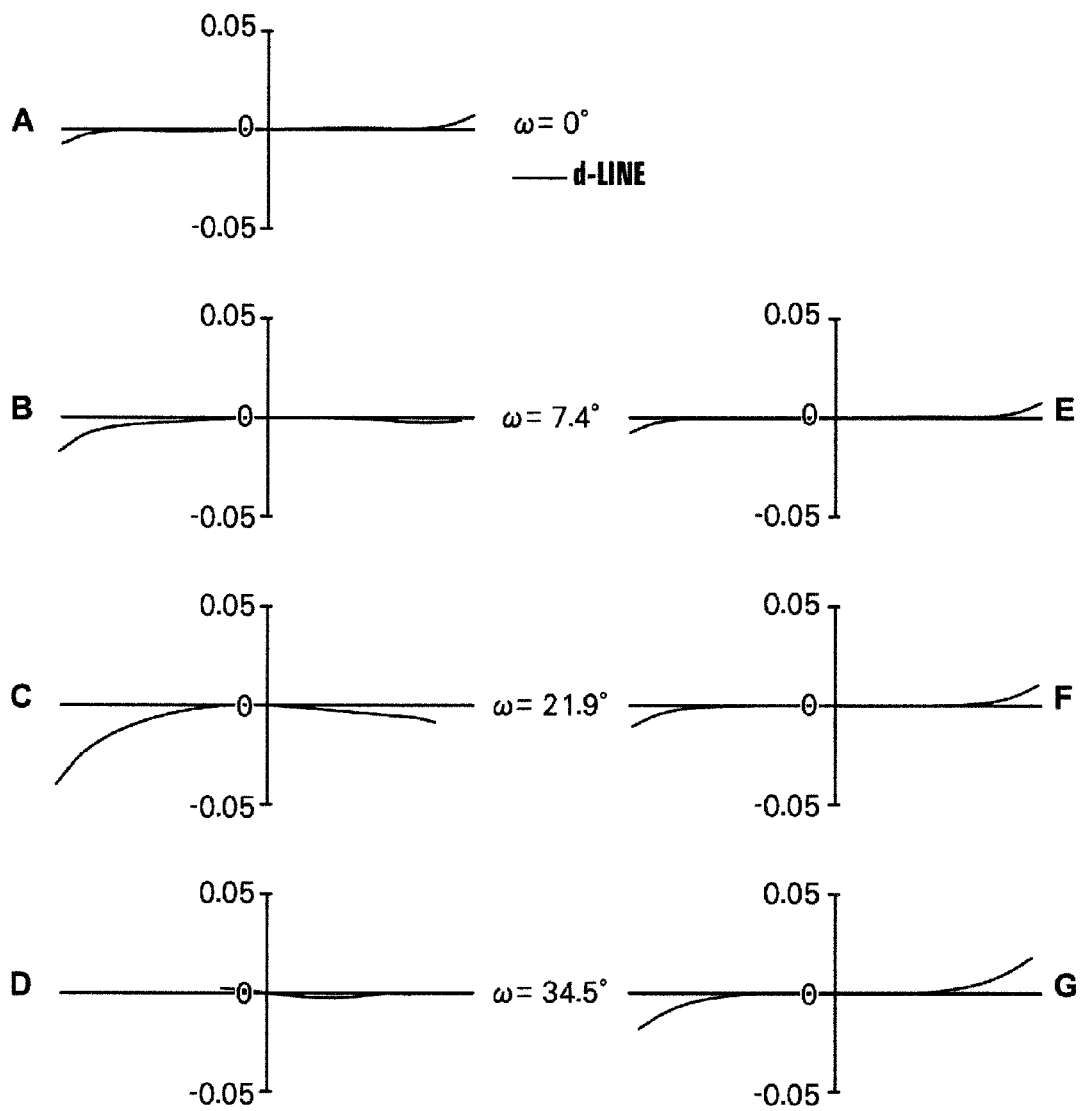
FIG. 38 shows coma aberration diagrams of the zoom lens according to Example 2 of the present invention (wide angle end).
Figure 39:
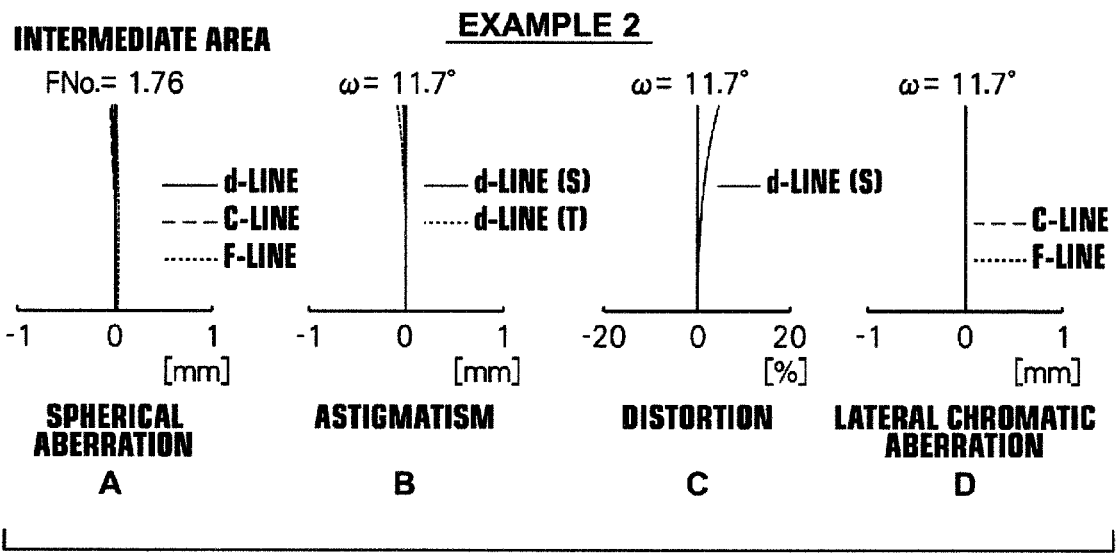
FIG. 39 shows various aberration diagrams of the zoom lens according to Example 2 of the present invention (intermediate area).
Figure 40:
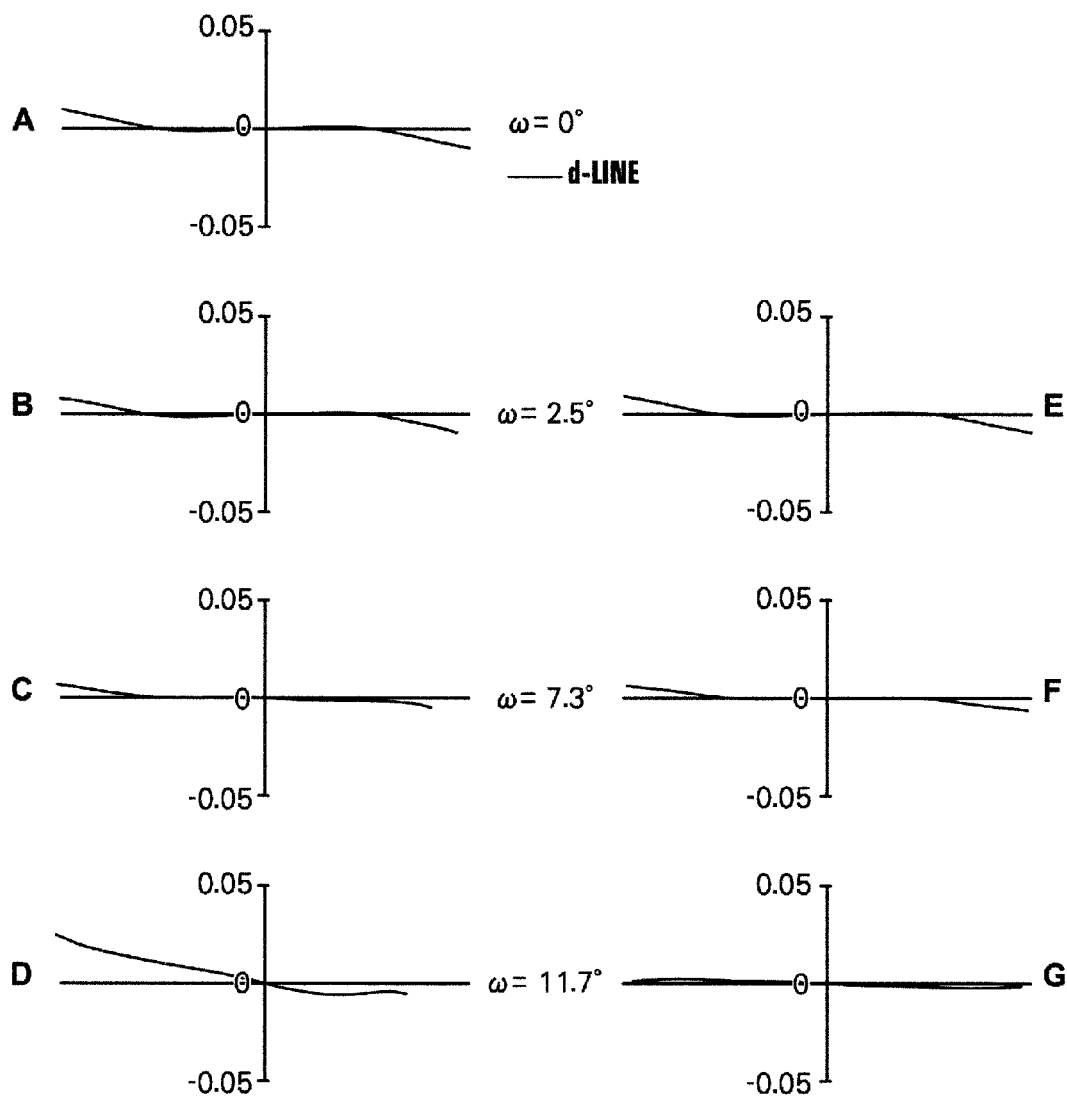
FIG. 40 shows coma aberration diagrams of the zoom lens according to Example 2 of the present invention (intermediate area).
Figure 41:
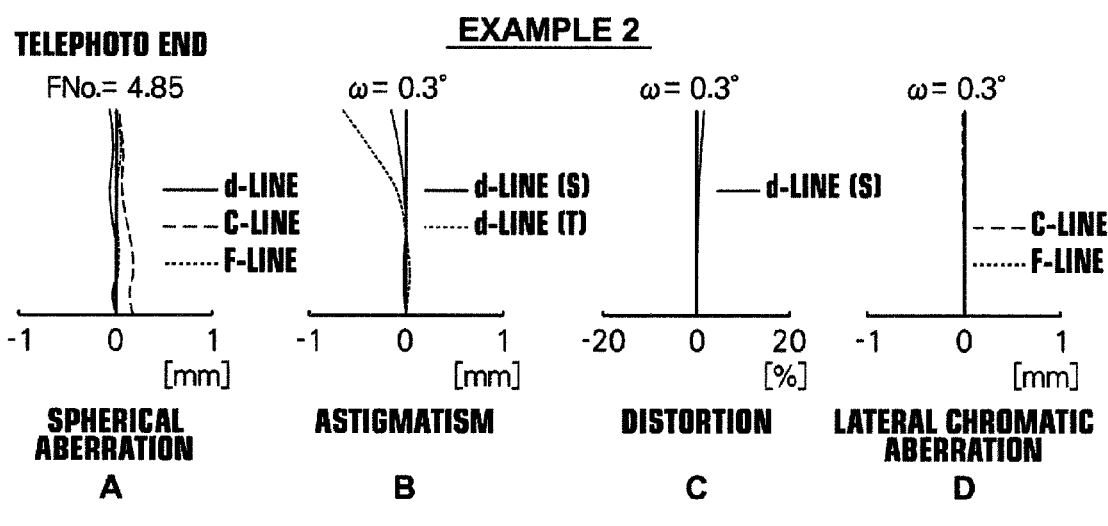
FIG. 41 shows various aberration diagrams of the zoom lens according to Example 2 of the present invention (telephoto end).
Figure 42:
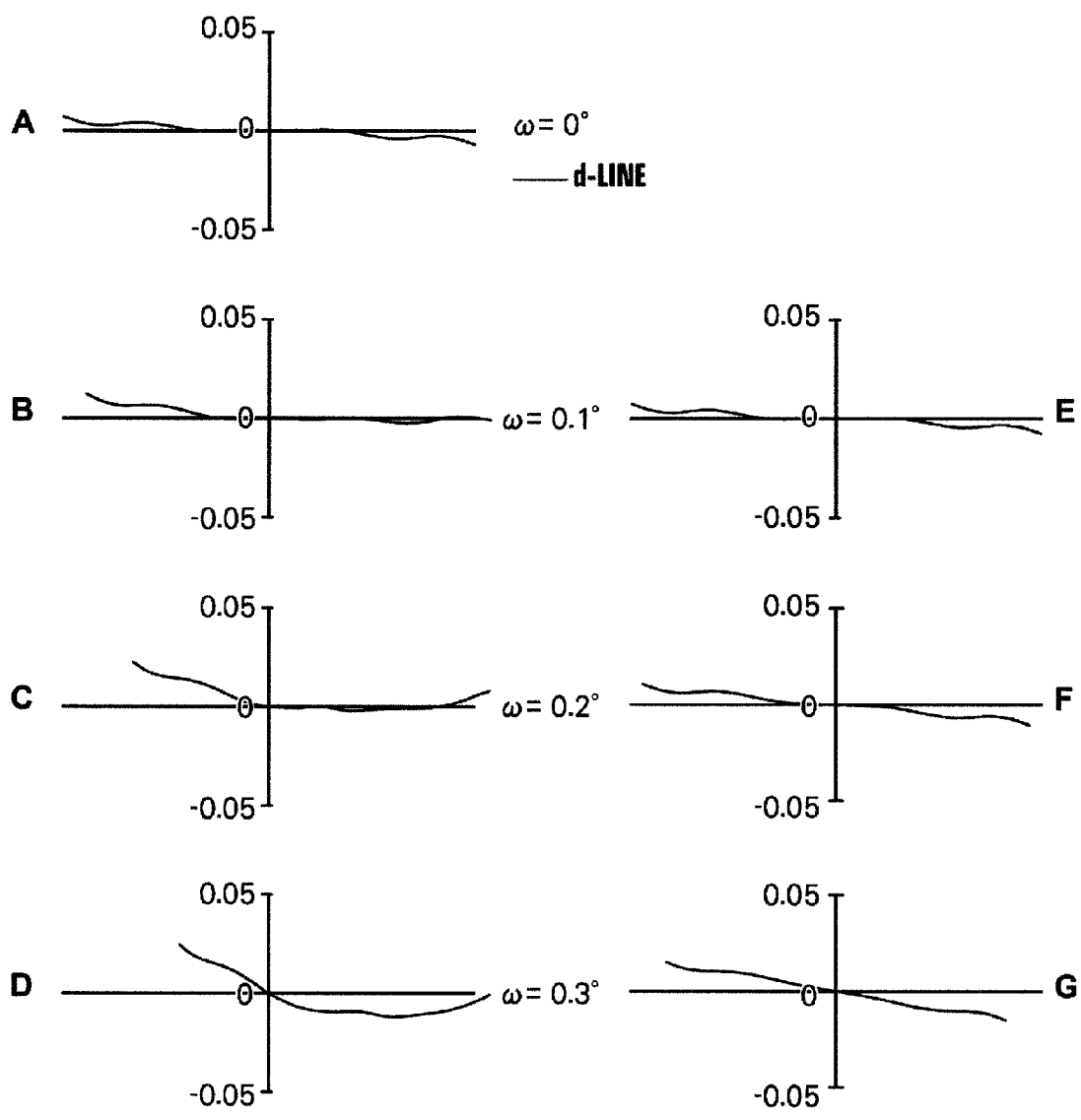
FIG. 42 shows coma aberration diagrams of the zoom lens according to Example 2 of the present invention (telephoto end).

Similarly, various aberration diagrams of the zoom lens according to Example 2 at the wide angle end in a state focused on infinity are shown in A through D of FIG. 37, and comatic aberrations thereof are shown in A through G of FIG. 38. Various aberration diagrams of the zoom lens according to Example 2 at the intermediate area in a state focused on infinity are shown in A through D of FIG. 39, and comatic aberrations thereof are shown in A through G of FIG. 40. Various aberration diagrams of the zoom lens according to Example 2 at the telephoto end in a state focused on infinity are shown in A through D of FIG. 41, and comatic aberrations thereof are shown in A through G of FIG. 42.

Figure 43:
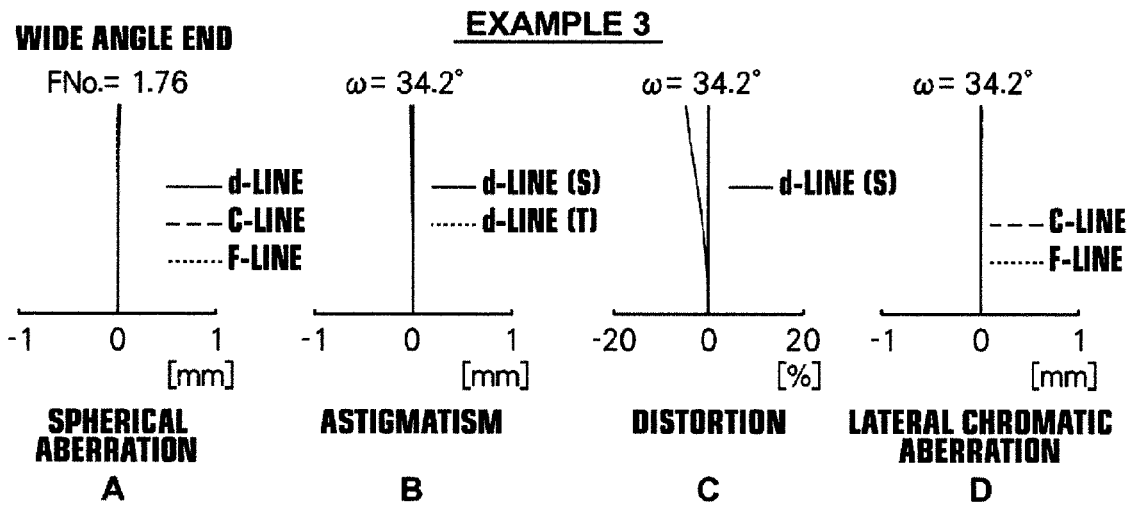
FIG. 43 shows various aberration diagrams of the zoom lens according to Example 3 of the present invention (wide angle end).
Figure 44:
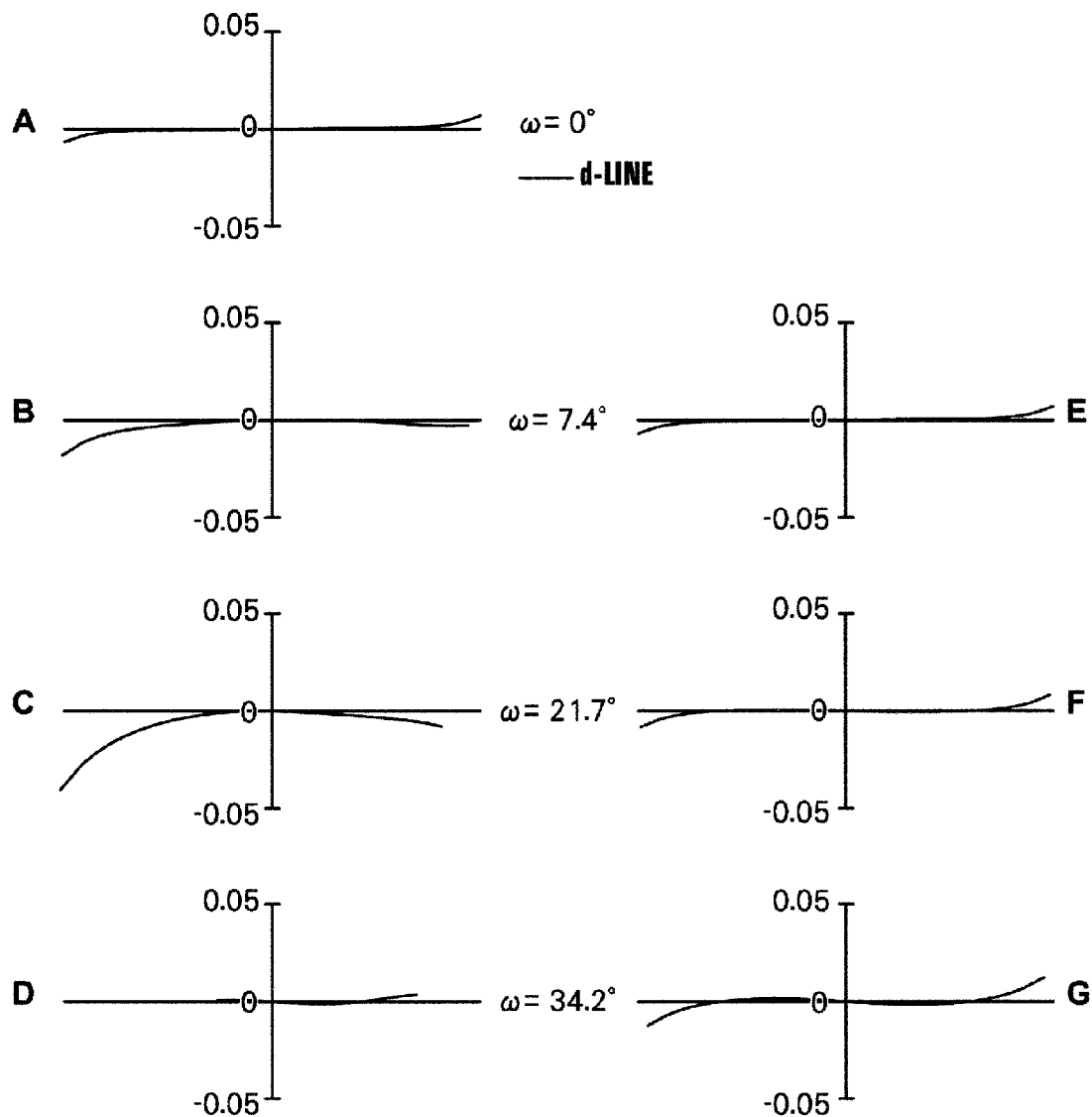
FIG. 44 shows coma aberration diagrams of the zoom lens according to Example 3 of the present invention (wide angle end).
Figure 45:
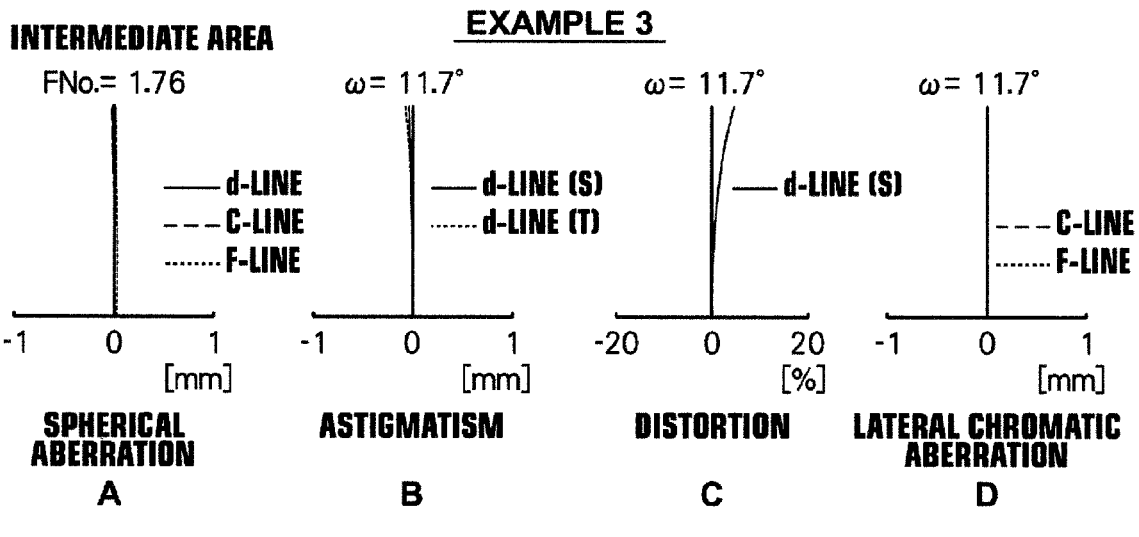
FIG. 45 shows various aberration diagrams of the zoom lens according to Example 3 of the present invention (intermediate area).
Figure 46:
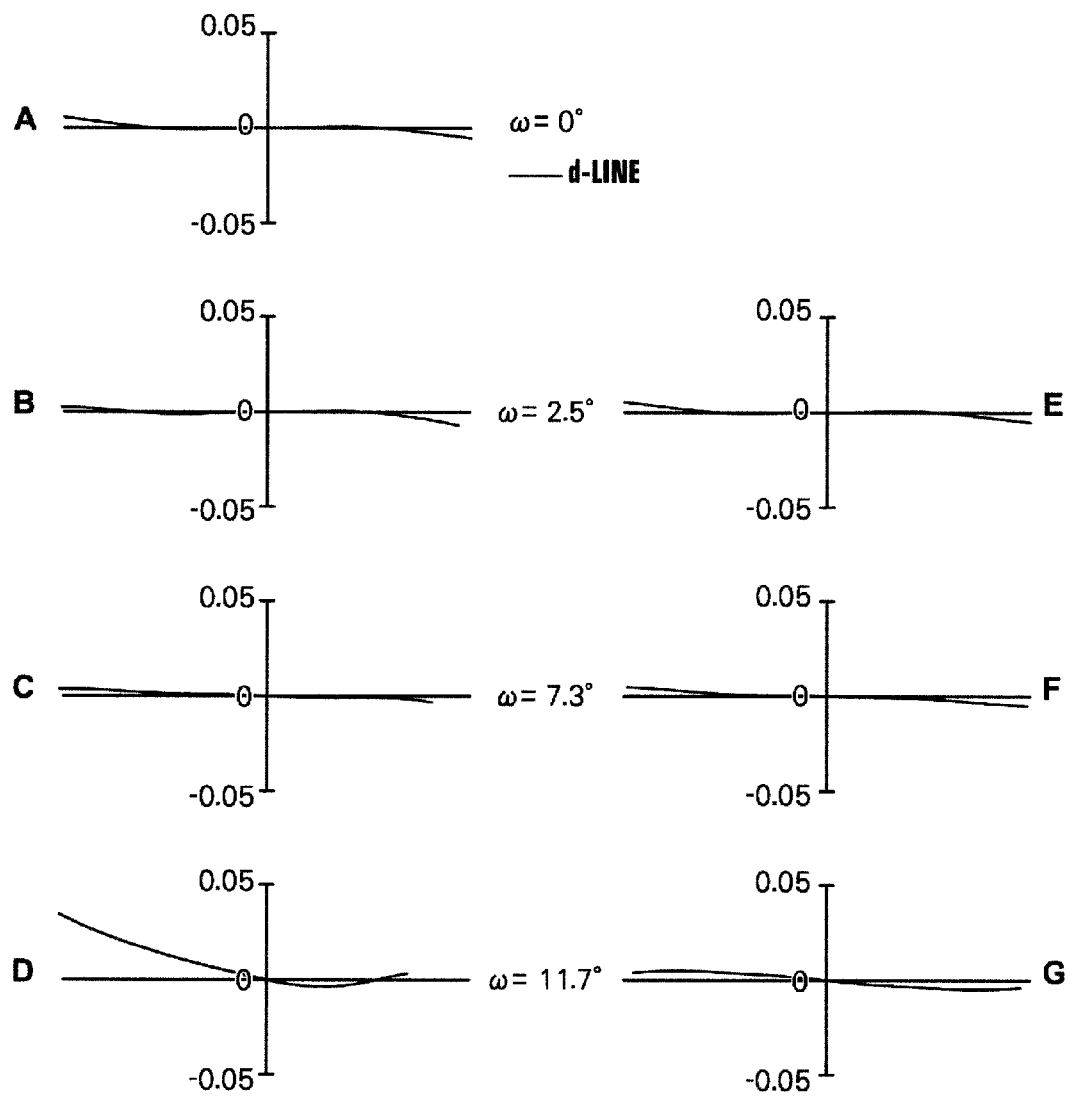
FIG. 46 shows coma aberration diagrams of the zoom lens according to Example 3 of the present invention (intermediate area).
Figure 47:
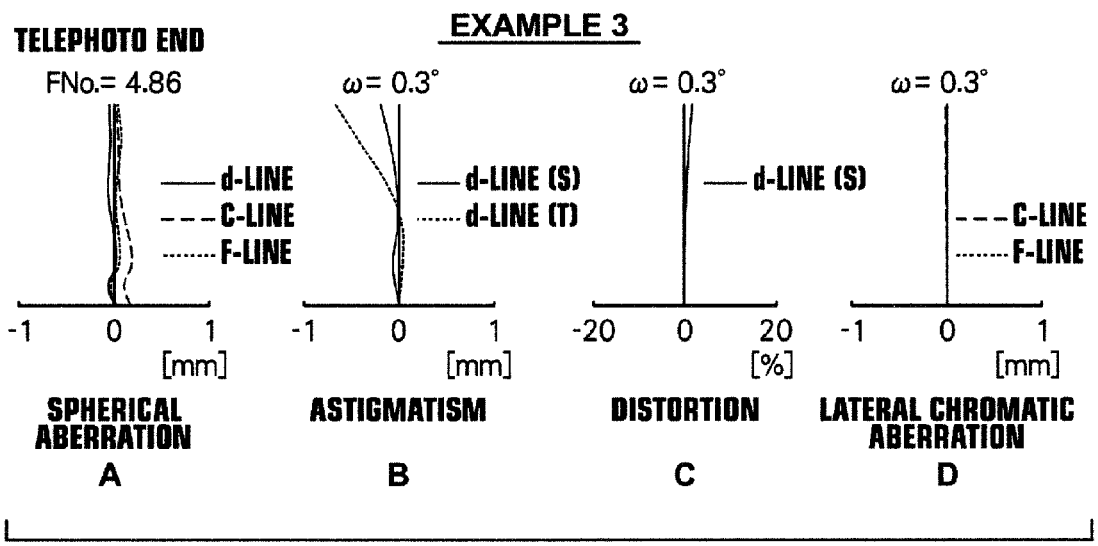
FIG. 47 shows various aberration diagrams of the zoom lens according to Example 3 of the present invention (telephoto end).
Figure 48:
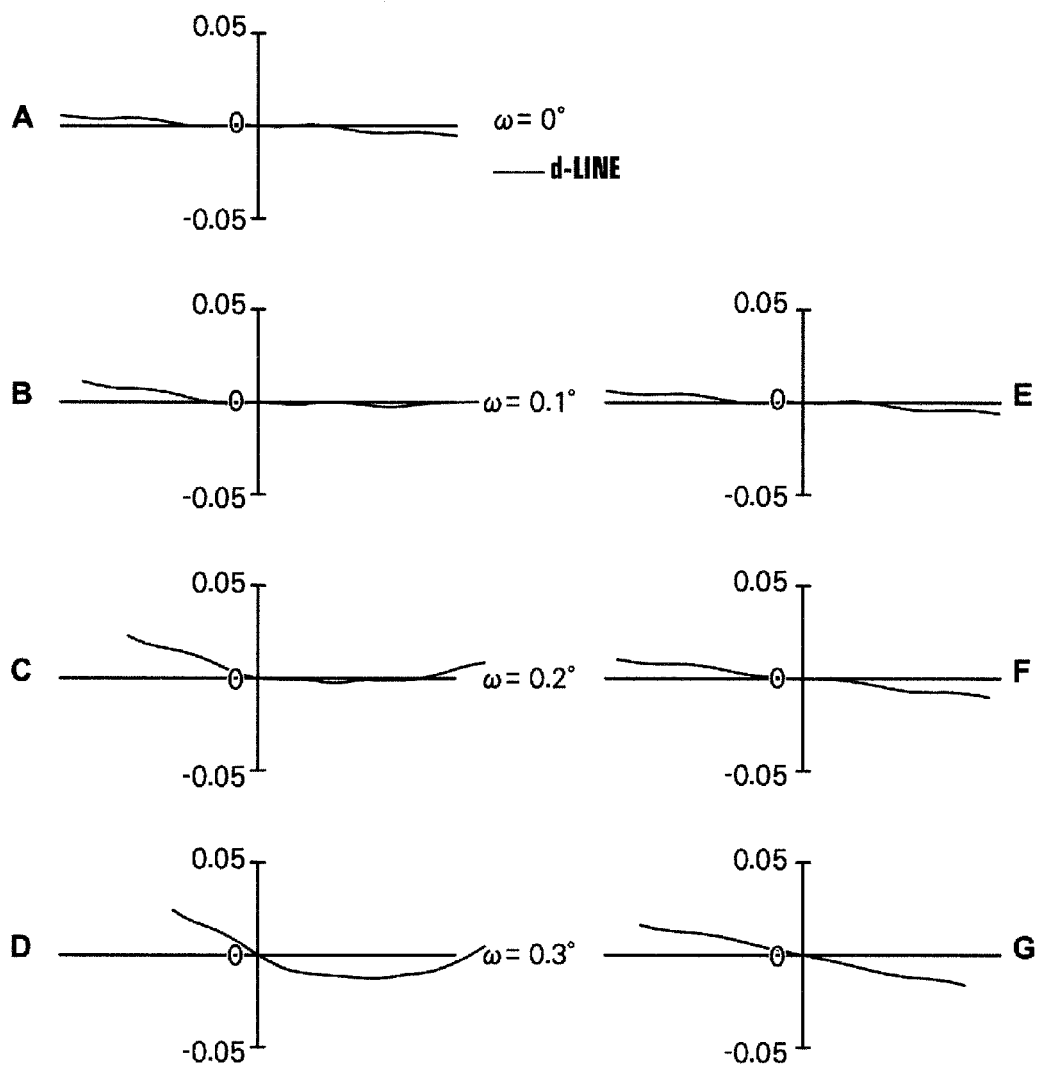
FIG. 48 shows coma aberration diagrams of the zoom lens according to Example 3 of the present invention (telephoto end).

Similarly, various aberration diagrams of the zoom lens according to Example 3 at the wide angle end in a state focused on infinity are shown in A through D of FIG. 43, and comatic aberrations thereof are shown in A through G of FIG. 44. Various aberration diagrams of the zoom lens according to Example 3 at the intermediate area in a state focused on infinity are shown in A through D of FIG. 45, and comatic aberrations thereof are shown in A through G of FIG. 46. Various aberration diagrams of the zoom lens according to Example 3 at the telephoto end in a state focused on infinity are shown in A through D of FIG. 47, and comatic aberrations thereof are shown in A through G of FIG. 48.

Figure 49:
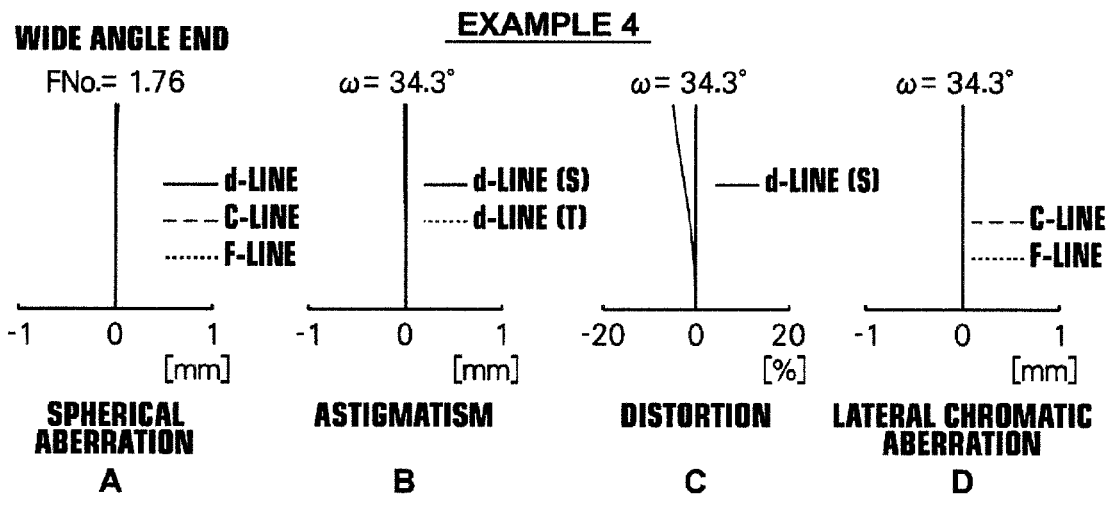
FIG. 49 shows various aberration diagrams of the zoom lens according to Example 4 of the present invention (wide angle end).
Figure 50:
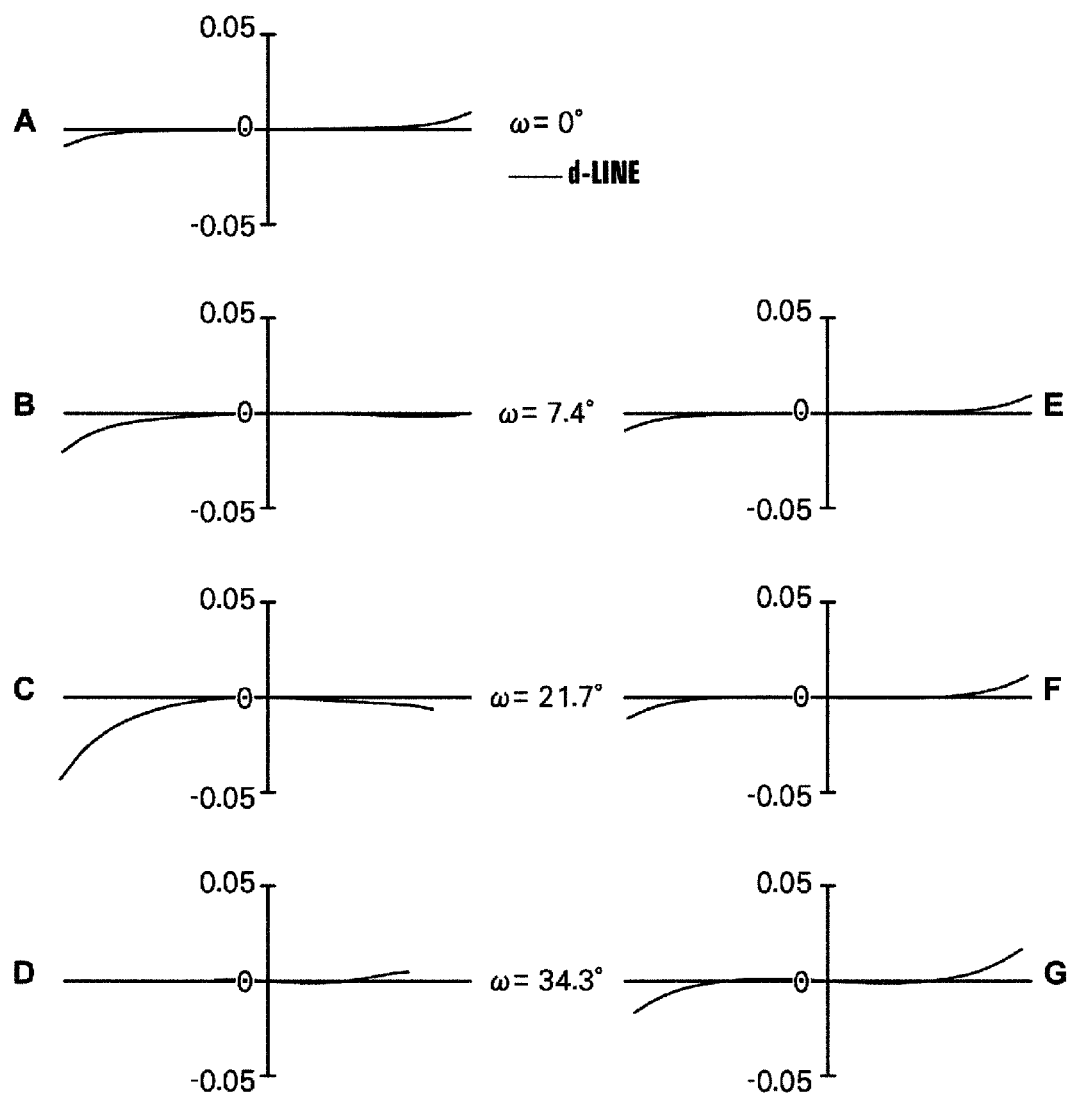
FIG. 50 shows coma aberration diagrams of the zoom lens according to Example 4 of the present invention (wide angle end).
Figure 52:
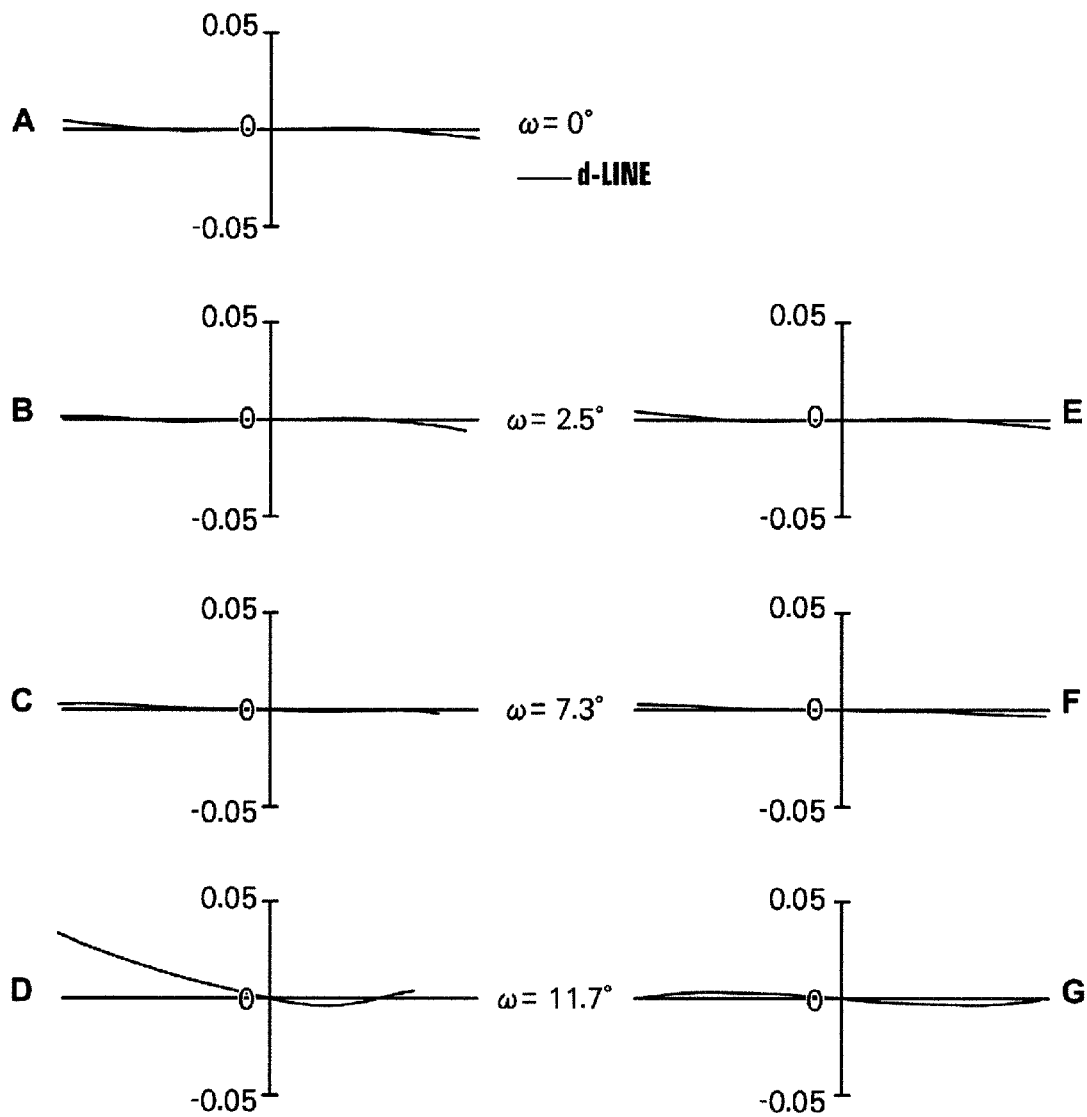
FIG. 52 shows coma aberration diagrams of the zoom lens according to Example 4 of the present invention (intermediate area).
Figure 53:
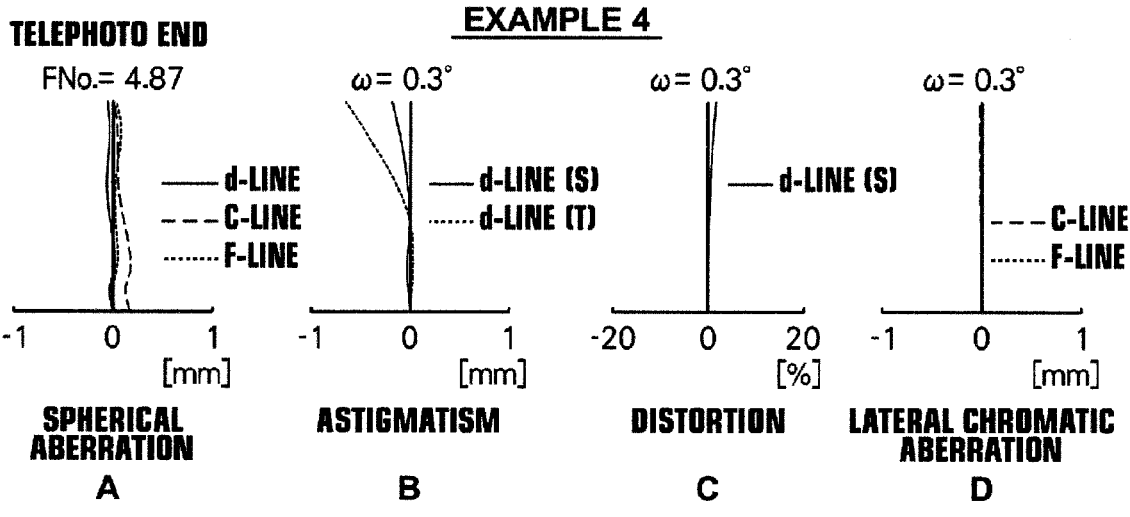
FIG. 53 shows various aberration diagrams of the zoom lens according to Example 4 of the present invention (telephoto end).
Figure 54:
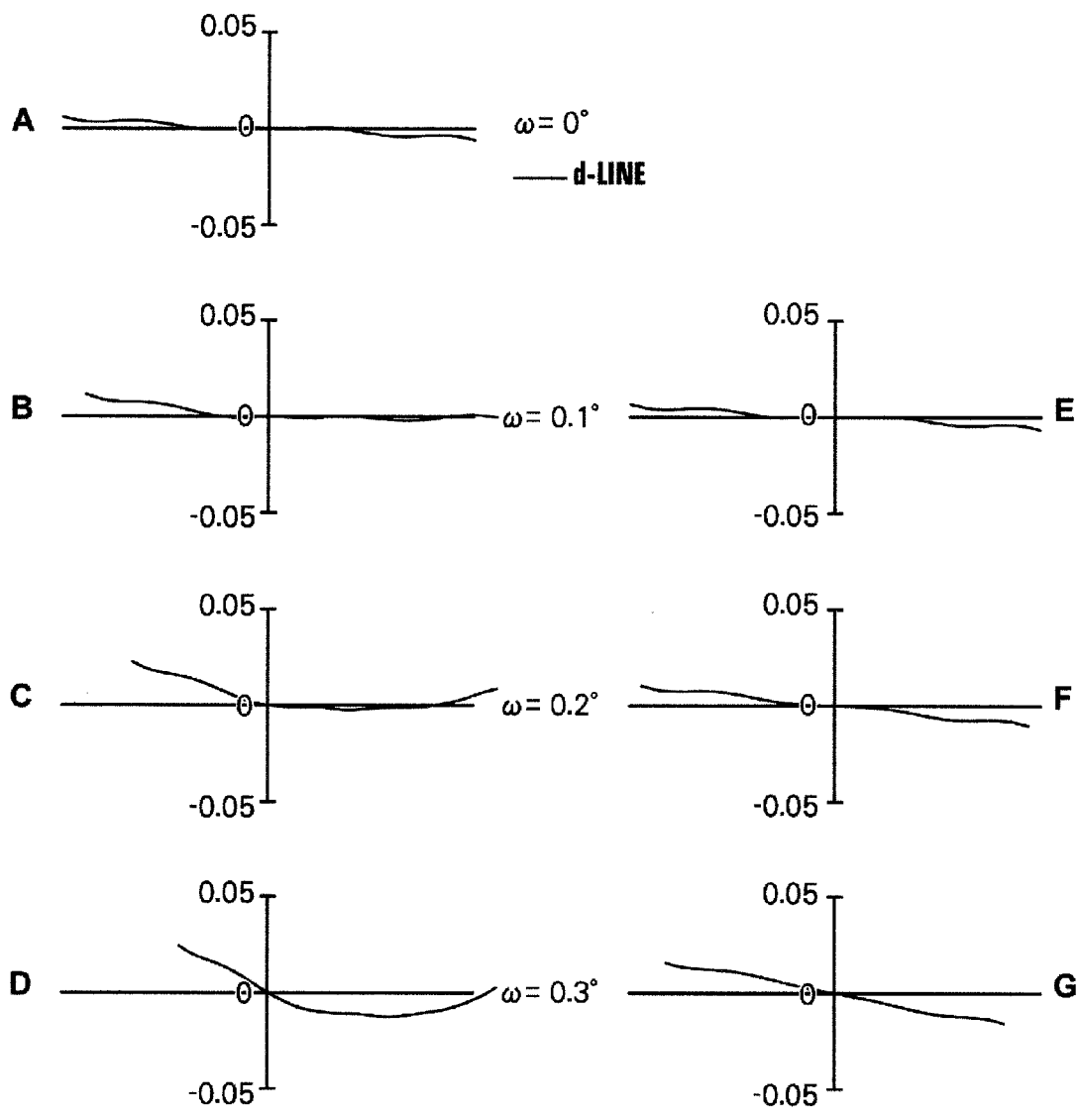
FIG. 54 shows coma aberration diagrams of the zoom lens according to Example 4 of the present invention (telephoto end).

Similarly, various aberration diagrams of the zoom lens according to Example 4 at the wide angle end in a state focused on infinity are shown in A through D of FIG. 49, and comatic aberrations thereof are shown A through G of FIG. 50. Various aberration diagrams of the zoom lens according to Example 4 at the intermediate area in a state focused on infinity are shown in A through D of FIG. 51, and comatic aberrations thereof are shown in A through G of FIG. 52. Various aberration diagrams of the zoom lens according to Example 4 at the telephoto end in a state focused on infinity are shown in A through D of FIG. 53, and comatic aberrations thereof are shown in A through G of FIG. 54.

Figure 55:
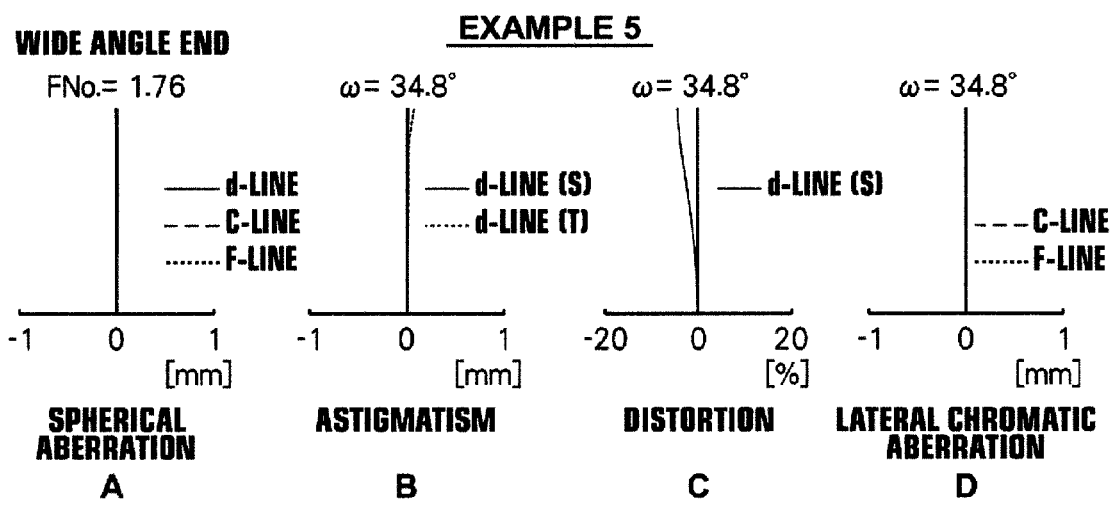
FIG. 55 shows various aberration diagrams of the zoom lens according to Example 5 of the present invention (wide angle end).
Figure 56:
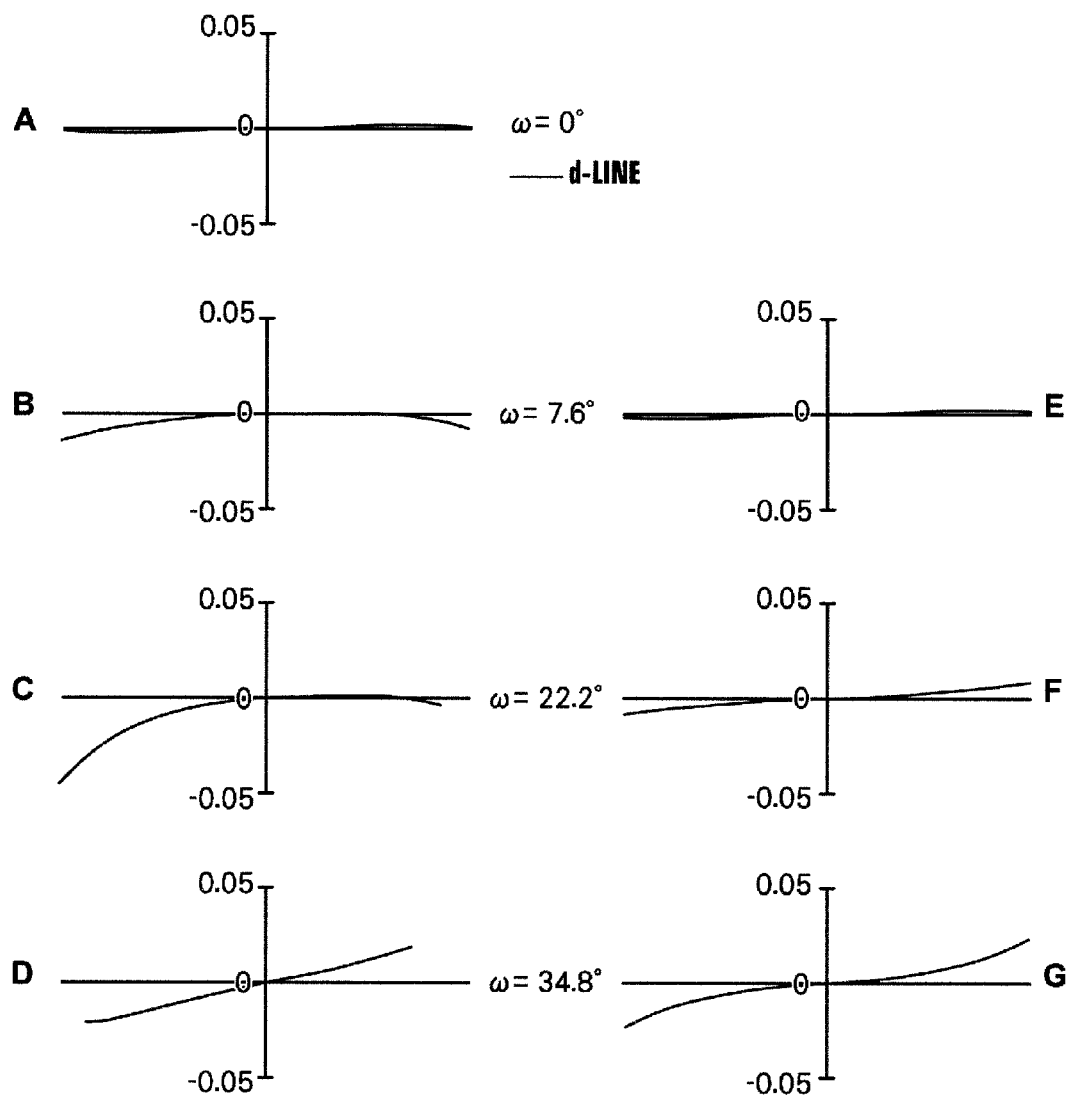
FIG. 56 shows coma aberration diagrams of the zoom lens according to Example 5 of the present invention (wide angle end).
Figure 57:
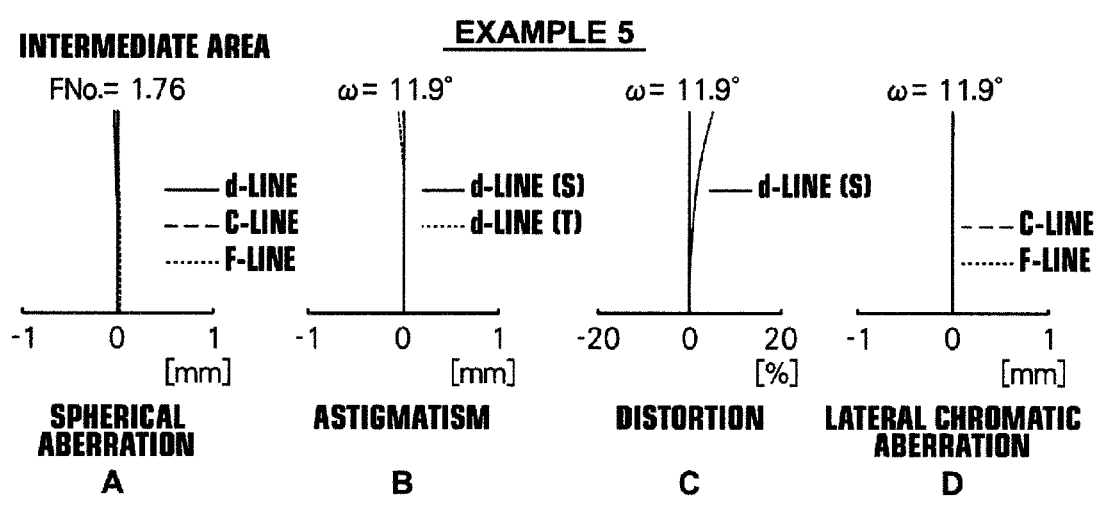
FIG. 57 shows various aberration diagrams of the zoom lens according to Example 5 of the present invention (intermediate area).
Figure 58:
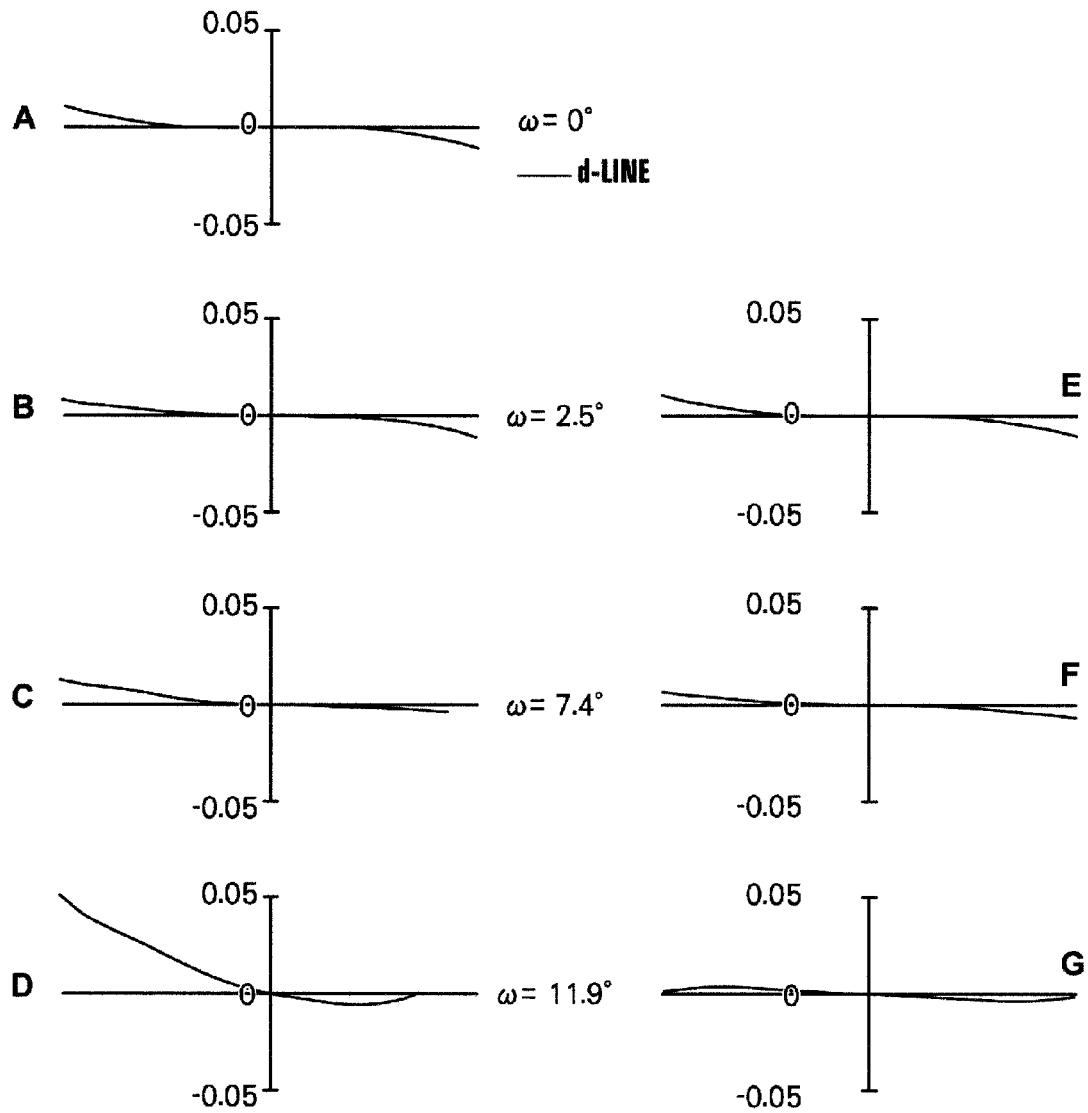
FIG. 58 shows coma aberration diagrams of the zoom lens according to Example 5 of the present invention (intermediate area).
Figure 59:
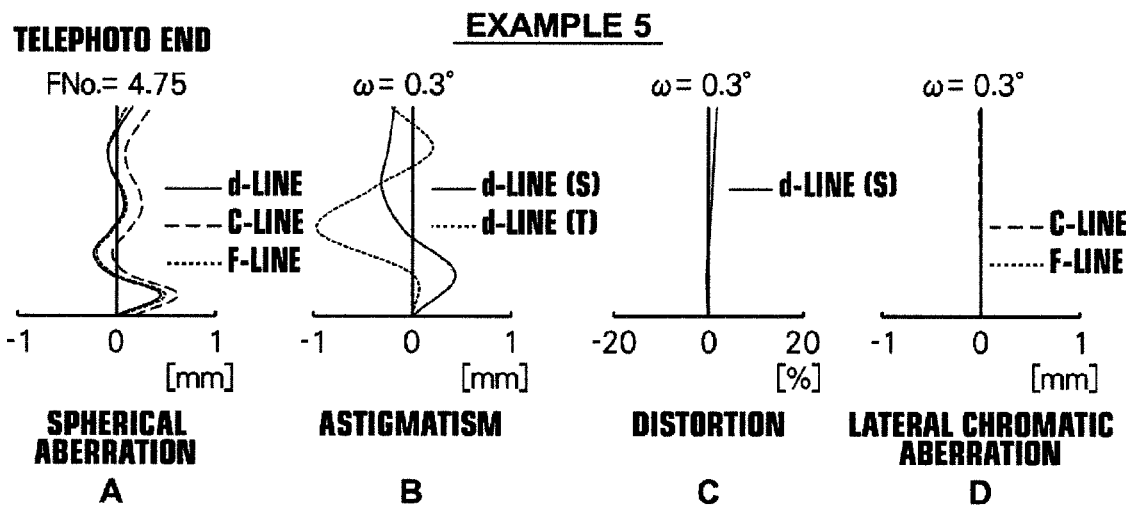
FIG. 59 shows various aberration diagrams of the zoom lens according to Example 5 of the present invention (telephoto end).
Figure 60:
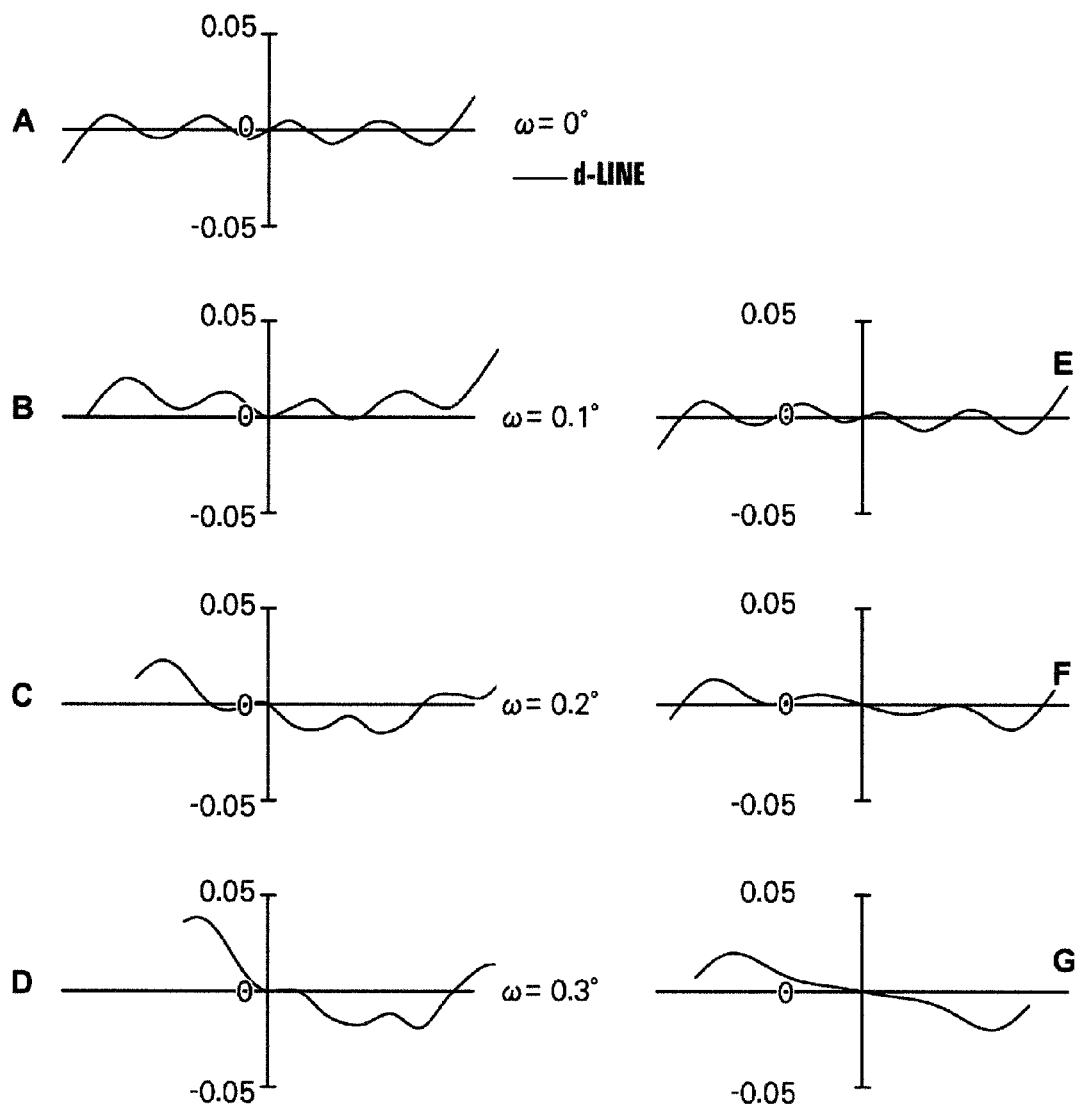
FIG. 60 shows coma aberration diagrams of the zoom lens according to Example 5 of the present invention (telephoto end).

Similarly, various aberration diagrams of the zoom lens according to Example 5 at the wide angle end in a state focused on infinity are shown in A through D of FIG. 55, and comatic aberrations thereof are shown A through G of FIG. 56. Various aberration diagrams of the zoom lens according to Example 5 at the intermediate area in a state focused on infinity are shown in A through D of FIG. 57, and comatic aberrations thereof are shown in A through G of FIG. 58. Various aberration diagrams of the zoom lens according to Example 5 at the telephoto end in a state focused on infinity are shown in A through D of FIG. 59, and comatic aberrations thereof are shown in A through G of FIG. 60.

As can be seen from each data of Numerical values and each aberration diagram described above, each of the zoom lenses according to Examples 1 through 5 is a lens system which can achieve miniaturization, has high magnification of 100× or more, and has the F number of 1.76 at the wide angle end which is fast. Further, in the zoom lens, each aberration is satisfactorily corrected, and fluctuation in aberrations such as spherical aberration and comatic aberration is suppressed while changing magnification from the wide angle end to the telephoto end.

[Embodiment of the Imaging Apparatus]

Figure 61:
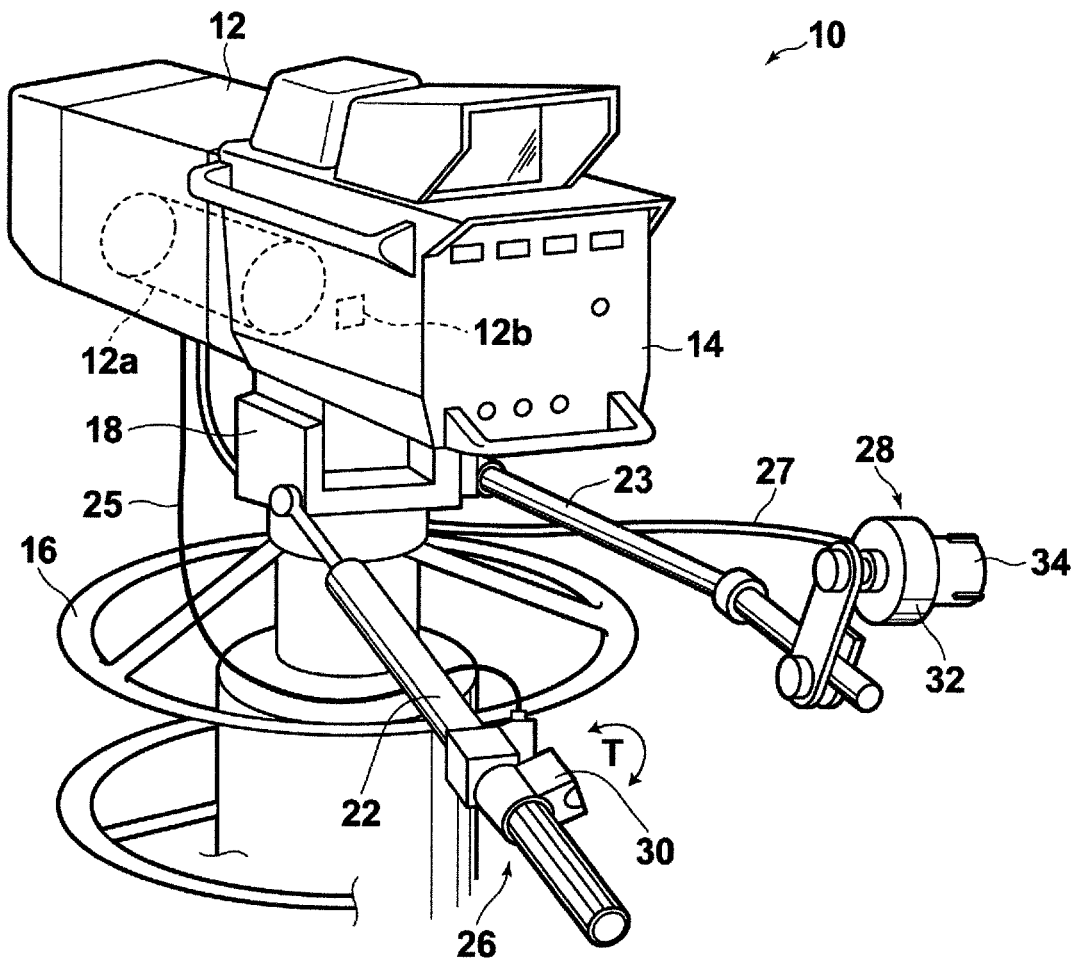
FIG. 61 is a perspective view of the imaging apparatus according to the embodiments of the present invention.

Next, the embodiment of the imaging apparatus of the present invention will be described. FIG. 61 is a perspective view of a television camera 10 which is one embodiment of the imaging apparatus of the present invention. The television camera 10 shown in FIG. 61 is constituted by a lens apparatus 12 and a camera body 14. The lens apparatus 12 is equipped with the zoom lens 12a according to the embodiment of the present invention and an imaging element 12b which images an image of a subject formed by the zoom lens 12a. Note that FIG. 61 schematically shows the zoom lens 12a.

The television camera 10 is movably supported by a camera platform 18 disposed at an upper portion of a pedestal dolly 16 in panning and tilting directions. Two panning rods 22 and 23 by which a photographer operates the camera with both hands extend backward from the camera platform 18. A zoom demand 26 connected to the lens apparatus 12 via a cable 25 is attached to the end part of the panning rod 22. A focus demand 28 connected to the lens apparatus via a cable 27 is attached to the end part of the panning rod 23.

The zoom demand 26 is provided with a thumb ring 30 which is capable of rotatably moving in both directions from the reference position. If the thumb ring 30 is rotatably operated by the photographer, a zoom instruction signal according to the amount of operation from the reference position, i.e., the rotation direction and the amount of rotation is supplied from the zoom demand 26 to the lens apparatus 12. Then, the zoom lens 12a of the lens apparatus 12 will be zoomed to the wide angle side or the telephoto side. Thereby, zooming is performed by a manual operation.

In contrast, a focus ring (rotatably movable operation member) 34 is rotatably provided on a body 32 of the focus demand 28 which is fixed to the panning rod 23. If the focus ring 34 is rotatably operated by the photographer, a focus instruction signal according to the amount of operation, i.e., the rotation direction and the amount of rotation is supplied from the focus demand 28 to the lens apparatus 12. Then, the focus lens of the lens apparatus 12 will move to the close distance side or the infinity side. Thereby, focusing is performed by a manual operation.

As described above, the zoom lens 12a according to the embodiment of the present invention is a lens having favorable optical performance while achieving miniaturization, wider angle of view, and high magnification, in which fluctuations in spherical aberration and comatic aberration while changing magnification are suppressed. The television camera 10 mounted with the zoom lens 12a can be configured to be compact, have high magnification and be capable of forming vivid images on the imaging surface of the imaging element 12b thereof. Accordingly, wider angle of view can be achieved while having high magnification and maintaining high-vision quality.

As described above, the present invention has been described with reference to the Embodiments and Examples. The present invention is not limited to the embodiments and the examples described above, and various modifications are possible. For example, values, such as the radius of curvature, the distances between surfaces, the refractive indices, and the like are not limited to the values in the numerical examples, but may be other values.

Further, a television camera was described as an example of the imaging apparatus in the embodiment described above. The present invention is not limited to such a television camera. For example, the zoom lens of the present invention can be applied for use in other imaging apparatuses such as a video camera, a surveillance camera, and the like.

What is claimed is:

1. A zoom lens substantially consisting of:
a first lens group having a positive refractive power, which is fixed while changing magnification;
a second lens group having a negative refractive power and a magnification change function, which moves while changing magnification;
a third lens group having a positive refractive power, which moves while changing magnification and corrects variations in an imaging plane due to changes in magnification; and
a fourth lens group having a positive refractive power and an image formation action, which is fixed while changing magnification and in which a stop is disposed on the most-object side, in this order from the object side; wherein
image formation magnification rates of the second lens group and the third lens group simultaneously pass a $-1\times$ point when changing magnification from the wide angle end to the telephoto end;
the second lens group substantially consists of a second-a lens group having a negative refractive power and a second-b lens group having a positive refractive power in this order from the object side, the second-a lens group and the second-b lens group independently moving while changing magnification from the wide angle end to the telephoto end; and
the third lens group substantially consists of a third-a lens group having a positive refractive power and a third-b lens group having a positive refractive power in this order from the object side, the third-a lens group and the third-b lens group independently moving while changing magnification from the wide angle end to the telephoto end.

2. The zoom lens of claim 1, wherein the distance between the third-a lens group and the third-b lens group becomes maximum in a zoom range from the wide angle end to the focal length where the image formation magnification rates of the second lens group and the third lens group simultaneously become $-1\times$ while changing magnification; and
conditional formula (1) below is satisfied:

$$0.060 < (G3d\max - G3db1)/f3a < 0.180 \quad (1), \text{where}$$

G3db1: the distance between the third-a lens group and the third-b lens group at a zoom position where the image formation magnification rates of the second lens group and the third lens group simultaneously become $-1\times$,
G3dmax: the maximum value of the distance between the third-a lens group and the third-b lens group in the zoom range, and
f3a: the focal length of the third-a lens group.

3. The zoom lens of claim 2, wherein conditional formula (1-1) below is satisfied:

$$0.080 < (G3d\max - G3db1)/f3a < 0.160 \quad (1\text{-}1), \text{where}$$

G3db1: the distance between the third-a lens group and the third-b lens group at a zoom position where the image formation magnification rates of the second lens group and the third lens group simultaneously become $-1\times$,
G3dmax: the maximum value of the distance between the third-a lens group and the third-b lens group in the zoom range, and
f3a: the focal length of the third-a lens group.

4. The zoom lens of claim 1, wherein the distance between the second-a lens group and the second-b lens group becomes minimum in a zoom range from the wide angle end to the focal length where the image formation magnification rates of the second lens group and the third lens group simultaneously become $-1\times$ while changing magnification; and
conditional formula (2) below is satisfied:

$$-0.012 < (G2d\min - G2db1)/f2b < -0.002 \quad (2), \text{where}$$

G2db1: the distance between the second-a lens group and the second-b lens group at a zoom position where the image formation magnification rates of the second lens group and the third lens group simultaneously become $-1\times$,
G2dmin: the minimum value of the distance between the second-a lens group and the second-b lens group in the zoom range, and
f2b: the focal length of the second-b lens group.

5. The zoom lens of claim 4, wherein conditional formula (2-1) below is satisfied:

$$-0.010 < (G2d\min - G2db1)/f2b < -0.004 \quad (2\text{-}1), \text{where}$$

G2db1: the distance between the second-a lens group and the second-b lens group at a zoom position where the image formation magnification rates of the second lens group and the third lens group simultaneously become −1×, G2dmin: the minimum value of the distance between the second-a lens group and the second-b lens group in the zoom range, and f2b: the focal length of the second-b lens group.

6. The zoom lens of claim 1, wherein the third-a lens group substantially consists of one lens having a positive refractive power.

7. The zoom lens of claim 6, wherein at least one surface of the lens having a positive refractive power which constitutes the third-a lens group is an aspherical surface.

8. The zoom lens of claim 1, wherein the second-b lens group substantially consists of one lens having a positive refractive power and at least one surface of the lens is an aspherical surface.

9. An imaging apparatus comprising the zoom lens of claim 1.

\* \* \* \* \*